(12) United States Patent
Mischel, Jr. et al.

(10) Patent No.: US 10,634,910 B2
(45) Date of Patent: Apr. 28, 2020

(54) APPARATUSES AND METHODS FOR PROVIDING A VANISHING VIEWING WINDOW WITHIN A MIRROR

(71) Applicant: ELECTRIC MIRROR, LLC, Everett, WA (US)

(72) Inventors: James V. Mischel, Jr., Seattle, WA (US); Michael Martin Uhl, Seattle, WA (US); James Vernon Mischel, Sr., Arlington, WA (US); Robert Larry Zerr, Marysville, WA (US)

(73) Assignee: ELECTRIC MIRROR, LLC, Everett, WA (US)

( * ) Notice: Subject to any disclaimer, the term of this patent is extended or adjusted under 35 U.S.C. 154(b) by 547 days.

(21) Appl. No.: 15/152,223

(22) Filed: May 11, 2016

(65) Prior Publication Data

US 2018/0003971 A1 Jan. 4, 2018

Related U.S. Application Data

(60) Provisional application No. 62/159,948, filed on May 11, 2015.

(51) Int. Cl.
*G02B 27/01* (2006.01)
*G02B 5/08* (2006.01)
(Continued)

(52) U.S. Cl.
CPC ......... *G02B 27/0149* (2013.01); *A45D 42/02* (2013.01); *G02B 1/14* (2015.01);
(Continued)

(58) Field of Classification Search
CPC ........ G09G 3/20; G02B 1/14; G02B 26/0833; G02B 27/026; H04N 5/66; G03G 15/0115; G03G 15/04027
See application file for complete search history.

(56) References Cited

U.S. PATENT DOCUMENTS

| | | | |
|---|---|---|---|
| 6,996,031 B1 * | 2/2006 | Cripe ...................... | G04G 9/00 368/10 |
| 2008/0186560 A1 * | 8/2008 | Kim ........................ | H04M 1/21 359/267 |

(Continued)

*Primary Examiner* — Abbas I Abdulselam
(74) *Attorney, Agent, or Firm* — Peloquin, PLLC; Mark S. Peloquin, Esq.

(57) ABSTRACT

An apparatus to provide reflection and information includes a mirror, which has a front side and a backside and further includes a glass layer. The glass layer has an area and a first reflectivity. A reflective layer is adhered to the backside of the mirror and a protective layer is adhered to the reflective layer. The reflective layer further includes a vanishing viewing window. Within the vanishing viewing window at least a part of the protective layer is removed from the to provide a second reflectivity for the vanishing viewing window, such that the first reflectivity is greater than the second reflectivity. The apparatus includes a data display. The data display is positioned behind the vanishing viewing window, such that when a user views the front side, the user sees a reflection in the mirror when the data display is in an off state and when the data display is in an on state the user sees a reflection in the mirror and data in the vanishing viewing window.

43 Claims, 43 Drawing Sheets

(51) Int. Cl.
*H04N 5/66* (2006.01)
*A45D 42/02* (2006.01)
*G02B 26/08* (2006.01)
*G02B 27/14* (2006.01)
*G09G 3/20* (2006.01)
*G02B 27/02* (2006.01)
*G02B 1/14* (2015.01)
*H04N 5/64* (2006.01)

(52) U.S. Cl.
CPC ....... *G02B 5/0808* (2013.01); *G02B 26/0833* (2013.01); *G02B 27/026* (2013.01); *G02B 27/144* (2013.01); *G09G 3/20* (2013.01); *H04N 5/66* (2013.01); *G09G 2300/02* (2013.01); *G09G 2300/023* (2013.01); *H04N 5/64* (2013.01)

(56) References Cited

U.S. PATENT DOCUMENTS

2008/0278763 A1* 11/2008 Aoki .................. G03G 15/0115
                                                    358/3.06
2016/0306482 A1* 10/2016 Gmyr ....................... G09G 3/36

* cited by examiner

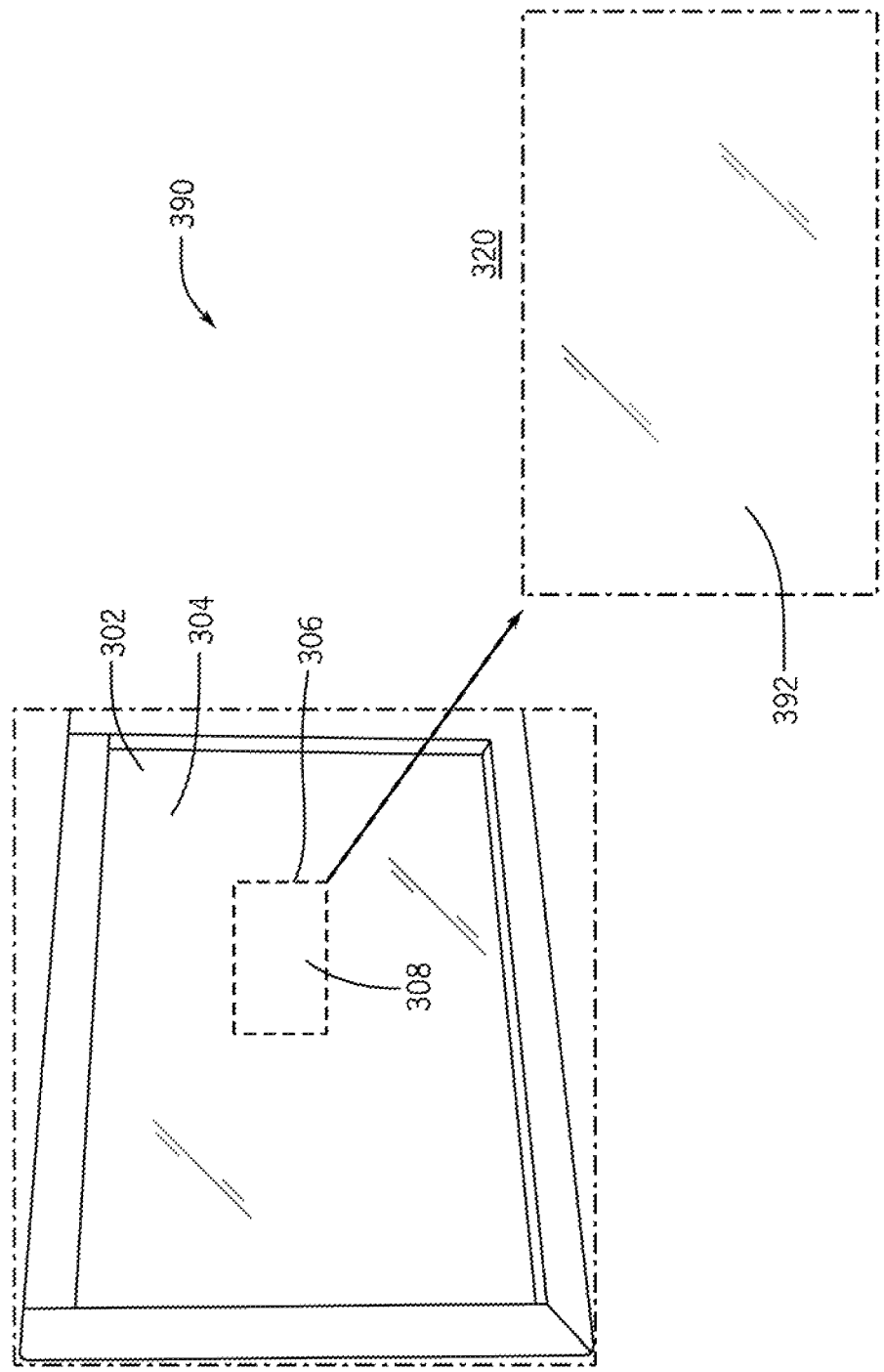

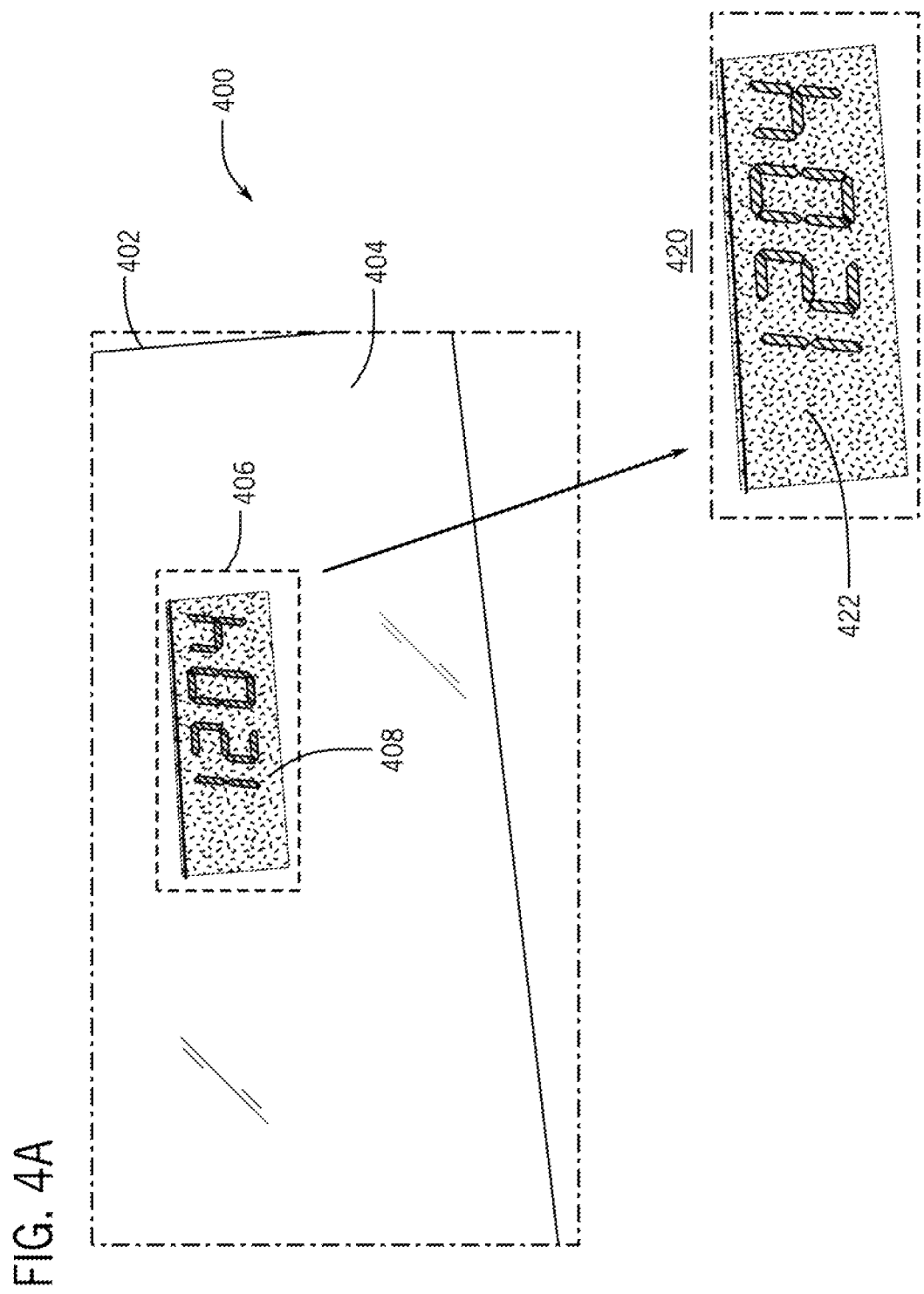

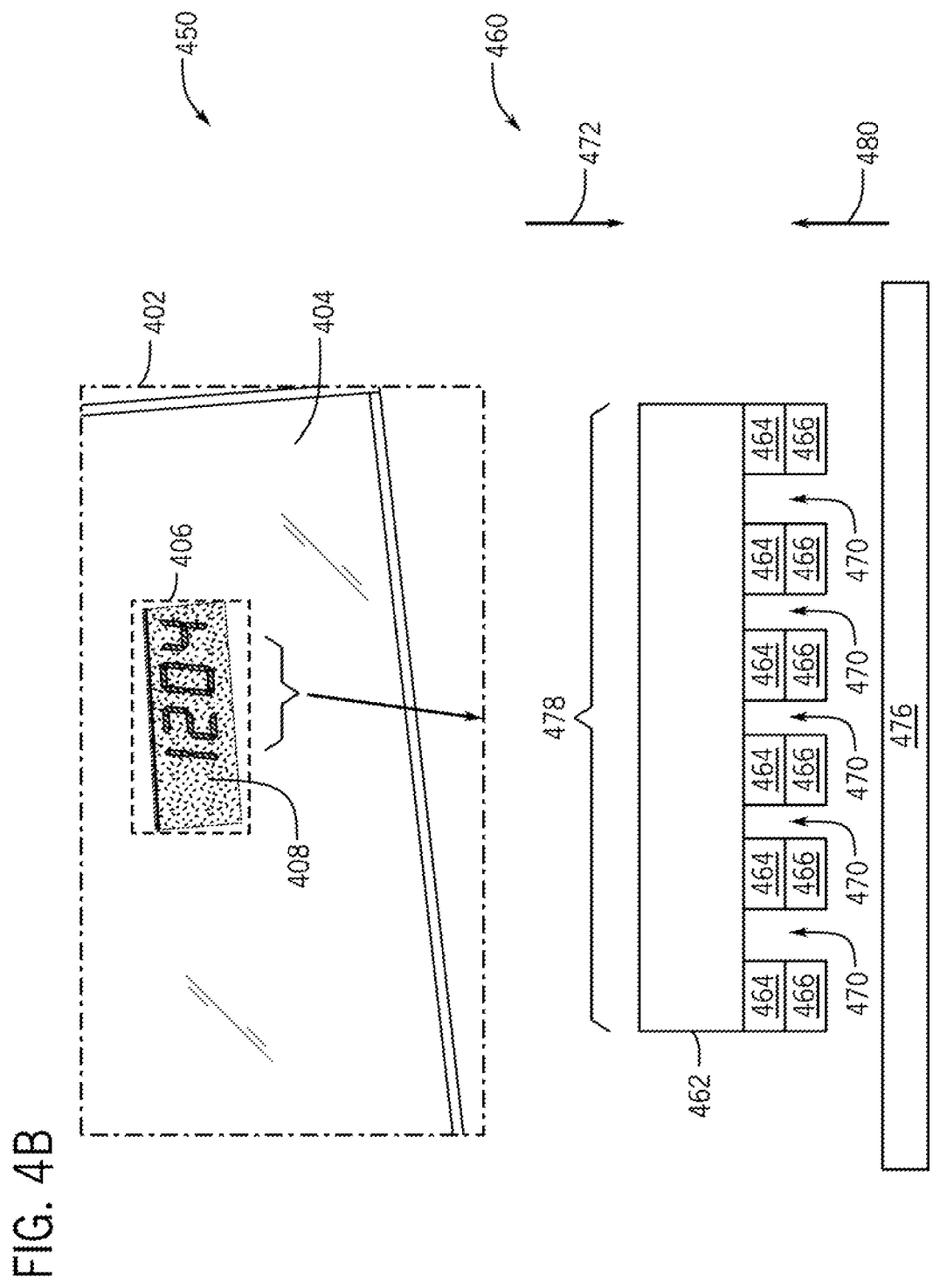

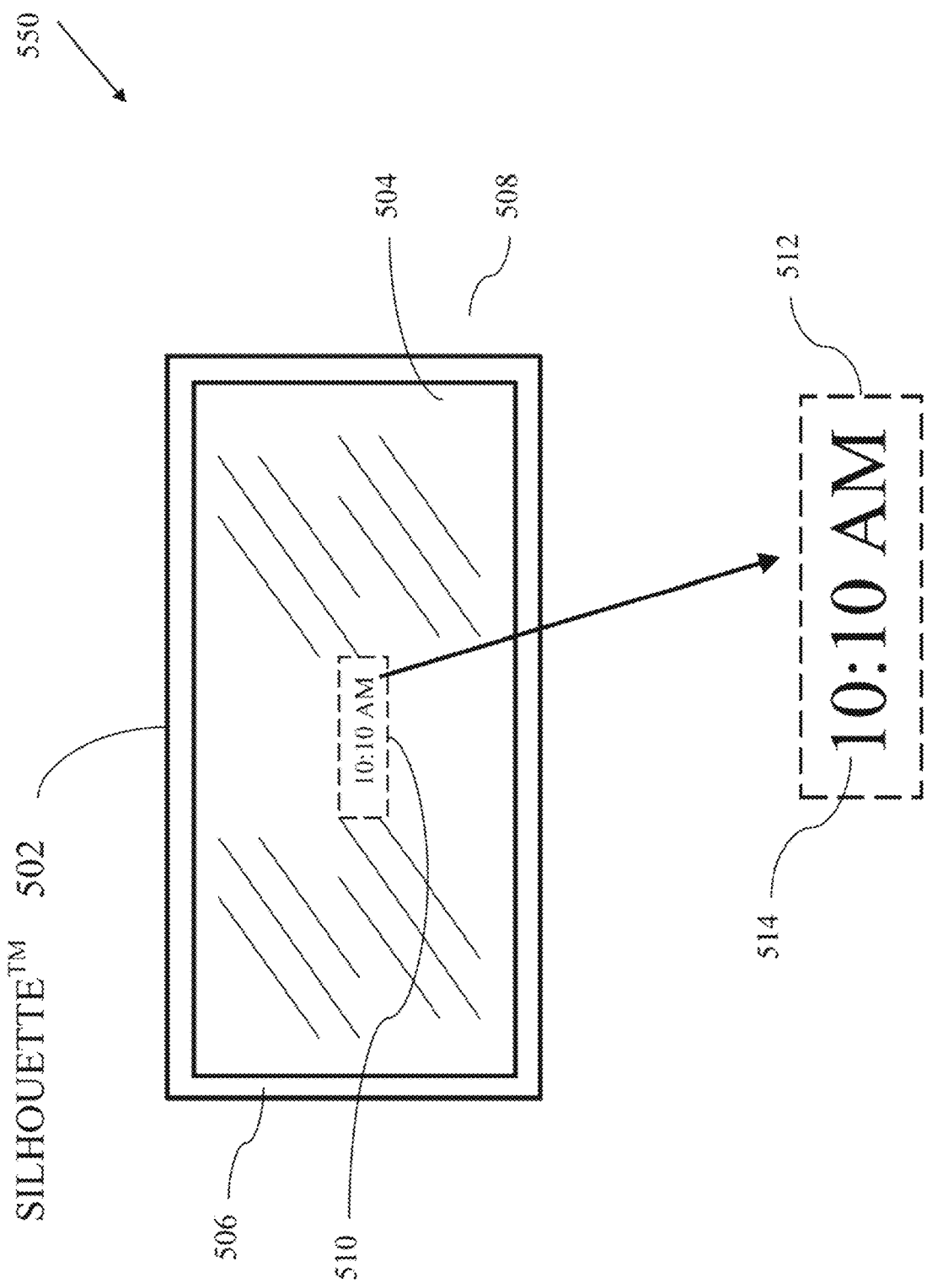

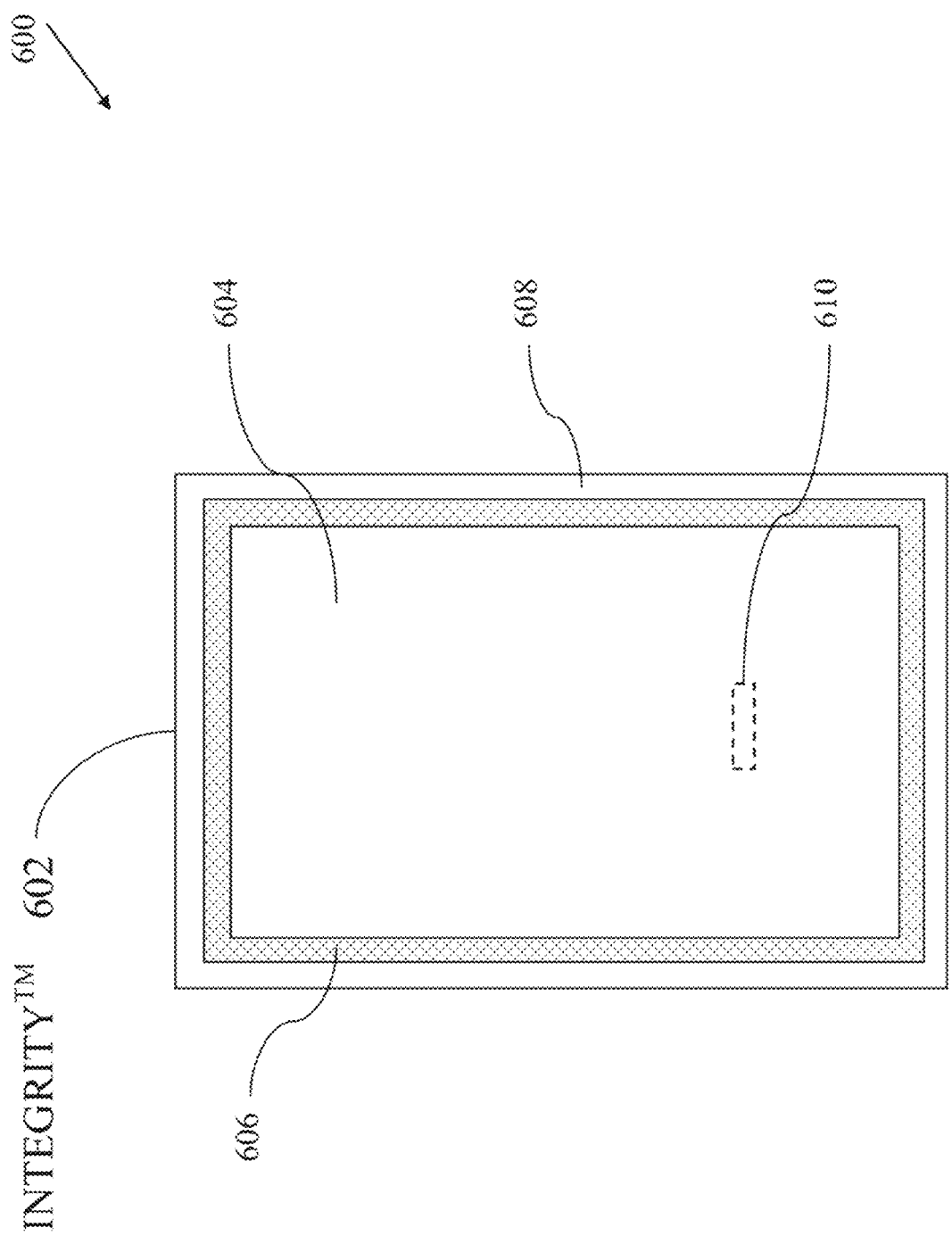

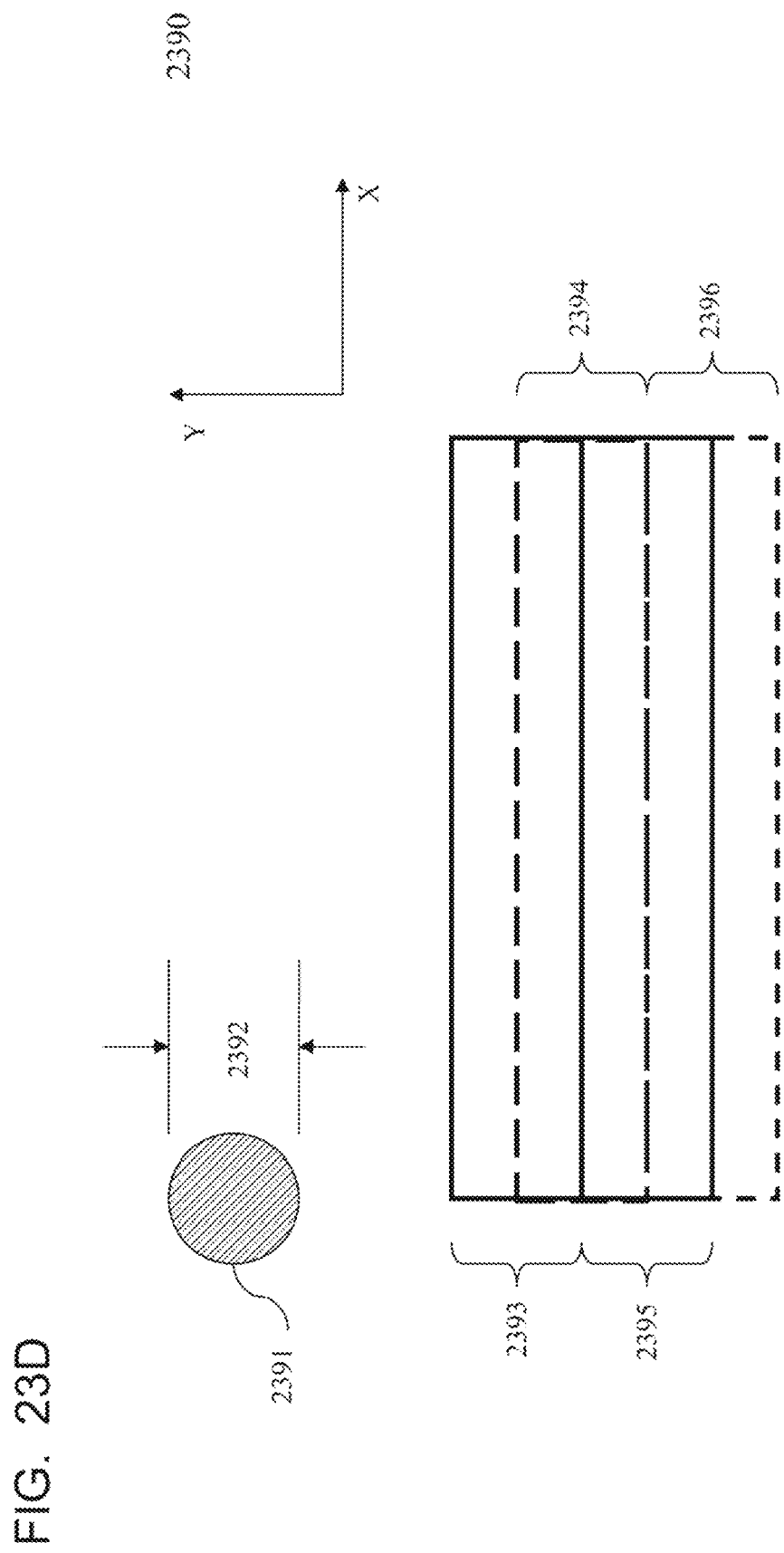

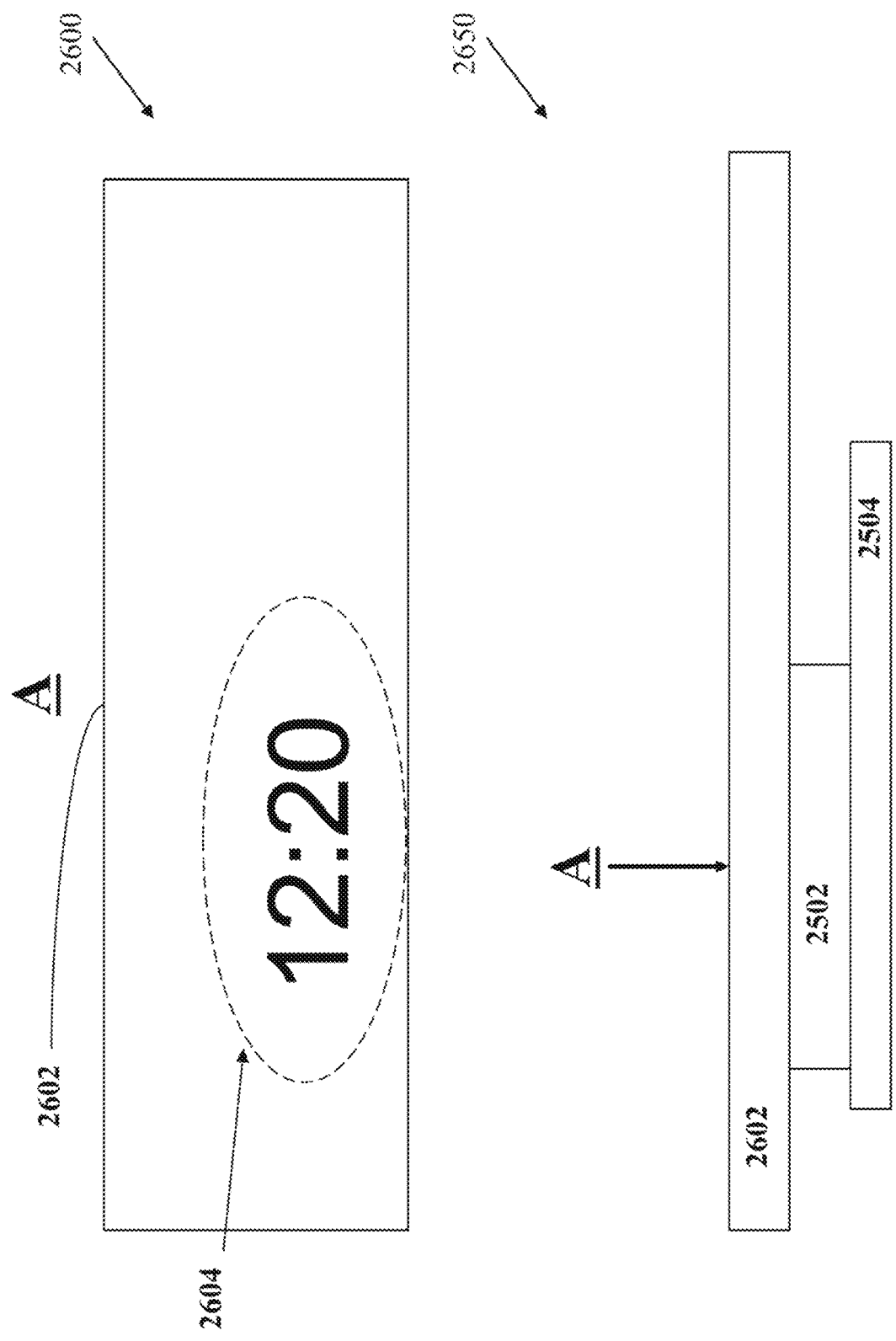

APPARATUSES AND METHODS FOR PROVIDING A VANISHING VIEWING WINDOW WITHIN A MIRROR

RELATED APPLICATIONS

This application claims priority from U.S. Provisional Patent application No. 62/159,948 entitled "Apparatuses And Methods For Displaying Alphanumeric Symbols In A Mirror," filed on May 11, 2015. U.S. provisional patent application No. 62/159,948 entitled "Apparatuses And Methods For Displaying Alphanumeric Symbols In A Mirror," is hereby fully incorporated by reference.

BACKGROUND OF THE INVENTION

1. Field of the Invention

The invention relates generally to displaying data in a vanishing viewing window of a mirror, and more specifically to apparatuses and methods for displaying alphanumeric data, graphical data and video data within a vanishing viewing window of a mirror.

2. Art Background

Clocks are used to calculate and to display time-of-day to a user. A clock can be configured as a watch which can be worn on a user's wrist or as a separate device that is mounted on a wall or that rests on a counter or on furniture. Presentation of time-of-day through current means such as wrist watches, wall and furniture mounted clocks is confining and limited. It has become convenient to incorporate the presentation of time-of-day to a user by including a clock within a mirror. However, inclusion of a clock into a mirror can be distracting. This can present a problem.

Attempts to include presentation of time-of-day to a user within a mirror on a temporary basis have proved to be complex and costly thereby making such functionality within a mirror expensive to produce. Expense in manufacturing prohibits widespread use of such devices thereby depriving a user of easily obtaining time-of-day from a mirror. This can present a problem.

A hospitality setting can contain a plurality of separate rooms, each of which may contain a clock combined with a mirror or mirrors. In situations where a separate time generator is included with each mirror, the time generators can drift over time thereby providing differences between the time-of-day displayed on the plurality of mirrors within the hospitality setting. This can present a problem.

At times, modern life proceeds at a fast pace, placing people under the constraint of time. This is often the case when a person is on travel and staying in a hospitality environment, such as a hotel, motel, conference center, or even while at home, etc. Thus, people are often pressed for time in the morning or evening or throughout the day as they get ready to leave the hospitality environment or home for the work day. It is during these times of preparation that parallel processing of tasks would be helpful. These time constraints can present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 3C illustrates additional views for displaying information within the vanishing viewing window of the mirror from FIG. 3A, according to embodiments of the invention.

FIG. 4A illustrates displaying information within a vanishing viewing window of a mirror utilizing a halftone pattern, according to embodiments of the invention.

FIG. 4B illustrates further views for displaying information within the vanishing viewing window of the mirror from FIG. 4A, according to embodiments of the invention.

FIG. 5A illustrates displaying information within a vanishing viewing window of a mirror referred to as SILHOUETTE™ by ELECTRIC MIRROR, LLC, according to embodiments of the invention.

FIG. 6 illustrates displaying information within a vanishing viewing window of a mirror referred to as INTEGRITY™ by ELECTRIC MIRROR. LLC, according to embodiments of the invention.

FIG. 1.4 illustrate a fourth grey scale image pattern, according to embodiments of the invention.

FIG. 23D illustrates overlapping successive laser beam paths, according to embodiments of the invention.

FIG. 26 illustrates a clock combined with a mirror, according to embodiments of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Methods and apparatuses are described which provide one or more regions within a mirror which function as a vanishing viewing window. As described in this description of embodiments, a vanishing viewing window provides multiple functions where for example, in some embodiments, alphanumeric text, graphics, or video can be viewed within the viewing window. In other embodiments, light is provided through the vanishing viewing window thereby providing a lighted mirror by means of the vanishing viewing window. In various embodiments, a vanishing viewing window is based on a half-tone pattern or the vanishing viewing window blends into the rest of the reflective surface of a mirror. In various embodiments, to avoid distracting a user, the viewing window is made to vanish or substantially vanish when the information display (sometimes a time display) is in an "OFF" state and the viewing window is viewed by a user from a distance. Such functionality thereby lessens the level of distraction presented by a permanent display of the data (sometimes time-of-day) or other information within a mirror. In various embodiments, alphanumeric symbols, graphics, video are used to display information within the vanishing viewing window. In some embodiments, information such as time-of-day is displayed and synchronized across a plurality of mirrors distributed in a hospitality environment, such as a hotel, motel, conference center, etc. In other embodiments, graphics are displayed with alphanumeric symbols in the same vanishing viewing window. In yet other embodiments, video is displayed in a vanishing viewing window with or without additional information. In yet other embodiments, multiple vanishing viewing windows are provided in one mirror.

Figure 1:
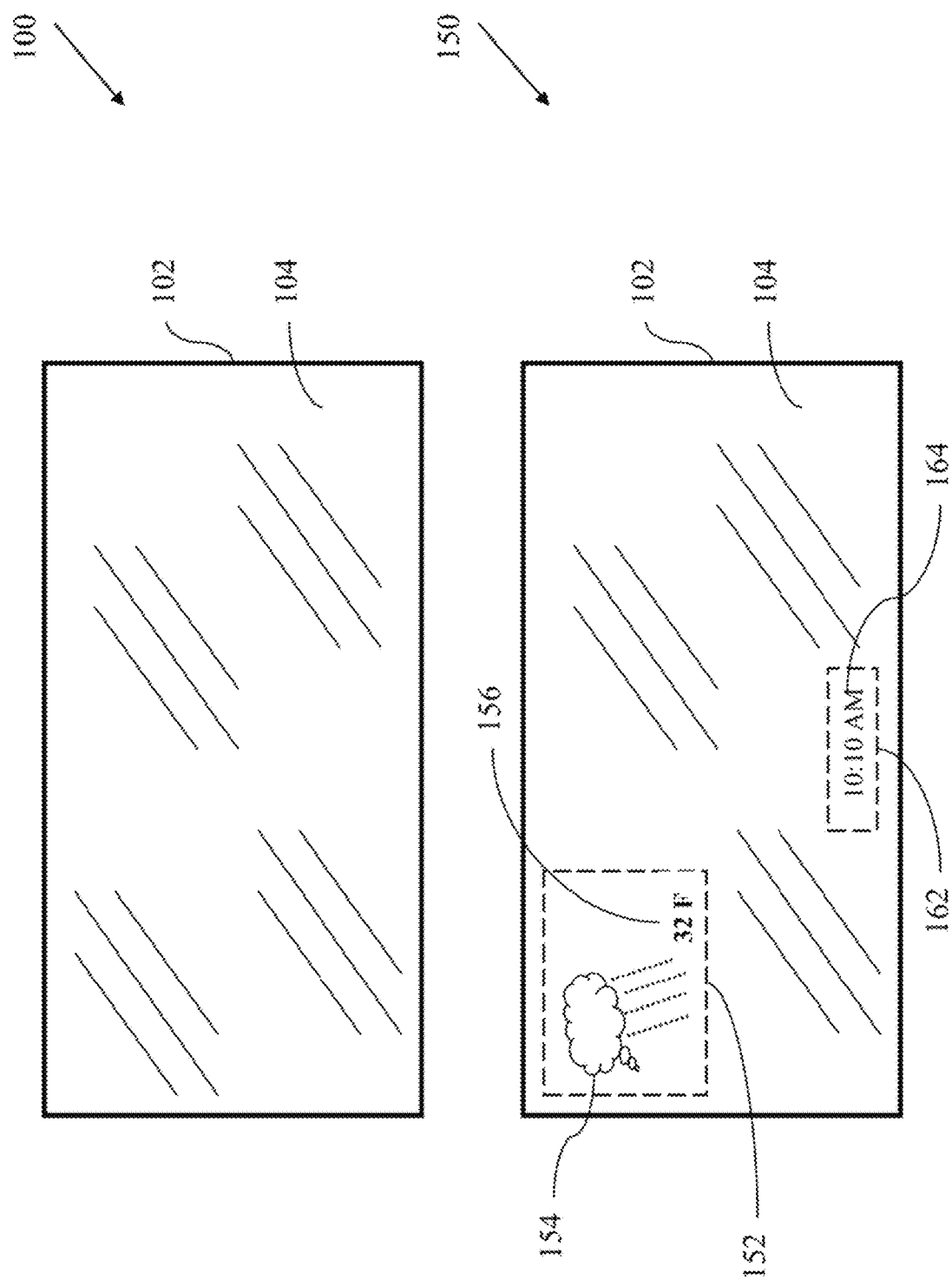
FIG. 1 illustrates displaying information within vanishing viewing windows of a mirror, according to embodiments of the invention.

FIG. 1 illustrates displaying information within vanishing viewing windows of a mirror, according to embodiments of the invention. With reference to FIG. 1, at 100 a mirror 102 is illustrated in a front view. The mirror 102 has a reflective surface 104 which has an area associated therewith. The reflective surface 104 has a first reflectivity. The first reflectivity is established by the coatings applied to a backside of the mirror 102. The coatings include a silver layer and at least one backing or protective layer. As used in this description of embodiments, the terms protective layer and backing layer are used synonymously. The silver layer and protective layers are described more fully below in conjunction with the figures that follow.

At 150, the mirror 102 is illustrated with a vanishing viewing window 162 indicated with dashed line. The vanishing viewing window 162 is located within the area of the reflective surface 104. Within the vanishing viewing window 162 data is displayed at 164. Data 164 is displayed on an information display which mounted behind the vanishing viewing window on a backside of the mirror 102. Information displays are described more fully below in conjunction with the figures that follow. As used in this detailed description of embodiments, data and information are used synonymously to refer to what is displayed on the information display or data display and is viewable within the vanishing viewing window 162 when the display is in an on state. An on state is illustrated at 150 and an off state is illustrated at 100.

In various embodiments, the data 164 displayed in the vanishing viewing window 162 can be of a variety of forms used either singly or in combination. Some non-limiting examples of data forms include, but are not limited to alphanumeric data, graphical data, and video data. Data 164 is a non-limiting example of alphanumeric data which communicates time to a user.

In other embodiments, a source of light is provided behind the vanishing viewing window 162. The source of light can be provided by a display such as a data display which is in an on state. In some embodiments, a data display is a light source which contains at least one light element. A light element can be a light emitting diode (LED), an organic light emitting diode (OLED), or a light element based on different technology such as an incandescent bulb or a fluorescent light element. When the source of light is in an on state the vanishing viewing window provides a lighted mirror function to the mirror 102. The vanishing viewing window can be sized accordingly in various embodiments to provide a primary source of back light within a vanishing viewing window or the vanishing viewing window can function as a night light providing a reduced amount of light relative to the primary backlight provided in the mirror.

The mirror 102 can be configured with the vanishing viewing window 162 in any location within the area of the reflective surface 104. A non-limiting example of a lower central location is illustrated in FIG. 1. Alternatively, another non-limiting example of a location for a vanishing viewing window is 152 illustrated in 150. The vanishing viewing window 152 is placed in an upper left hand corner for illustration only, no limitation is implied thereby. The vanishing viewing window 152 could be located anywhere within the area of the reflective surface 104. Displayed within the vanishing viewing window 152 is data 154. Data 154 is an example, in one embodiment, of graphical data which communicates information to a user who observes the vanishing viewing window from the front side as is illustrated in FIG. 1. Data 154 represents clouds and precipitation. In addition to or in lieu of 154 further data 156 is displayed in the vanishing viewing window 152. Data 156 is alphanumeric data (information) which communicates temperature to a user. In the example, of 156 the symbols read "32 F" which is understood to mean that the temperature is thirty two degree Fahrenheit. The cloud also communicates weather information pertinent to the outdoors. Thus, an observer of the mirror 102 would understand the information provided by the vanishing viewing windows 162 and 152 to communicate that it is 10:00 AM and it is cloudy outdoors with precipitation and thirty two degrees Fahrenheit. As used in this description of embodiments, display of graphics and or video data is referred to at times as "media" and the display used for media as a "media display." Thus, reference to a display herein is understood in some embodiments to encompass the term media display. Thus, media encompasses graphics, video, television signals, etc.

In FIG. 1 at 150, an example of multiple windows 152 and 162 is illustrated. In other embodiments, various numbers of vanishing viewing windows are incorporated into a reflective surface of a mirror to provide information thereby. No limitation is implied by the two vanishing viewing windows of FIG. 1 and those of skill in the art will recognize that there could be any number of vanishing viewing windows incorporated into a reflective surface of a mirror.

Vanishing viewing windows provide two states of operation. At 100 in FIG. 1, a first state of operation is illustrated which exists when data displays are in an off state. The off state permits the vanishing viewing window to participate in providing a reflection when viewed by a user from a front side. At 150 in FIG. 1, a second state of operation is illustrated where a user see both a reflection in the reflective area 104 of the mirror 102 and also sees information 164/154/156 when the data displays are in an on state. Thus, the mirror provides multiple uses simultaneously to the user.

Other illustrations of data displayed in vanishing viewing windows are presented in FIG. 2 below.

Figure 2:
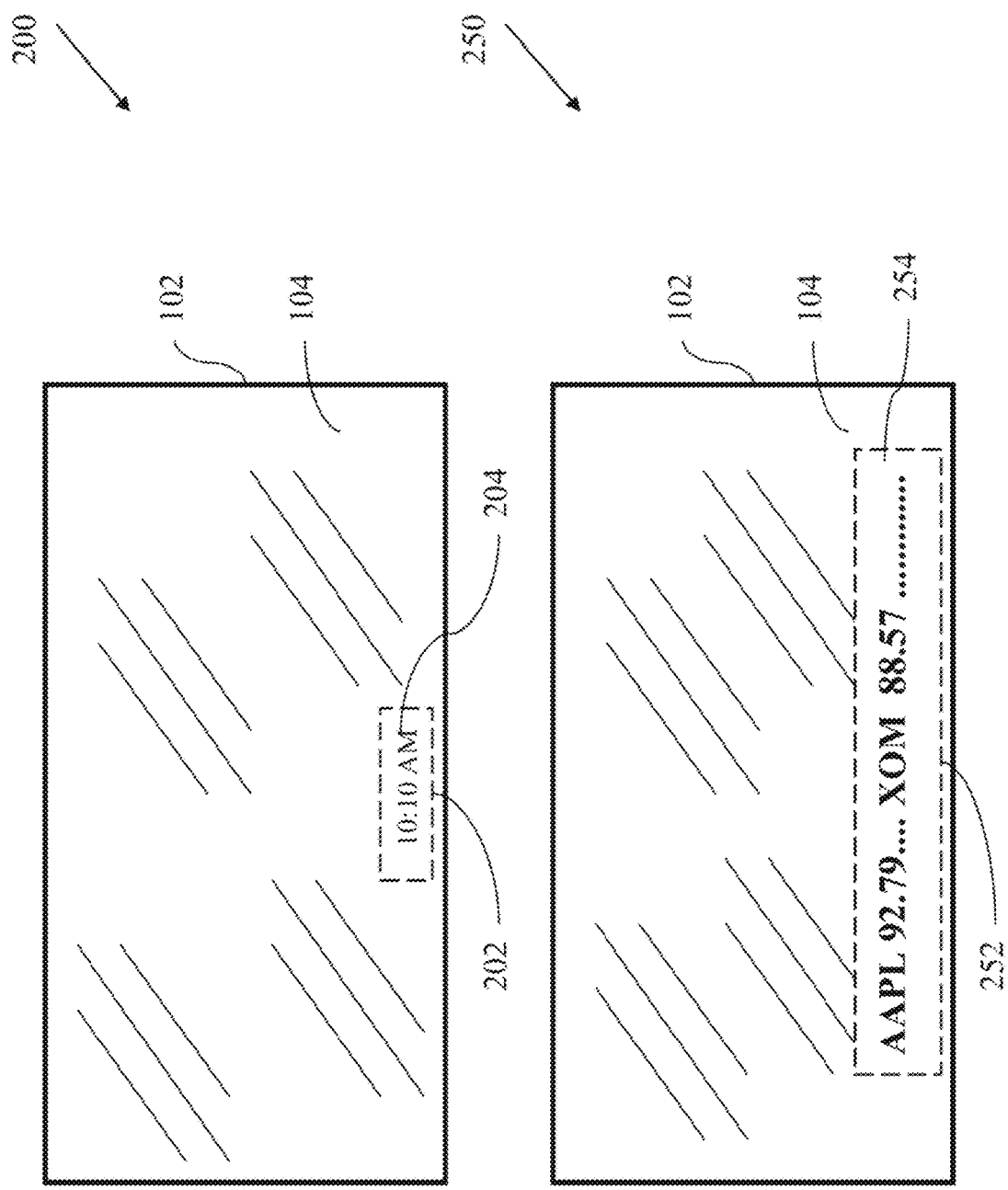
FIG. 2 illustrates displaying information within a vanishing viewing window of a mirror, according to embodiments of the invention.

FIG. 2 illustrates displaying information within a vanishing viewing window of a mirror, according to further embodiments of the invention. With reference to FIG. 2, the mirror 102 is configured with a single vanishing viewing window 202 at 200. Data 204 is viewable in vanishing viewing window 202 when a data display which is located on a backside of the mirror 102 is in an on state. The example illustrated at 200 is provided for illustration only and does not limit embodiments of the invention. A single vanishing viewing window can be located anywhere within the reflective area 104 of the mirror 102. Another example, of a location for a vanishing viewing window of a different size is illustrated at 250. At 250 an elongate vanishing viewing window is illustrated. Data 254 is viewable to an observer when the information display located behind the vanishing viewing window 252 is in an on state. Various data are displayed in the vanishing viewing window 252. In the example at 250, financial information is displayed therein. In this example, stock prices are displayed. In some embodiments, the data scroll horizontally across the window from left to right or from right to left. In other configuration data can scroll vertically from bottom to top or from top to bottom.

As described above any form of data can be viewed in a vanishing viewing window, e.g., alphanumeric data, graphical data, or video data (not shown), etc. Video data can be in the form of an animation of a cartoon or it can be in the form of television signals providing TV content within a vanishing viewing window. The subject of the information can be of any type. A non-limiting list of some types of information include but are not limited to; time, news, sports, weather, emergency warnings, financial information such as stock prices, etc.

In various embodiments, one or more vanishing viewing windows can be incorporated into both portable mirrors and wall mounted mirrors. Some non-limiting examples of portable mirrors are makeup mirrors which rest on a flat surface and handheld mirrors. Some non-limiting examples of wall mounted mirrors are room wall mounted mirrors, bathroom vanity mirror, and shower mirrors. No limitation is implied by these examples of mirrors. Embodiments of the invention can be configured with any mirror which has a reflective surface.

Figure 3A:
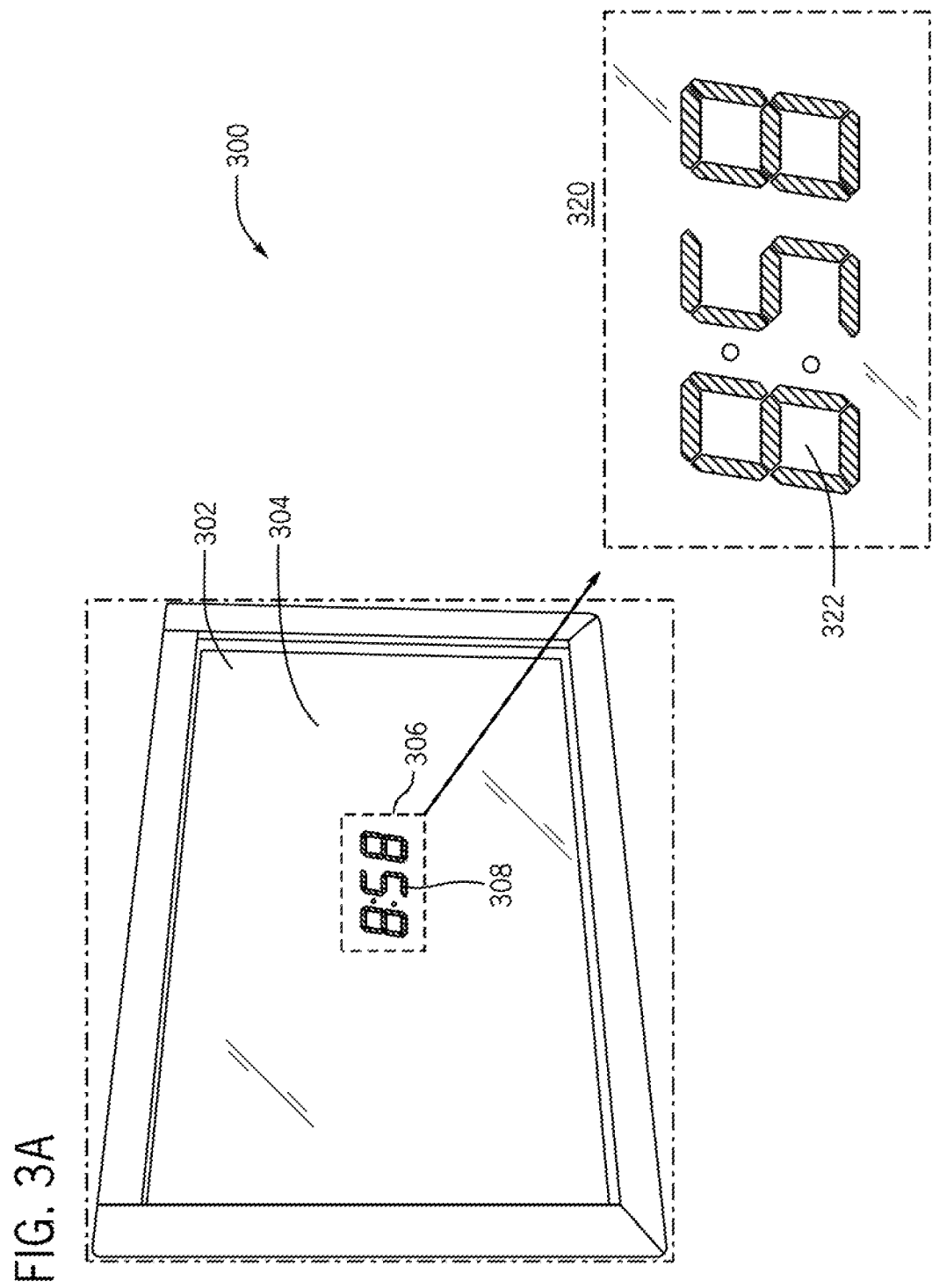
FIG. 3A illustrates displaying information within a smooth vanishing viewing window of a mirror, according to embodiments of the invention.

FIG. 3A illustrates, generally at 300, displaying information within a smooth vanishing viewing window of a mirror, according to embodiments of the invention. With reference to FIG. 3A, a mirror 302 has a reflective surface 304 which has an area associated therewith. Within the area of the reflective surface 304 is a vanishing viewing window indicated by dashed line 306. The dashed line used to indicate 306 is not visible on a front side of the mirror 302 in either the on or off state of the information display which is located on a backside of the mirror 302. The dashed line indicating 306 is used in the figure only for illustration. The information display which provides data 308 for viewing in the vanishing viewing window 306 is not shown in FIG. 3A for clarity in illustration; however the information display 376 is illustrated in the cross-sectional view of FIG. 3B below.

The vanishing viewing window 306 is illustrated in a magnified view at 320 with data 322 viewable therein. In the embodiments presented in FIG. 3A, a smooth vanishing viewing window is presented. As used in this description of embodiments, smooth is used to mean a vanishing viewing window which does not appear differently from the rest of the reflective area of the mirror.

Figure 3B:
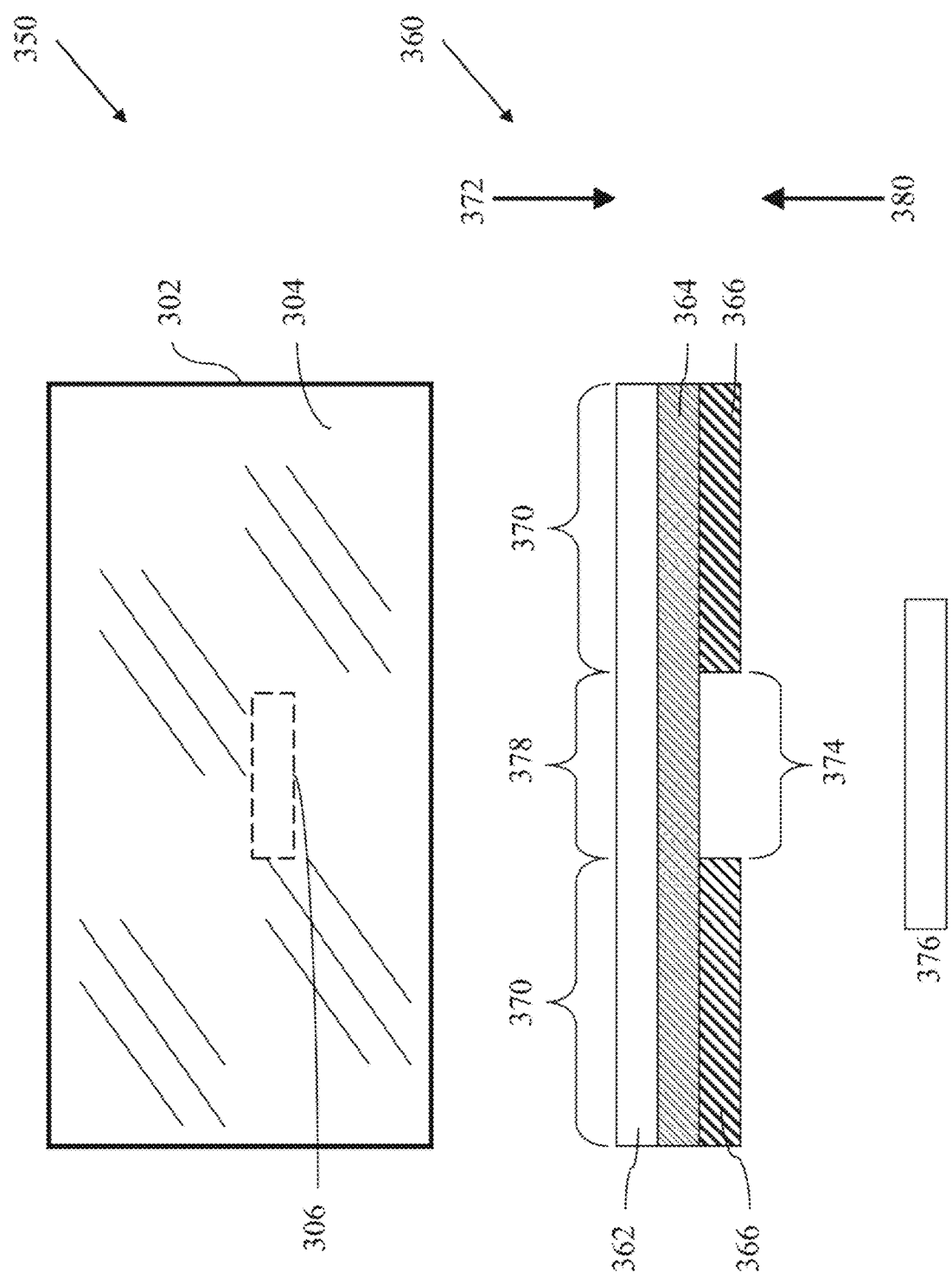
FIG. 3B illustrates further views for displaying information within the vanishing viewing window of the mirror from FIG. 3A, according to embodiments of the invention.

FIG. 3B illustrates further views for displaying information within the vanishing viewing window of the mirror from FIG. 3A, according to embodiments of the invention. With reference to FIG. 3B, at 350 the mirror 302 is illustrated in front view. The reflective surface 304 contains the vanishing viewing window 306 indicated by dashed line. As explained above in conjunction with FIG. 3A the dashed line is not visible to a user and is used merely to indicate a location for the vanishing viewing window 306.

A cross-sectional view of the mirror 302 is illustrated at 360. Within view 360 a front side 372 of the mirror 302 is indicated with the arrow pointing down and a backside 380 is indicated by an arrow pointing up. In cross section, from front to back, the mirror 302 includes a glass layer 362. Adhered to a backside of the glass layer 362 is a reflective layer 364. Adhered to a backside of the reflective layer 364 is a protective layer 366. The protective layer 364 can include one or more layers. In some embodiments, a single layer of paint is used for the protective layer. In other embodiments, a layer of copper and a layer of paint are used in a mirror construction to provide the protective layer. A cross-section of a vanishing viewing window is indicated at 374 on the backside 380 of the mirror 302. Within the vanishing viewing window 374, at least a portion of the protective layer 366 has been removed by laser beam etching which is described below in the figures that follow. Note that the reflective layer 364 has not been removed and it extends across the width of the vanishing viewing window 374 in 360. Removing at least a portion of the protective layer decreases a reflectivity of the vanishing viewing window 302 relative to a reflectivity of the reflective area 304 elsewhere. Thus, the reflectivity of the vanishing viewing window is less than the reflectivity of the reflective are 304. In some embodiments, substantially all of the protective layer(s) are removed from a vanishing viewing window of a mirror. As used in this description of embodiments, "substantially all" can mean that all of the protective layer(s) have been removed. "Substantially all" can also mean that some of the protective layer has been left on the backside of the mirror but the amount that is left does not interfere with the function of the vanishing viewing window.

After the etching process is complete, a data display 376 is positioned behind the mirror 302 on the backside 380 behind the vanishing viewing window 374. The data display 376 is rendered in exploded view and is set back a distance for ease in viewing After assembly, the data display 376 is mounted close to the backside 380 of the mirror 302. In some embodiments, the data display 376 is mechanically coupled to the backside 380 of the mirror 302. In other embodiments, the data display 376 is held close to a backside 380 of the mirror 302 with mounting brackets (not shown). As described below in the figures that follow, etching the protective layer(s) 366 is done with the laser set to a low power and multiple passes are typically used to remove the protective layer slowly so that the reflective layer is left substantially intact. Leaving the reflective layer substantially intact provides a smooth vanishing viewing window such that the vanishing viewing window 378 is not discernibly different from the rest of the reflective area 304 when the mirror 302 is viewed from the front side 372 by the user.

In some embodiments, all of the protective layer(s) are removed during the etching process leaving the reflective layer.

FIG. 3C illustrates, generally at 390, additional views for displaying information within the vanishing viewing window of the mirror from FIG. 3A, according to embodiments of the invention. With reference to FIG. 3C, the data display associated with the mirror 302 is in an off state. When the data display is in the off state, the vanishing viewing window 306 is not visible and blends into the reflective mirror 304. The vanishing viewing window 306 is illustrated in a magnified view at 320 with no data displayed therein. In the embodiments presented in FIG. 3A through FIG. 3C, a smooth vanishing viewing window is presented. As used in this description of embodiments, smooth is used to mean a vanishing viewing window which does not appear differently from the rest of the reflective area of the mirror.

FIG. 4A illustrates, generally at 400, displaying information within a vanishing viewing window of a mirror utilizing a halftone pattern, according to embodiments of the invention. With respect to FIG. 4A, a mirror 402 has a reflective surface 404 which has an area associated therewith. Within the area of the reflective surface 404 is a vanishing viewing window indicated by dashed line 406. The dashed line used to indicate 406 is not visible on a front side of the mirror 402 in either the on or off state of the information display which is located on a backside of the mirror 402. The information display which provides data 408 for viewing in the vanishing viewing window 406 is not shown in FIG. 4A for clarity in illustration; however the information display 476 is illustrated in the cross-sectional view of FIG. 4B below. The vanishing viewing window 406 is illustrated in a magnified view at 420 with data 422 viewable therein. In the embodiments presented in FIG. 4A, a vanishing viewing window is presented which is based on a halftone pattern. Some evidence of the halftone pattern is evident in the views of FIG. 4A. In various embodiments, halftone patterns will look different depending on how they are created. Thus, embodiments of the invention are not limited by the halftone pattern displayed in the figures shown herein. These views in the figures are provided merely for illustration.

FIG. 4B illustrates further views for displaying information within the vanishing viewing window of the mirror from FIG. 4A, according to embodiments of the invention. With reference to FIG. 4B, at 450 the mirror 402 is illustrated in front view. The reflective surface 404 contains the vanishing viewing window 406 indicated by dashed line. As explained above in conjunction with FIG. 4A the dashed line is not visible to a user and is used merely to indicate a location for the vanishing viewing window 406.

A cross-sectional view of the mirror 402 is illustrated at 460. Within view 460 a front side of the mirror 402 is indicated with the arrow 472 pointing down and a backside is indicated by an arrow 480 pointing up. In cross-section, from front to back, the mirror 402 includes a glass layer 462. Adhered to a backside of the glass layer 462 is a reflective layer 464. Adhered to a backside of the reflective layer 464 is a protective layer 466. The protective layer 464 can include one or more layers. In some embodiments, a single layer of paint is used for the protective layer. In other embodiments, a layer of copper and a layer of paint are used in a mirror construction to provide the protective layer. A cross-section of an enlarged of a portion of the vanishing viewing window 406 is indicated at 478 of the mirror 402. Within the enlarged view 478, the protective layer 466 has been removed by a laser beam etching which is described below in the figures that follow. In addition to removing the protective layer 466, the reflective layer 464 has also been removed as is indicated by the regions 470 in view 460. Removing the protective layer and the reflective layer decreases a reflectivity of the vanishing viewing window 474 relative to a reflectivity of the reflective area 404 elsewhere by virtue of the reduced reflectivity of regions 470. Thus, the average reflectivity of the vanishing viewing window 406 is less than the reflectivity of the reflective area 404. The etching process used to produce regions 470 utilizes a halftone pattern and in some embodiments includes dither as described below in the figures that follow to blend a boarder of the vanishing viewing window with the reflective area 404. In order to create the regions 470 a laser is fired alternately to remove the intended area of reflective layer 464 and protective layer 466 over the area of the vanishing viewing window.

After the etching process is complete, a data display 476 is positioned behind the mirror 402 on the backside 480 behind the vanishing viewing window 478. The data display 476 is rendered in exploded view and is set back a distance for ease in viewing. After assembly, the data display 476 is mounted close to the backside 480 of the mirror 402. In some embodiments, the data display 476 is mechanically coupled to the backside of the mirror 402. In other embodiments, the data display 476 is held close to a backside of the mirror 402 with mounting brackets (not shown). In yet other embodiments, the data display 476 is bonded to the backside of the mirror 402.

In some embodiments, as described below in the figures that follow, etching the protective layer(s) and the reflective layer provides a vanishing viewing window 478 which is discernibly different from the rest of the reflective area 404 when viewed from the front side 472 by the user. Dithering the halftone pattern softens a transition from a central portion of the vanishing viewing region to the undisturbed reflective area 404, all of which is described more fully below in conjunction with the figures that follow.

FIG. 5A illustrates, generally at 500, displaying information within a vanishing viewing window of a mirror referred to as SILHOUETTE™, by ELECTRIC MIRROR, LLC, according to embodiments of the invention. With respect to FIG. 5A, an example of the SILHOUETTE™ lighted mirror is illustrated at 502. The lighted mirror 502 has a reflective surface 504 and a region of back light 506. The region of backlight 506 also produces a penumbra of light indicated at 508 around a perimeter of the mirror 502. A vanishing viewing window 510 is configured within an area of the reflective area 504. Data 514 is displayed within the vanishing viewing window 510 and is visible to a user when a data display (not shown) mounted on backside of the mirror 502 is in an on state. As described above, data can communicate various forms of information to a user depending on the configuration of the system. In this non-limiting example, time is communicated at 514 to the user in both vanishing viewing window 510 and the enlarged view 512 of vanishing viewing window 510. As described above, it will be understood that for all of the vanishing viewing windows illustrated in this description of embodiments, dashed lines are used only for illustration and are not part of the vanishing viewing window or mirror.

Figure 5B:
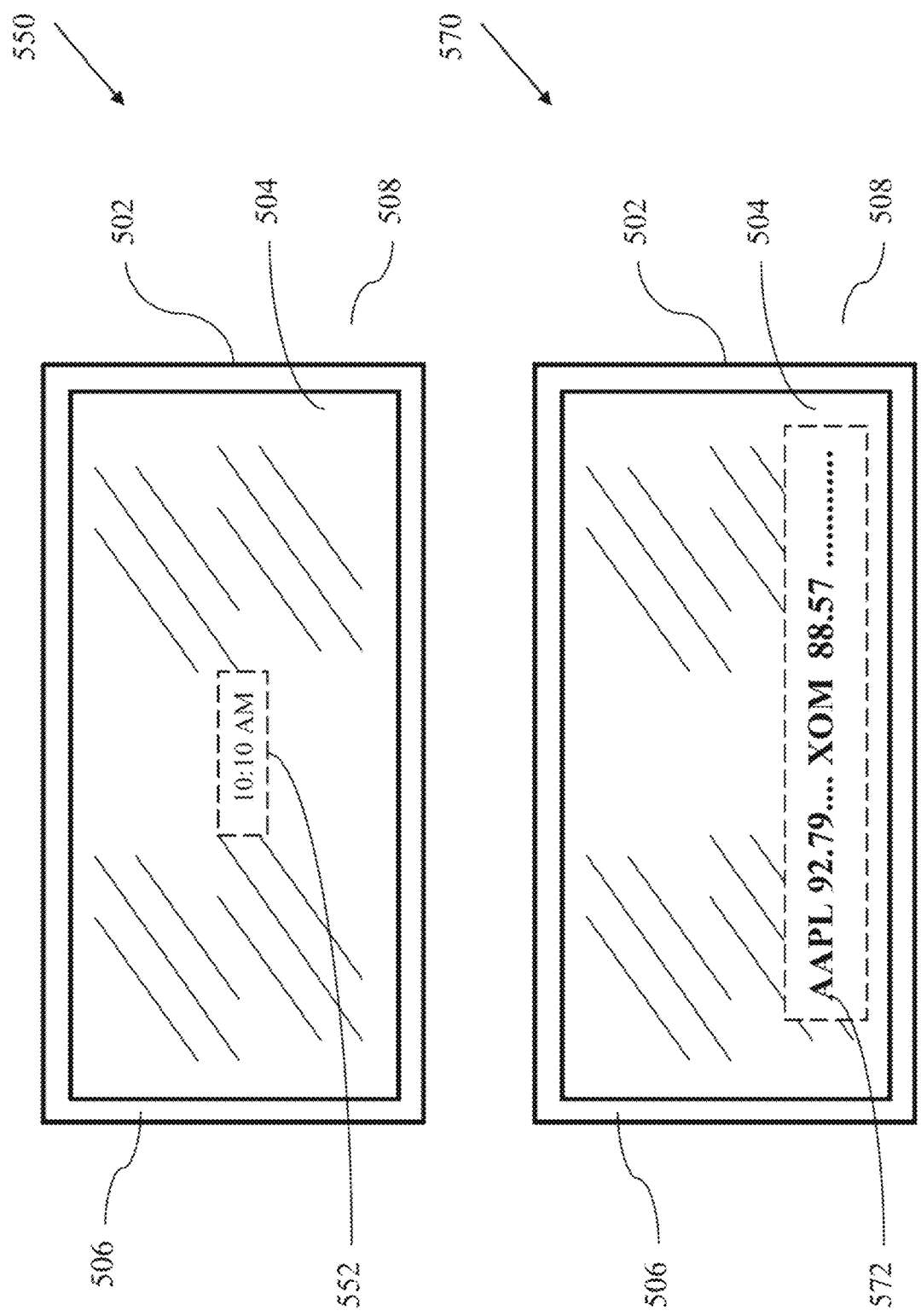
FIG. 5B illustrates displaying information within a vanishing viewing window of a mirror referred to as SILHOUETTE™ by ELECTRIC MIRROR, LLC, according to further embodiments of the invention.

FIG. 5B illustrates displaying information within a vanishing viewing window of a mirror referred to as SILHOUETTE™ by ELECTRIC MIRROR, LLC, according to further embodiments of the invention. With reference to FIG. 5B, at 550 a vanishing viewing window 552 is provided in an alternative location within the reflective area 504 of the mirror 502 consistent with the teachings presented above with respect to locating a vanishing viewing window in any location within the reflective area of a mirror. With reference to FIG. 5B, at 570 a vanishing viewing window 572 is provided in an alternative size and location within the reflective area 504 of the mirror 502 consistent with the teachings presented above with respect to locating a vanishing viewing window in any location and in any size within the reflective area of a mirror. Note also that the data displayed in vanishing viewing window 572 is financial stock price data where the data displayed in vanishing viewing window 552 is time data. Thus, as described above in conjunction with FIG. 1 through FIG. 5A vanishing viewing windows can be placed anywhere within the reflective area of a mirror and as well anywhere within the reflective area of a backlit mirror such as illustrated in FIG. 5A and FIG. 5B for the SILHOUETTE™ lighted mirror by ELECTRIC MIRROR, LLC or in any other back lit mirror.

FIG. 6 illustrates, generally at 600, displaying information within a vanishing viewing window of a mirror referred to as INTEGRITY™ by ELECTRIC MIRROR. LLC, according to embodiments of the invention. With reference to FIG. 6, an example of the INTEGRITY™ lighted mirror is illustrated at 602. The mirror 602 has a first reflective area 604 and a second reflective area 608. In between the first reflective area 604 and the second reflective area 608 is a backlight area 606. Backlight area 606 can be made from a frosted area of glass which is lit either directly or indirectly from behind the mirror 602. A vanishing viewing window 610 is located within the first reflective area 604. In alternative embodiments, the vanishing viewing window 610 can be located anywhere in either the first reflective area 604 or the second reflective area 608. Embodiments of the invention are applicable to other sizes and shapes of the INTEGRITY™ lighted mirror from ELECTRIC MIRROR, LLC. The example provided in FIG. 6 is merely for illustration and does not limit embodiments of the invention as applied to other mirrors currently available from ELECTRIC MIRROR, LLC or mirrors yet to be designed.

Figure 7:
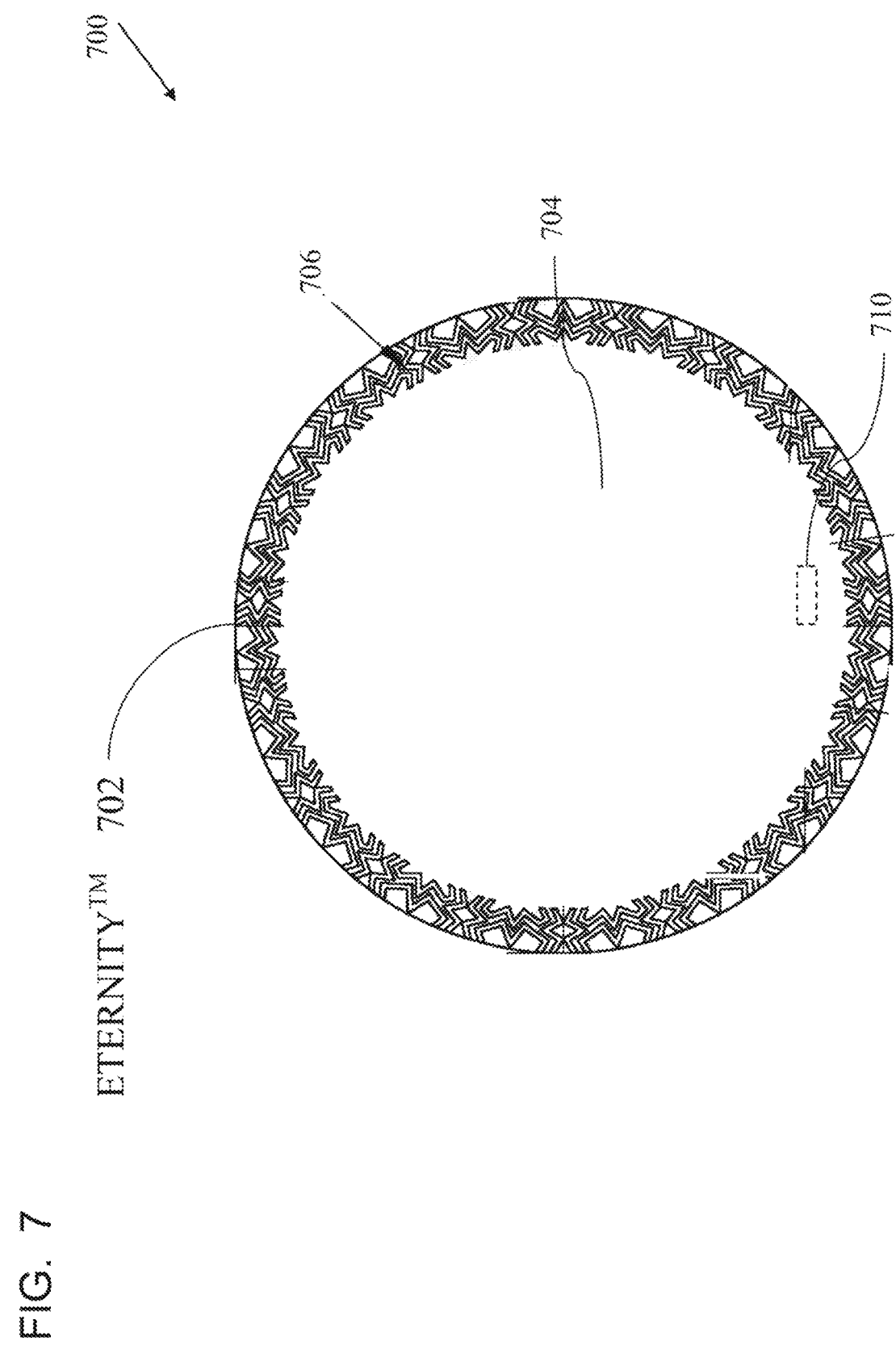
FIG. 7 illustrates displaying information within a vanishing viewing window of a mirror referred to as ETERNITY™ by ELECTRIC MIRROR, LLC, according to embodiments of the invention.

FIG. 7 illustrates, generally at 700, displaying information within a vanishing viewing window of a mirror referred to as ETERNITY™ by ELECTRIC MIRROR, LLC, according to embodiments of the invention. With reference to FIG. 7, an example of the ETERNITY™ lighted mirror is illustrated at 702. The mirror 702 has a reflective area 704 and a backlight area 706 configured as a custom frosted area with a design etched by a laser in various embodiments. In other embodiments the backlit area 706 is configured with a uniform frosted region. Backlight area 706 can be made from a frosted area of glass which is lit either directly or indirectly from behind the mirror 702. A vanishing viewing window 710 is located within the reflective area 704. In alternative embodiments, the vanishing viewing window 710 can be located anywhere in the reflective area 704. Embodiments of the invention are applicable to other sizes and shapes of the ETERNITY™ lighted mirror from ELECTRIC MIRROR. LLC. The example provided in FIG. 7 is merely for illustration and does not limit embodiments of the invention as applied to other mirrors currently available from ELECTRIC MIRROR, LLC or mirrors yet to be designed.

Figure 8:
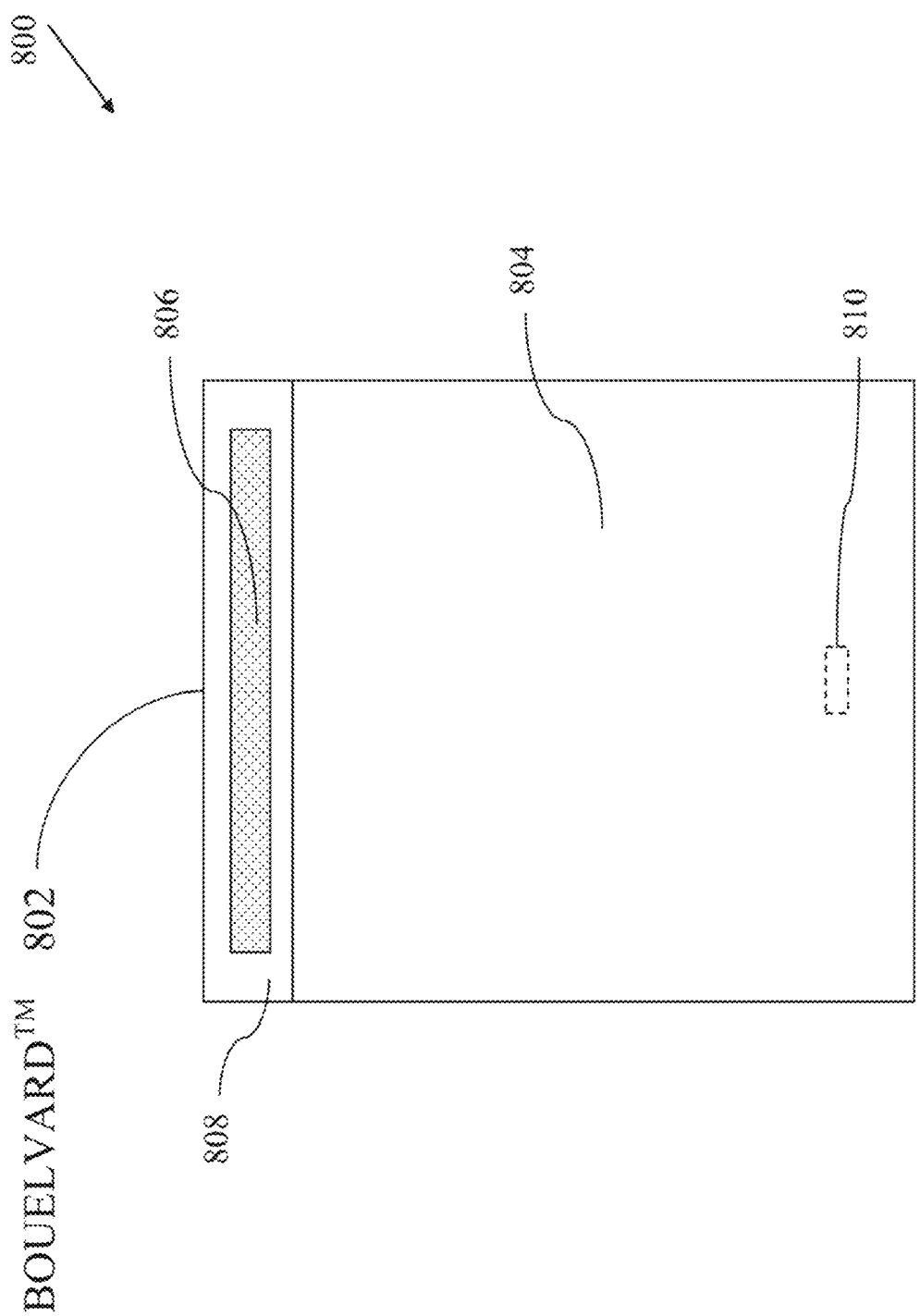
FIG. 8 illustrates displaying information within a vanishing viewing window of a mirror referred to as BOULEVARD™ by ELECTRIC MIRROR, LLC, according to embodiments of the invention.

FIG. 8 illustrates, generally at 800, displaying information within a vanishing viewing window of a mirror referred to as BOULEVARD™, by ELECTRIC MIRROR, LLC, according to embodiments of the invention. With reference to FIG. 8, an example of the BOULEVARD™ lighted mirror is illustrated at 802. The mirror 802 has a first reflective area 804 and a second reflective area 808. In the midst of the second reflective area 808 is a backlight area 806. Backlight area 806 can be made from a frosted area of glass which is lit either directly or indirectly from behind the mirror 802. A vanishing viewing window 810 is located within the first reflective area 804. In alternative embodiments, the vanishing viewing window 810 can be located anywhere in either the first reflective area 804 or the second reflective area 808. Embodiments of the invention are applicable to other sizes and shapes of the BOULEVARD™ lighted mirror from ELECTRIC MIRROR, LLC. The example provided in FIG. 8 is merely for illustration and does not limit embodiments of the invention as applied to other mirrors currently available from ELECTRIC MIRROR, LLC or mirrors yet to be designed.

Figure 9:
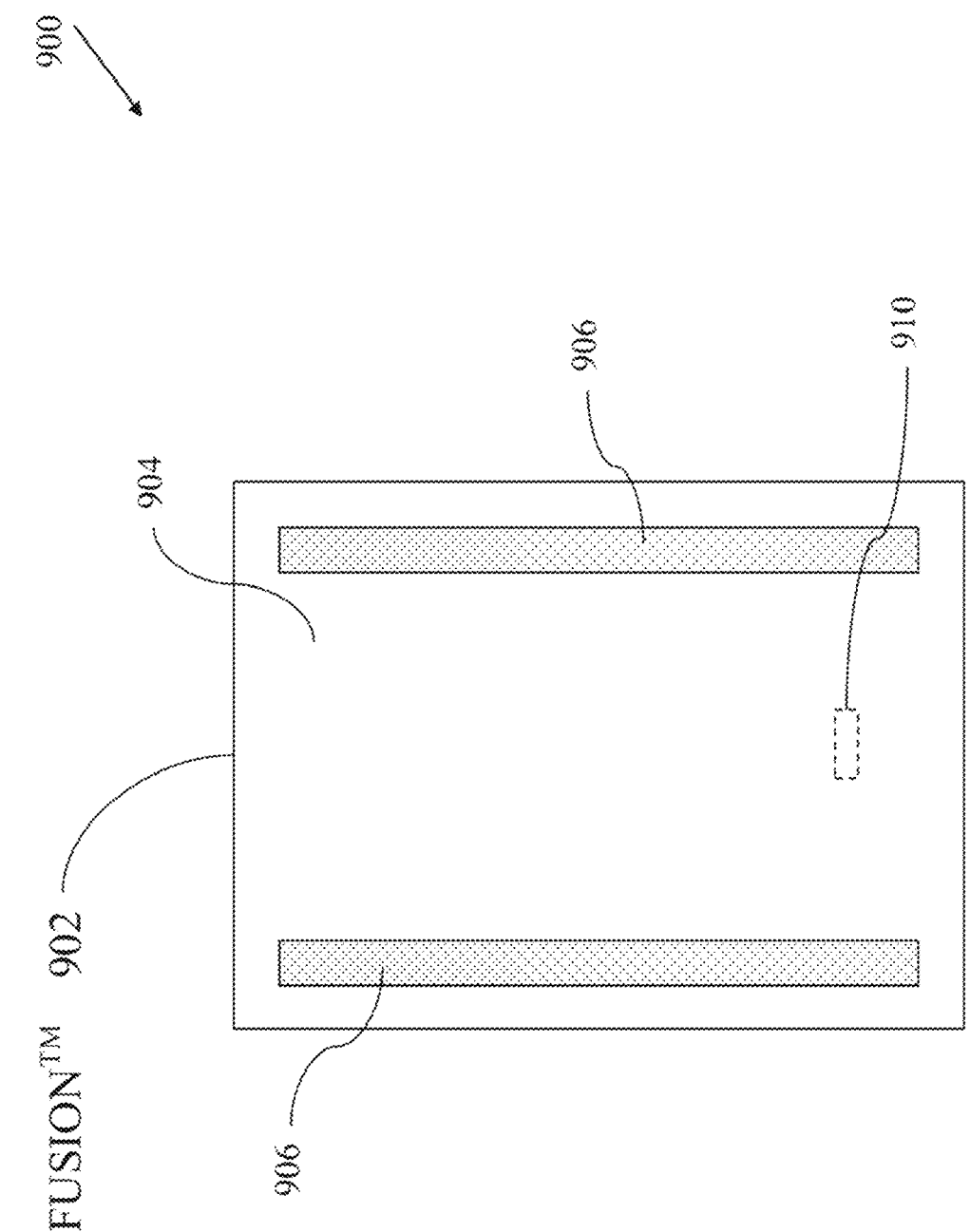
FIG. 9 illustrates displaying information within a vanishing viewing window of a mirror referred to as FUSION™ by ELECTRIC MIRROR, LLC, according to embodiments of the invention.

FIG. 9 illustrates, generally at 900, displaying information within a vanishing viewing window of a mirror referred to as FUSION™, by ELECTRIC MIRROR, LLC, according to embodiments of the invention. With reference to FIG. 9, an example of the FUSION™ lighted mirror is illustrated at 902. The mirror 902 has a reflective area 904 and a backlight areas 906 configured as a frosted area etched by a laser in various embodiments. In other embodiments the backlit areas 906 are configured with uniform frosted regions which can be sand blasted or frosted by other means. Backlight areas 906 can be made from a frosted area of glass which is lit either directly or indirectly from behind the mirror 902. A vanishing viewing window 910 is located within the reflective area 904. In alternative embodiments, the vanishing viewing window 910 can be located anywhere in the reflective area 904. Embodiments of the invention are applicable to other sizes and shapes of the FUSION™ lighted mirror from ELECTRIC MIRROR, LLC. The example provided in FIG. 9 is merely for illustration and does not limit embodiments of the invention as applied to other mirrors currently available from ELECTRIC MIRROR, LLC or mirrors yet to be designed.

Figure 10:
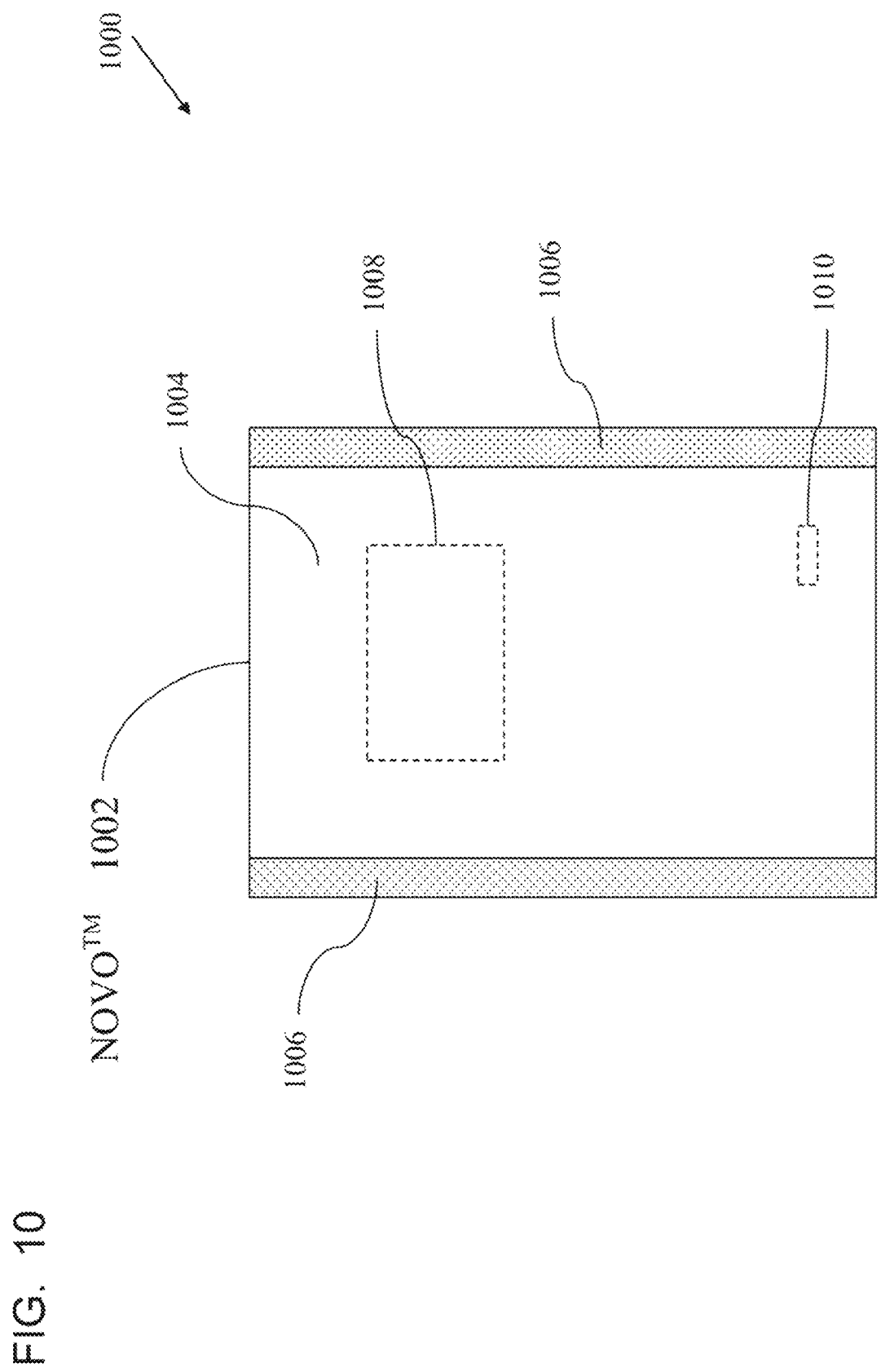
FIG. 10 illustrates displaying information within a vanishing viewing window of a mirror referred to as NOVO™ by ELECTRIC MIRROR, LLC, according to embodiments of the invention.

FIG. 10 illustrates, generally at 1000, displaying information within a vanishing viewing window of a mirror referred to as NOVO® by ELECTRIC MIRROR, LLC, according to embodiments of the invention. With reference to FIG. 10, the example of the NOVO™ lighted mirror illustrated at 1002 is a lighted mirror TV. In other embodiments of the NOVO™ the TV need not be included. The TV location at 1008 is included here to illustrated that vanishing viewing windows can be included in a mirror with a TV and in some cases are actually TVs themselves. The mirror 1002 has a reflective area 1004 backlight areas 1006 configured as frosted areas etched by a laser in various embodiments, and the TV location at 1008. In other embodiments, the backlit areas 1006 are configured with a uniform frosted region which can be sand blasted or frosted by other means. Backlight areas 1006 can be made from a frosted area of glass which is lit either directly or indirectly from behind the mirror 1002.

A vanishing viewing window 1010 is located within the reflective area 1004. In alternative embodiments, the vanishing viewing window 1010 can be located anywhere in the reflective area 1004. A vanishing viewing widow 1008 is sized for an information display, such as is known in the art as a flat panel display or when configured with a television tuner such is often referred to as a television (TV). Thus, embodiments of the invention are applicable to other sizes and shapes of the NOVO™ lighted mirror from ELECTRIC MIRROR, LLC as well as other mirror TVs. The example provided in FIG. 10 is merely for illustration and does not limit embodiments of the invention as applied to other mirrors or mirror TVs currently available from ELECTRIC MIRROR, LLC or mirrors and mirror TVs yet to be designed.

Figure 11:
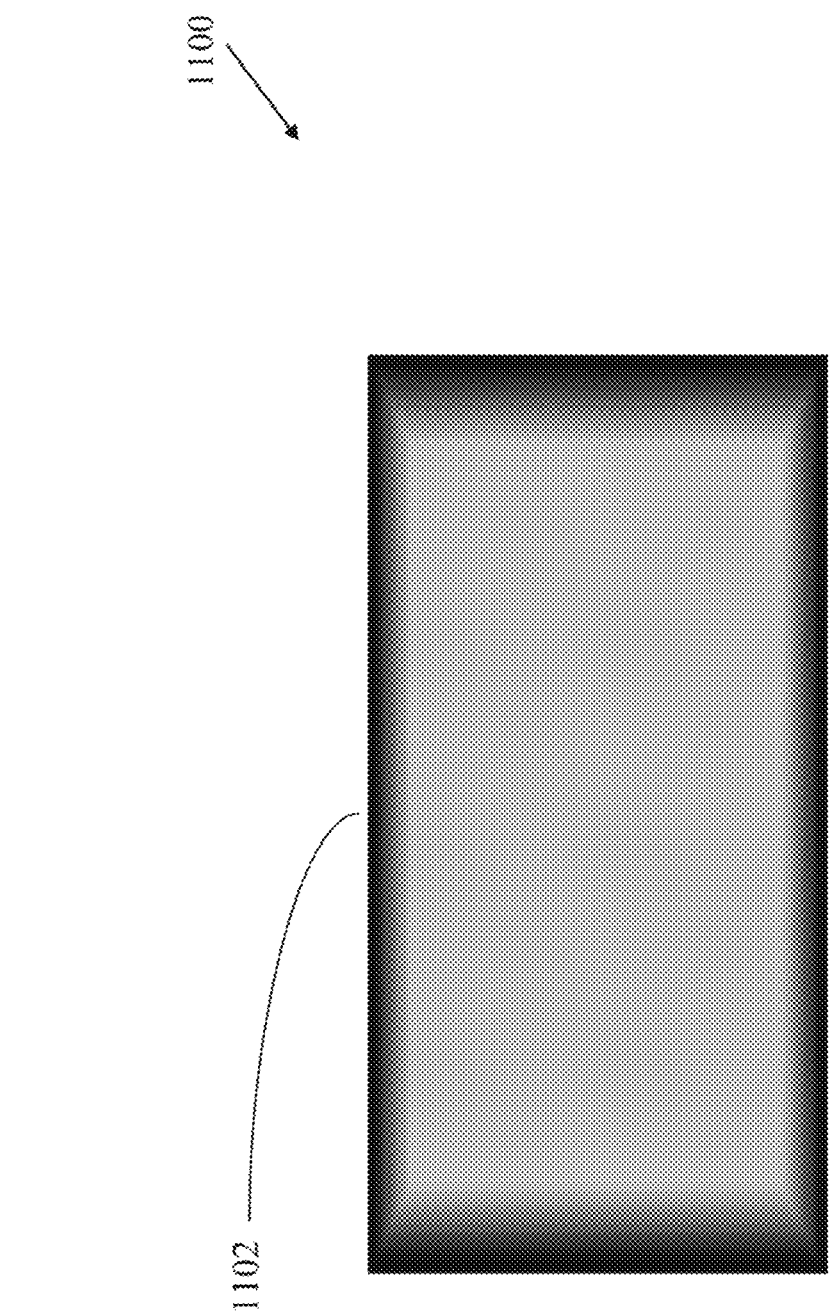
FIG. 11 illustrates a first grey scale image pattern, according to embodiments of the invention.

FIG. 11 illustrates, generally at 1000, a first grey scale image pattern, according to embodiments of the invention. With reference to FIG. 11, a grey scale image pattern at 1102 is used as an input to a process which creates a vanishing viewing window within a mirror.

Figure 12:
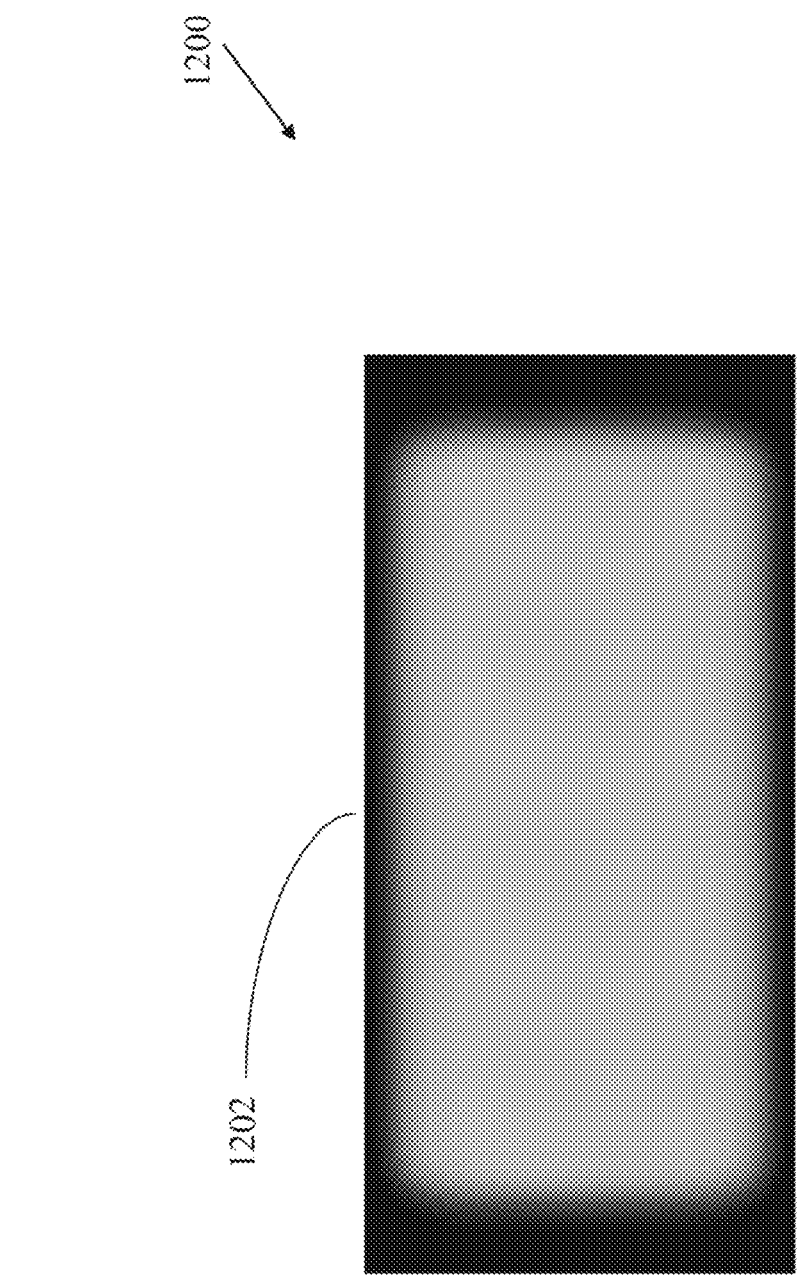
FIG. 12 illustrates a second grey scale image pattern, according to embodiments of the invention.

FIG. 12 illustrates, generally at 1200, a second grey scale image pattern, according to embodiments of the invention. With reference to FIG. 12, a grey scale image pattern at 1202 is used as an input to a process which creates a vanishing viewing window within a mirror.

Figure 13:
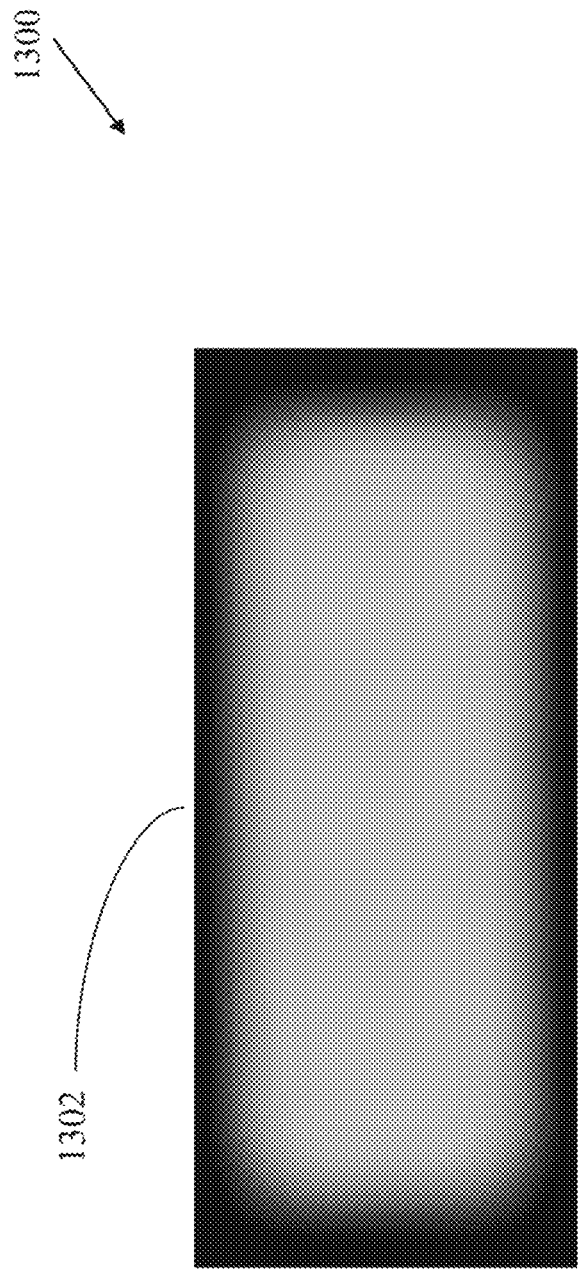
FIG. 13 illustrates a third grey scale image pattern, according to embodiments of the invention.

FIG. 13 illustrates, generally at 1300, a third grey scale image pattern, according to embodiments of the invention. With reference to FIG. 13, a grey scale image pattern at 1302 is used as an input to a process which creates a vanishing viewing window within a mirror.

Figure 14:
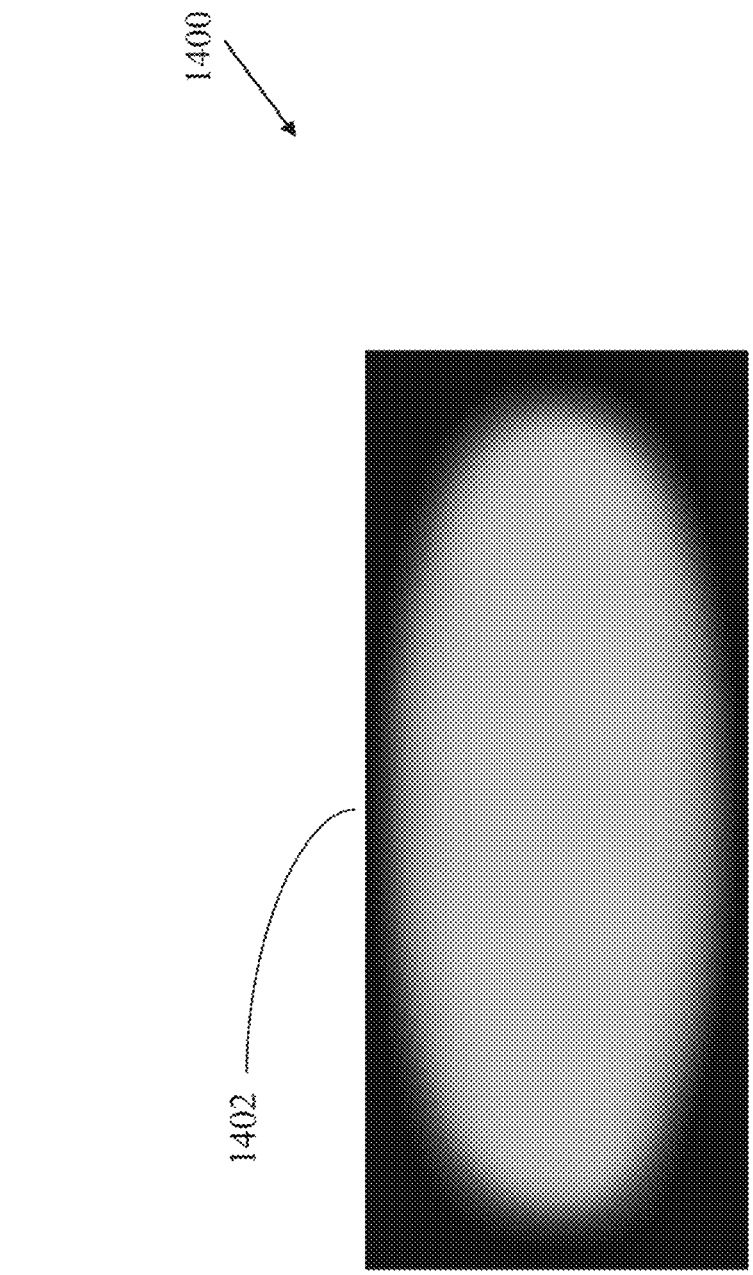

FIG. 14 illustrates, generally at 1400, a fourth grey scale image pattern, according to embodiments of the invention. With reference to FIG. 14, a grey scale image pattern at 1402 is used as an input to a process which creates a vanishing viewing window within a mirror.

Figure 15:
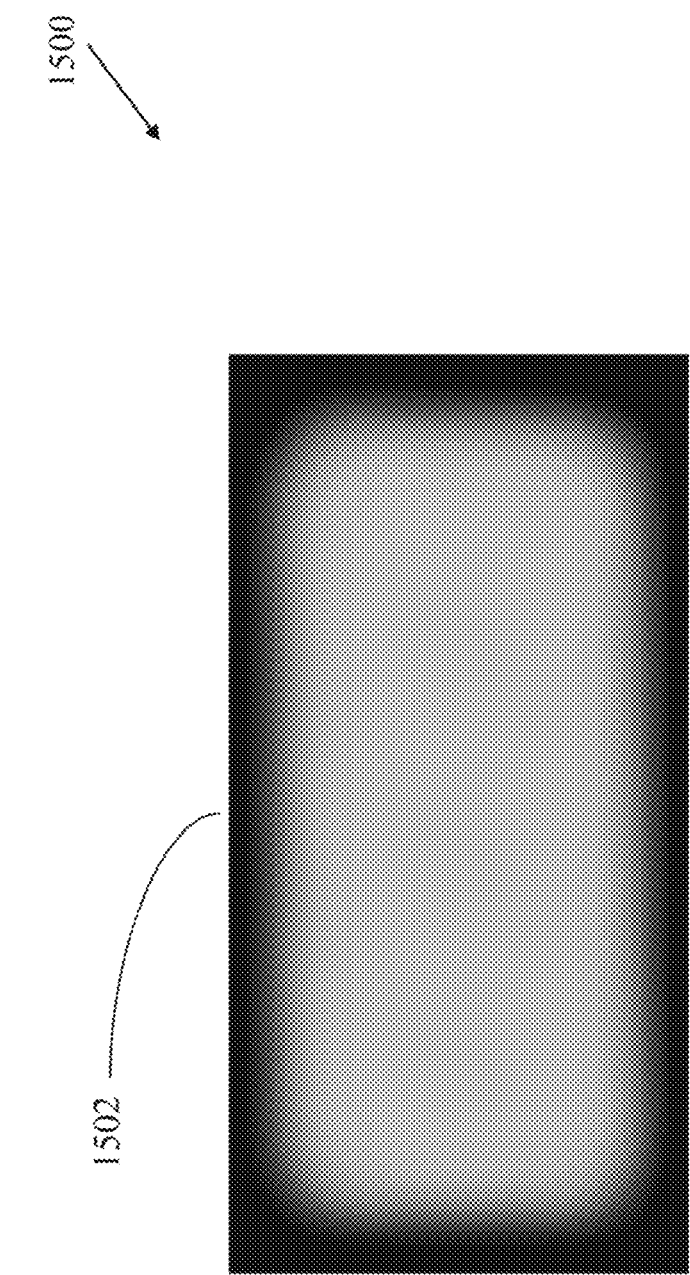
FIG. 15 illustrates a fifth grey scale image pattern, according to embodiments of the invention.

FIG. 15 illustrates, generally at 1500, a fifth grey scale image pattern, according to embodiments of the invention. With reference to FIG. 15, a grey scale image pattern at 1502 is used as an input to a process which creates a vanishing viewing window within a mirror.

Figure 16:
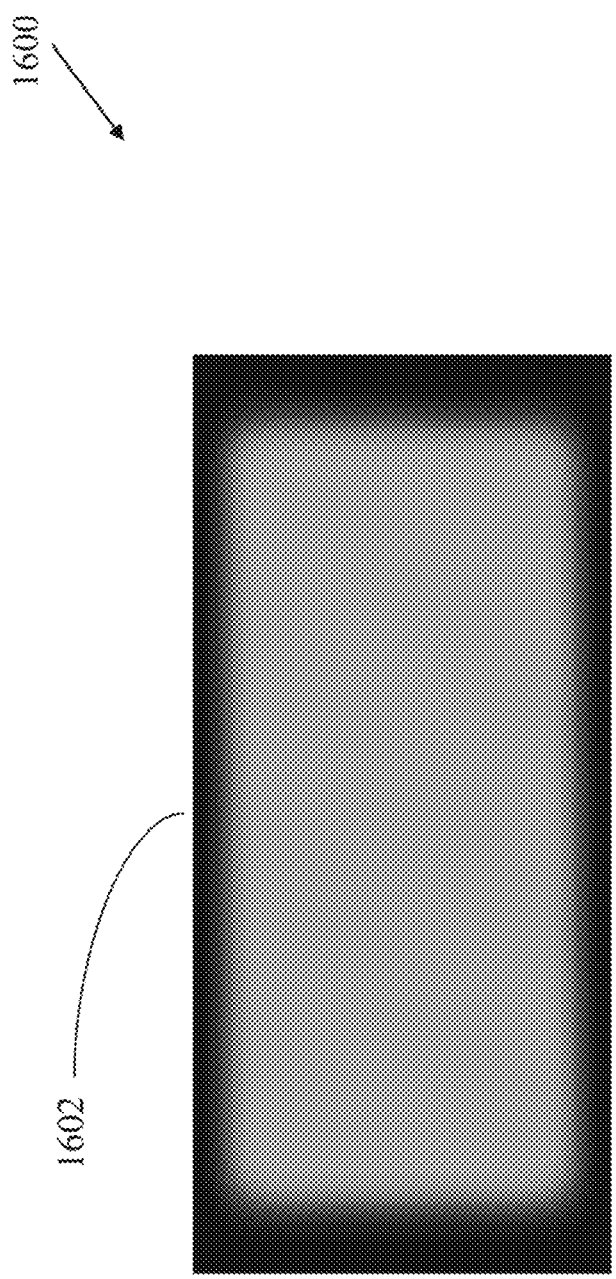
FIG. 16 illustrates a sixth grey scale image pattern, according to embodiments of the invention.

FIG. 16 illustrates, generally at 1600, a sixth grey scale image pattern, according to embodiments of the invention. With reference to FIG. 16, a grey scale image pattern at 1602 is used as an input to a process which creates a vanishing viewing window within a mirror. As illustrated in FIG. 11 through FIG. 16, any grey scale image can be used as an input to a process used to create the vanishing viewing window in a mirror. The images illustrated in FIG. 11 through FIG. 16 are provided merely for illustration and do not limit embodiments of the invention. In FIG. 17 through FIG. 21, which follow, a description is given in the context of creating a vanishing viewing window for the display of time therein with a halftone dot pattern. Note that the same techniques are applied to the display of other data in a vanishing viewing window as well. No limitation is intended by the description of communicating time within the vanishing viewing window with the halftone dot pattern.

Figure 17:
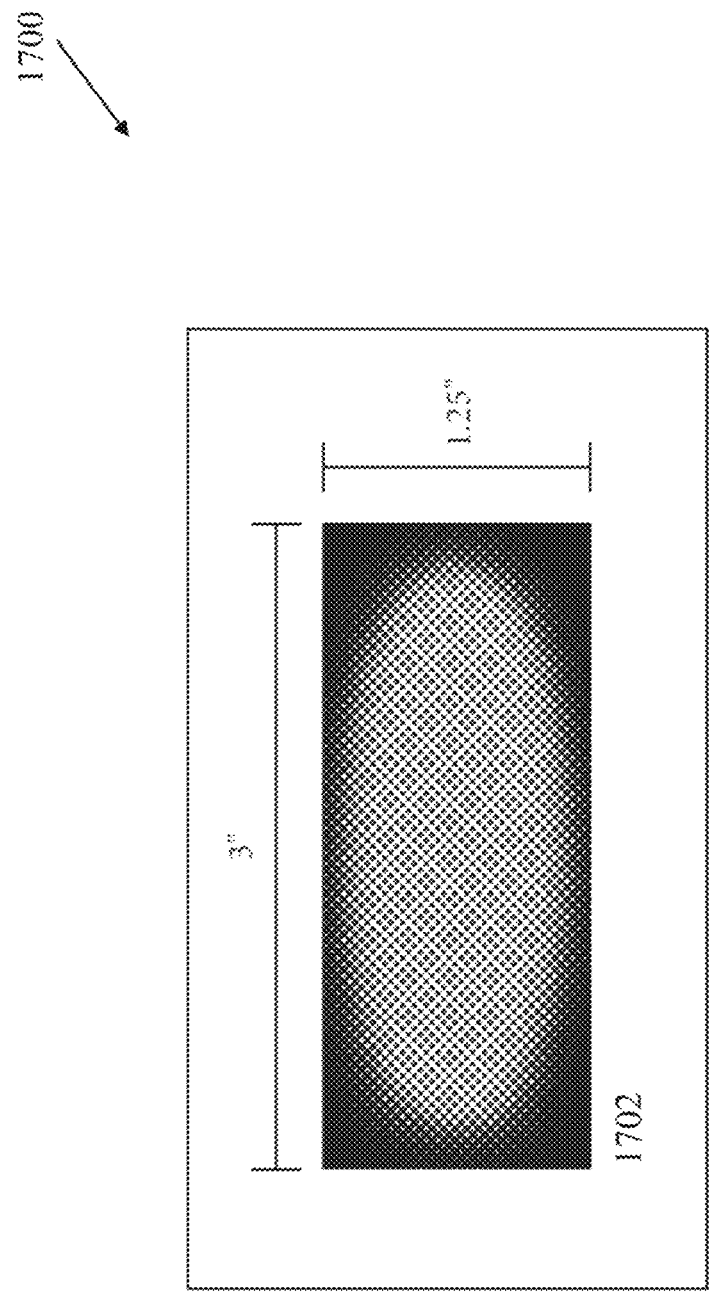
FIG. 17 illustrates a halftone dot pattern generated from a grey scale image, according to embodiments of the invention.

FIG. 17 illustrates, generally at 1700, a halftone dot pattern generated from a grey scale image such as for example a halftone dot pattern similar to one of the images illustrated in FIG. 11 through FIG. 16 above. With reference to FIG. 17, the halftone dot pattern shown at 1702 has been rendered at a screen resolution of approximately fifty (50) lines per inch (lpi). The term "lines per inch" or "lpi" is used to designate a spacing between dots of the halftone pattern. Within a given halftone pattern, the size of a dot can vary as well as placement of the dot within a pattern. Dithering can be used in some embodiments to contribute to this variation by changing dot size and or dot placement within a halftone dot pattern. The halftone dot pattern shown in FIG. 17 is typically an intermediate step in the process of producing a dot pattern on a mirror by removing the reflective silver layer and any other reflective layers, e.g., paint, copper, etc. from the glass of the mirror in order to create the vanishing viewing window. In one embodiment, the vanishing viewing window measures three inches by 1 and one-quarter inches as indicated in the figure.

Figure 18:
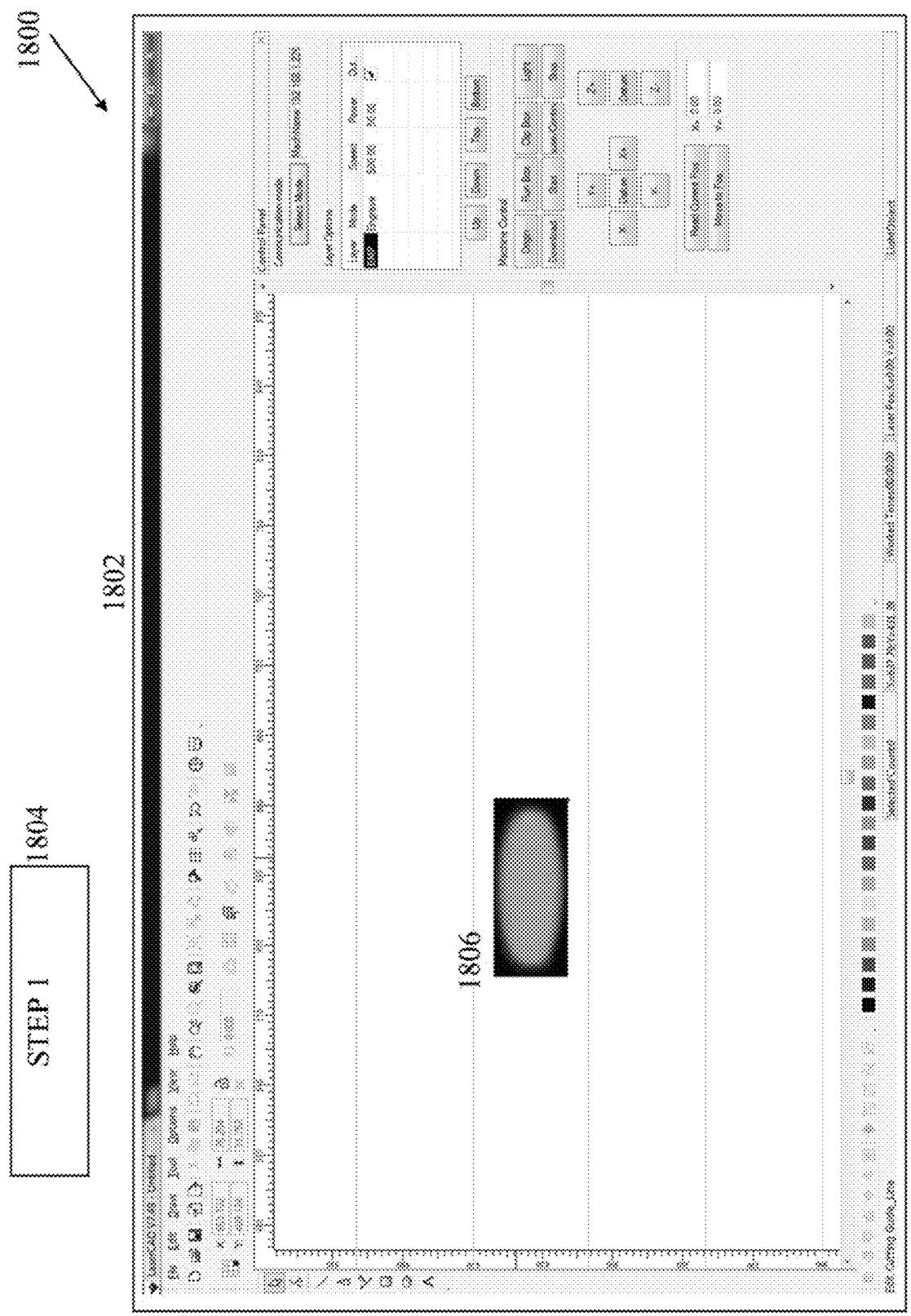
FIG. 18 illustrates a first step of a process to create a halftone pattern on a mirror, according to embodiments of the invention.

FIG. 18 illustrates, generally at 1800, a first step of a process to create a halftone pattern on a mirror, according to embodiments of the invention. With reference to FIG. 18, a data processing system is used to process a grey scale image into a halftone dot pattern. Step 1 of a process is indicated at 1804 where a development environment (software application) is indicated at 1802. In step 1, a grey scale image is loaded as indicated at 1806 into the software application running on the data processing system.

Figure 19:
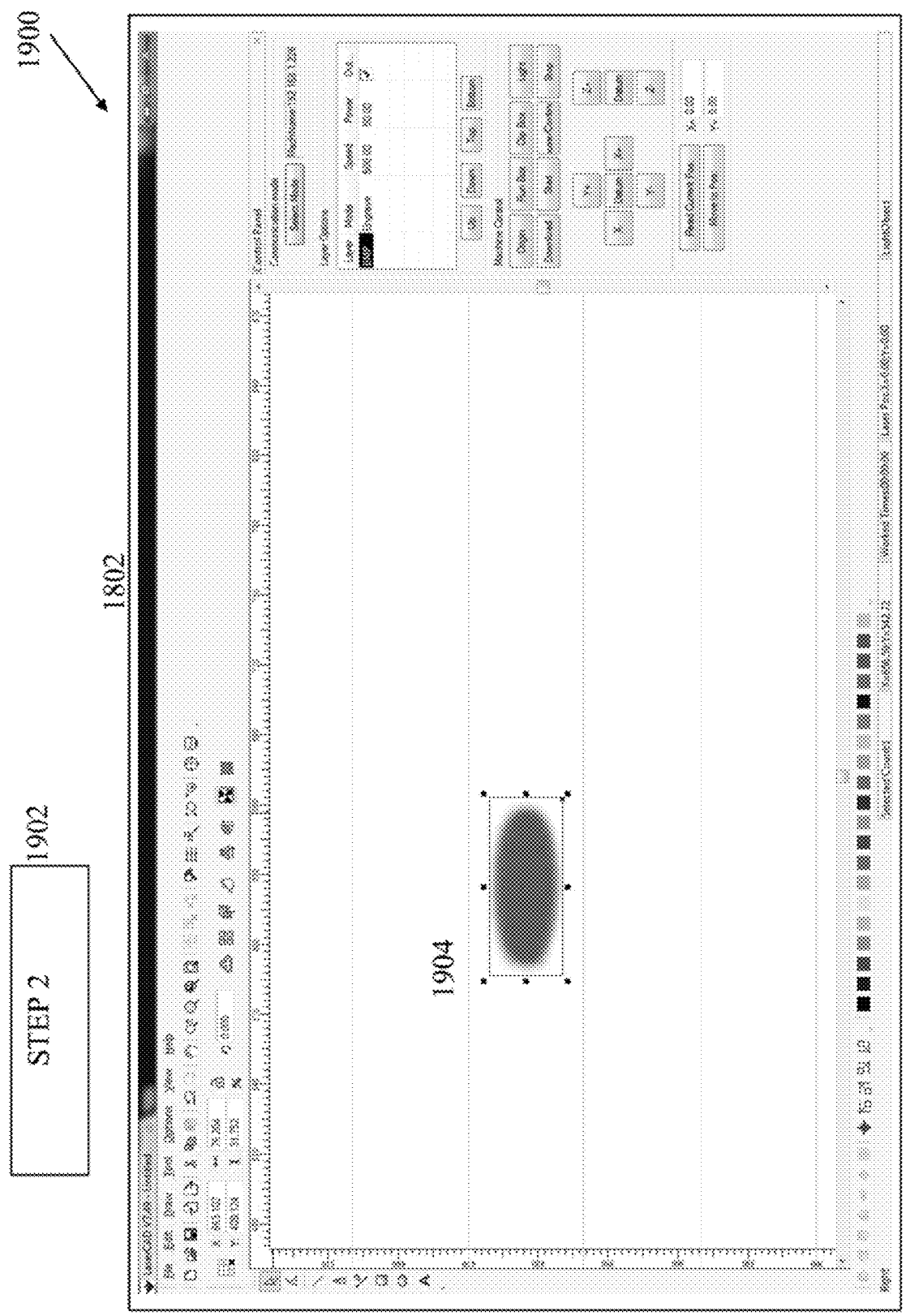
FIG. 19 illustrates a second step of a process to create a halftone pattern on a mirror, according to embodiments of the invention.

FIG. 19 illustrates, generally at 1900, a second step of a process to create a halftone pattern on a mirror, according to embodiments of the invention. With reference to FIG. 19, a second step of the process is indicated at 1902 which involves inversion of a grey scale image. When grey scale images (made using two colors, black and white) are used in printing or image creation, usually black is added to a white background, as was done with the images presented in FIG. 11 through FIG. 16. In the present application of using a halftone pattern to create a dot pattern in a mirror rather than depositing the color black against a white background, the reflective area of the mirror is analogous to the color block which is already in existence on the mirror and the regions where the reflective layer is to be removed are equivalent to white. In this case, white corresponds to transmission of light from the clock display which is mounted behind the mirror glass. Mounting the clock display on a mirror and transmission of light therefrom is explained more fully below in the figures that follow. The grey scale image shown at 1804 (FIG. 18) is inverted in step 2 and is displayed at 1904 (FIG. 19).

Figure 20:
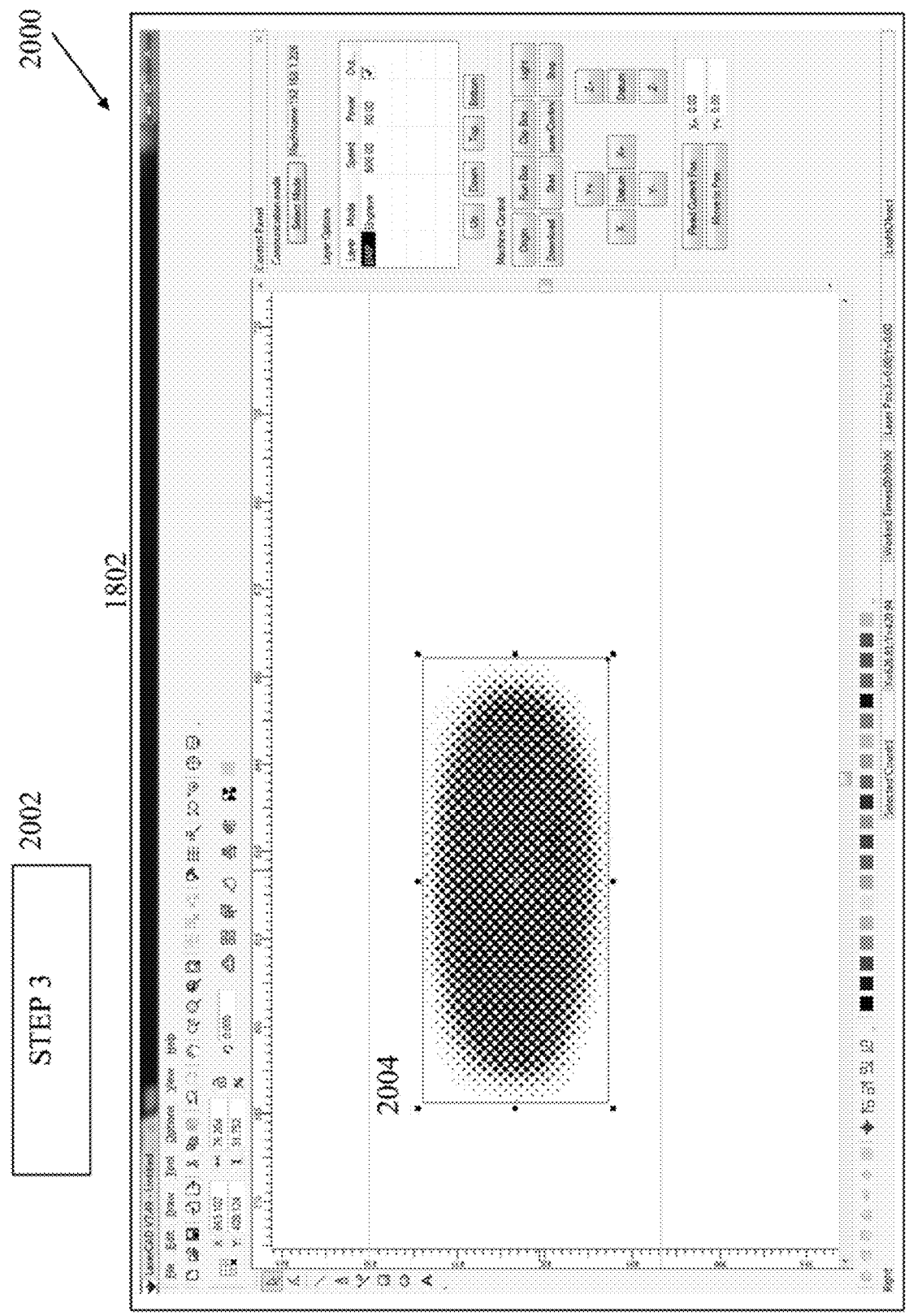
FIG. 20 illustrates a third step of a process to create a halftone pattern on a mirror, according to embodiments of the invention.

FIG. 20 illustrates, generally at 2000, a third step of a process to create a halftone pattern on a mirror, according to embodiments of the invention. With reference to FIG. 20, a third step 2002 renders, within the development environment 1802, a halftone dot pattern 2004 from the inverted image 1904 (FIG. 19). Optionally, dithering can be applied to the halftone dot pattern 2004 to smooth edge effects within the dot pattern. Note that the goal of the process will ultimately be to strike a compromise between being able to see a time display from behind the mirror (when the clock is in an "ON" state) without totally obscuring the mirror function from the vanishing window (when the clock is in an "OFF" state). Therefore, smoothing edge effects within the dot pattern can result in the image being interpreted in the eye of an observer as being more smooth and continuous and less abrupt and "sharp" thereby accomplishing the dual functions required of the vanishing viewing area within the mirror.

Figure 21:
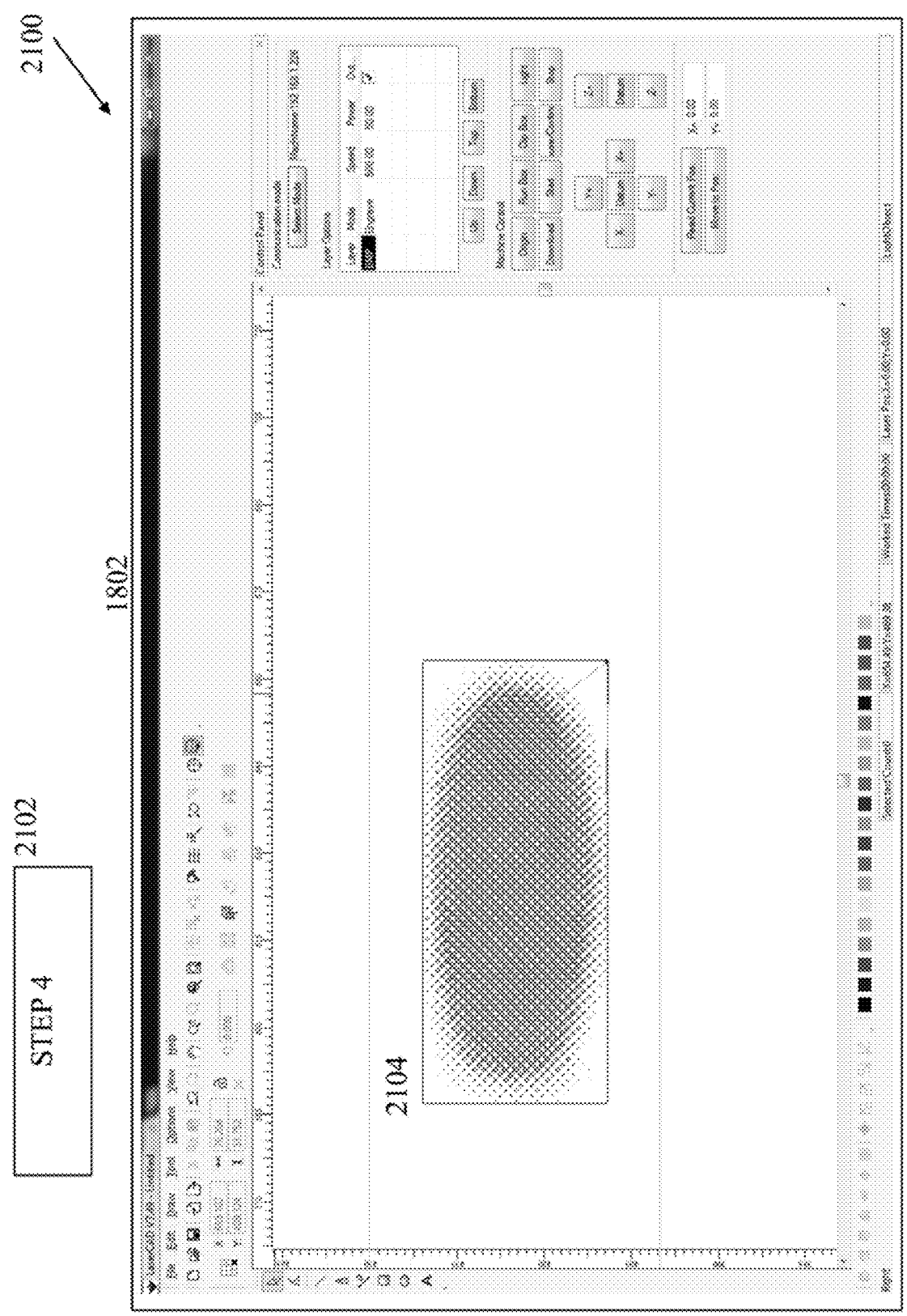
FIG. 21 illustrates a fourth step of a process to create a halftone pattern on a mirror, according to embodiments of the invention.

FIG. 21 illustrates, generally at 2100, a fourth step of a process to create a halftone pattern on a mirror, according to embodiments of the invention. With reference to FIG. 21, a fourth step 2102 simulates at 2104 what the actual mirror will look like when the reflective layer of the mirror has been removed using the dot pattern of 2104. The laser beam will be controlled by the laser system as described in the figures above to remove reflective layer using the dot pattern of 2104; where the colored portion of 2104 represents substantially clear glass (with reflective layer having been removed) and the white portion represents areas where reflective layer has not been removed. The rectangular box around the image at 2104 is only used to identify a location of the image in the software development environment and does not appear in the mirror.

Figure 22:
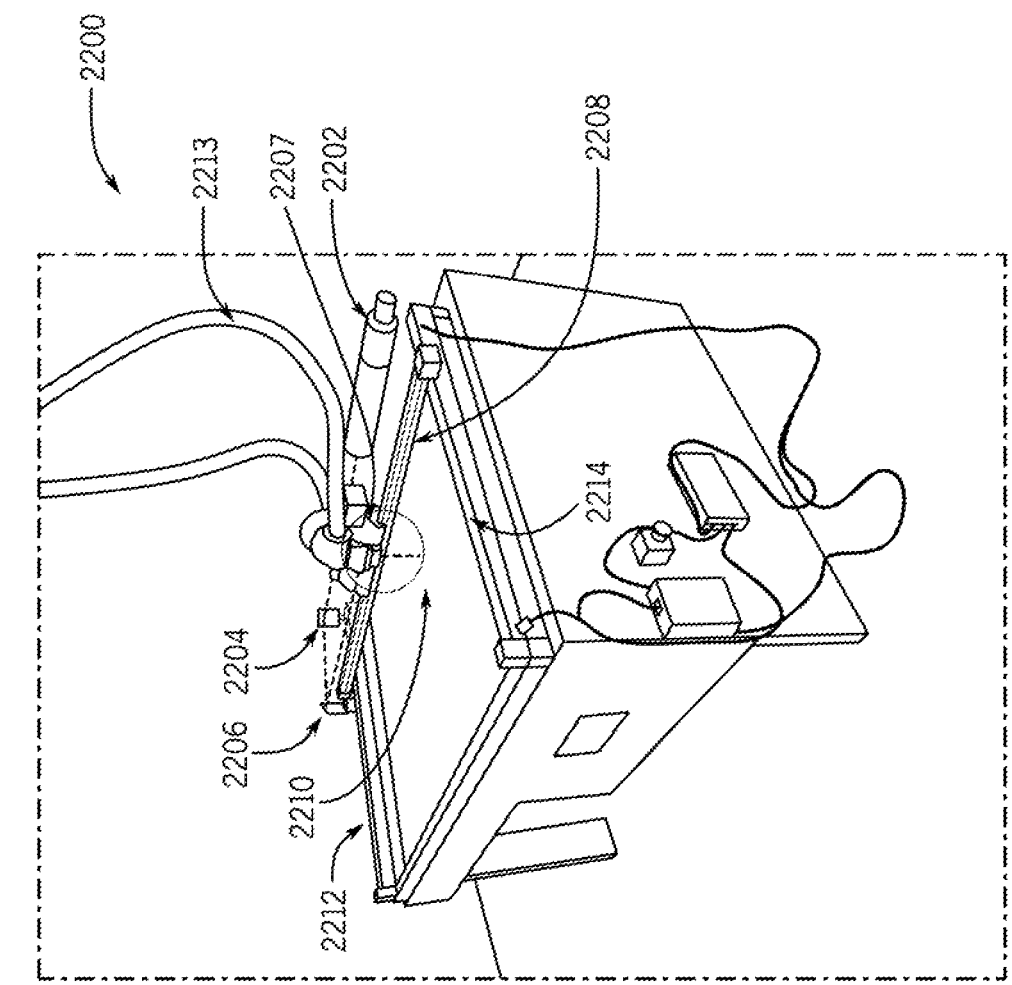
FIG. 22 illustrates a photo of a laser system, according to embodiments of the invention.

FIG. 22 illustrates, generally at 2200, a photograph of a laser system, according to embodiments of the invention. With reference to FIG. 22, a laser system includes a laser 2202, a first mirror 2204, a second mirror 2206, and a moving head 2207. The moving head 2207 includes a third mirror (not shown) and a hose to remove vapor that is generated when the laser beam contacts the mirror causing removal of the reflective layer(s) from the glass. Note that the term "reflective" layer or layers is used herein to refer to the one or more layers applied to a layer of glass that interferes with transmission of light through the glass. The moving head 2207 translates on a rail 2208. The rail 2208 translates on rails 2212 and 2214. A laser beam is directed by the mirrors 2204, 2206, and 2207 to a target 2210. The target 2210 is a mirror being processed to produce a vanishing viewing window therein by selective removal of the reflective layer(s) as described above. Exhaust hose 2213 evacuates gas given off during the interaction of the laser beam with the layers on the back side of the mirror during etching or cutting. In some embodiments the laser beam penetrates through the layers on the backside of the mirror to interact with the glass thereby producing micro fractures and a resulting etched look. Etching glass with a laser as described herein is used in some embodiments to provide a frosted look for a backlight area in a mirror. In some embodiments etching the mirror glass is done on a front side of the mirror. The system of 2200 is described more fully below in conjunction with FIG. 23A and FIG. 23B.

Figure 23A:
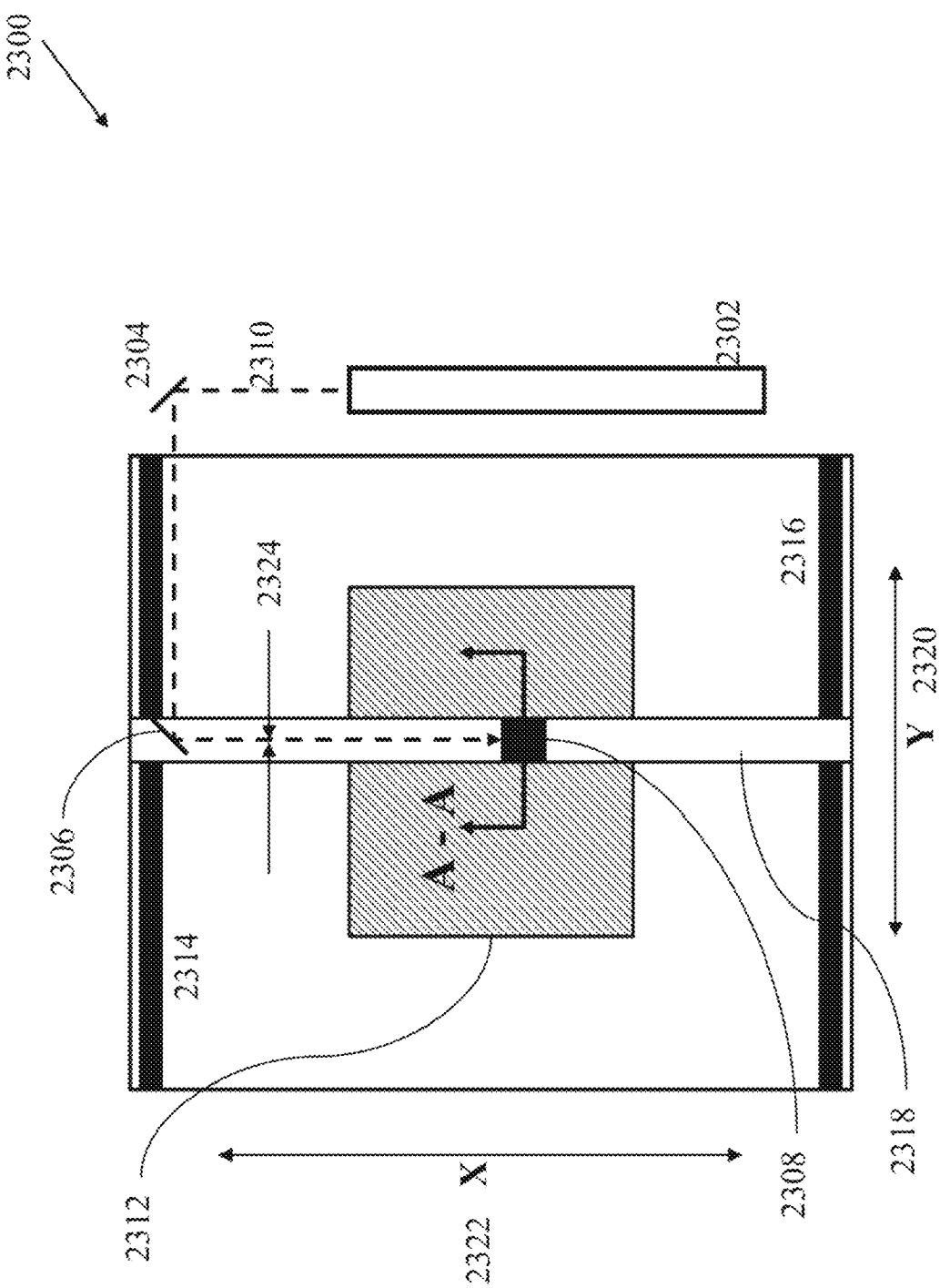
FIG. 23A illustrates a top view of a laser system, according to embodiments of the invention.
Figure 23B:
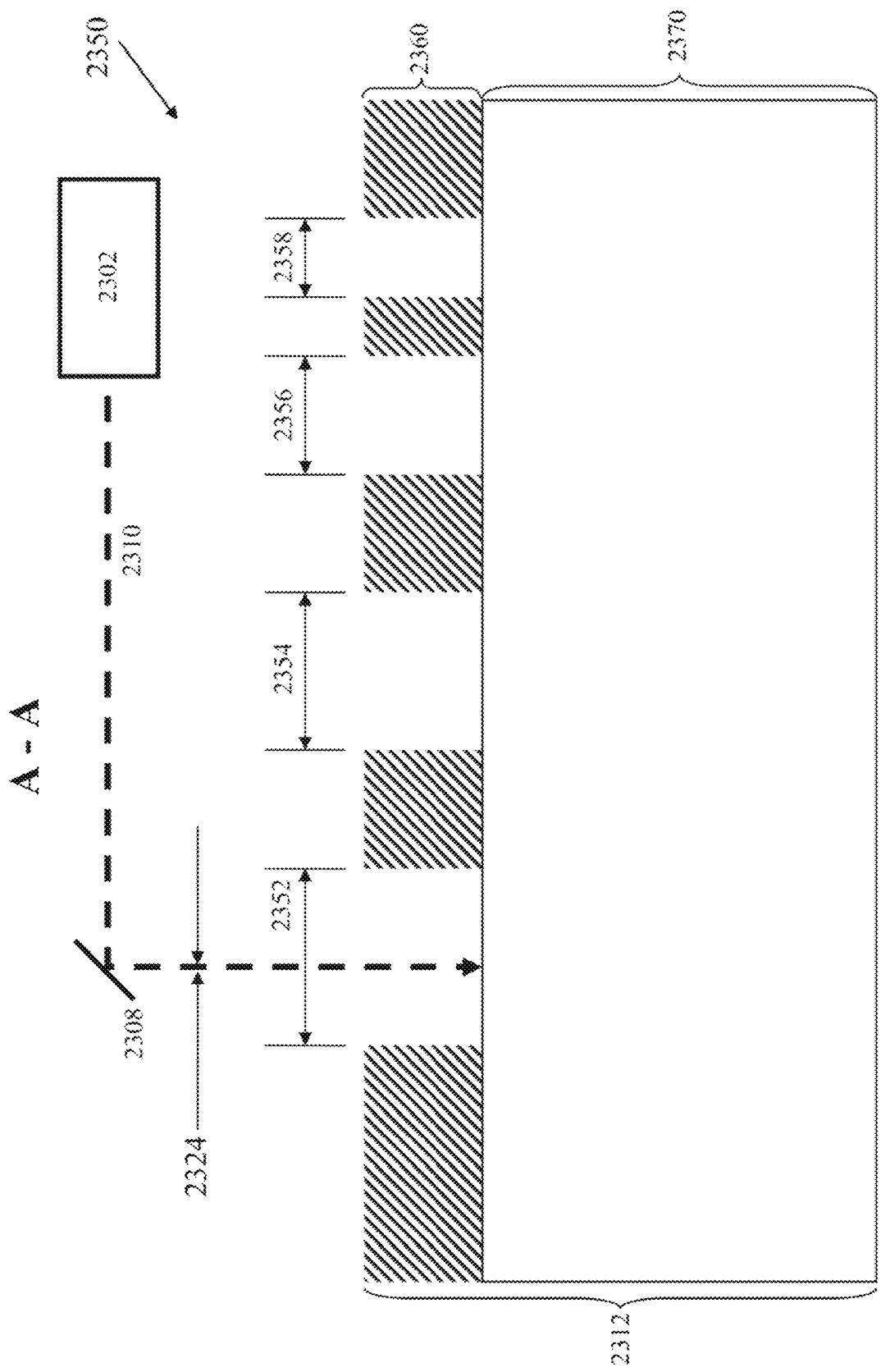
FIG. 23B illustrates a cross-sectional view corresponding to FIG. 23A, according to embodiments of the invention.

FIG. 23A illustrates, generally at 2300, a top view of a laser system, according to embodiments of the invention. FIG. 23B illustrates, generally at 2350, a cross-sectional view corresponding to FIG. 23A, according to embodiments of the invention. Referring now to FIG. 23A and FIG. 23B collectively, a laser 2302 emits a beam of light 2310. The beam of light 2310 is reflected off of a first mirror 2304, which is in turn reflected off of a second mirror 2306, which is then reflected off of a third mirror 2308 down onto the target 2312. The beam of light 2310 has a nominal beam diameter indicated at 2324. Note that the beam diameter 2324 widens with distance from the laser 2310. The target 2312 is a mirror being processed for the creation of a vanishing viewing window for the display of data (alphanumeric, graphics, video) by way of which information such as time-of-day, temperature, weather, news, sports, financial information, etc. is communicated to a user viewing the mirror from the front side.

In one embodiment, creation of a halftone dot pattern, for example 2104 as illustrated in FIG. 21, requires moving the beam of light 2310 over an area of the surface of the target 2312. Moving the beam of light 2310 is facilitated by translation of the third mirror 2308 along the rail 2318, which is along the X axis as indicated at 2322. In one or more embodiments dual rails are used for X axis translation of the third mirror 2308. Dual rails reduce vibration of the third mirror 2308 which increases the accuracy of the etching process in the target 2312. Similarly, the rail 2318 is translated along the Y axis 2320 using a rail 2314 and a rail 2316.

The mirror 2312 has a glass layer 2370 and one or more reflective layers indicated collectively as 2360. The view presented in FIG. 23B is a cross sectional view A-A from FIG. 23A Note therefore, that a line such as 2352 extends into the page to provide an area Thus, areas 2352, 2354, 2356, and 2358 represent a plurality of areas where the reflective layer has been removed by the laser beam 2310. Note also that one or more of these areas, e.g., 2352, 2354, 2356, and 2358 may be connected together but that such connectivity is not illustrated in the cross-sectional view presented in 2350. The laser system includes a processor, which can be a digital signal processor (DSP). The processor is configured to receive as input a file which specifies an area of the target 2312 to be illuminated with the laser beam 2310. The system includes actuators to move the rail 2318 and the third mirror 2308 in the Y and X directions respectively. All of which are controlled by the processor in response to the details of the input file. The input file can be provided in different formats. For example, in one or more embodiments a file is input according to the Drawing Exchange Format (DXF) format or the file can be input as an image file where X, and Y coordinates are specified therein corresponding to locations in the image.

In various embodiments, different lasers are used to provide the laser 2302 and the beam 2310. In one or more embodiments, the laser 2302 is a $CO_2$ laser as is known in the art. In one or more embodiments, a wavelength of a $CO_2$ laser is 10,600 nanometers operating at a power level of 80 watts (W). The laser beam 2310 can be focused to a width as indicated at 2324. In one or more embodiments, the width 2324 is in a range of 0.1 millimeter to 0.15 millimeter. $CO_2$ lasers are suited for applications where it is desired to remove reflective layers from glass. In other embodiments, other types of lasers can be used to remove the reflective layers from glass such as, but not limited to, a solid state laser, a fiber optic laser, a YAG laser, etc.

In some embodiments, the laser 2302 is located on the rail structure 2318. When the laser 2302 is mounted to the rail structure 2318 it does not translate in the X direction 2322. The laser 2302 translates with the rail structure 2318 in the Y direction 2320. Locating the laser 2302 on the rail structure 2318 shortens a path length between the laser 2302 and the target 2312. An advantage of such a configuration is that a width 2324 of the laser beam can be reduced to approximately 0.05 of a millimeter by moving the laser to the moving structure 2318.

In one or more embodiments, the laser 2302 is $CO_2$ based with either a direct current (DC) tube or a radio frequency (RF) laser. In some embodiments, the laser tube is water cooled and operated at 35,000 volts direct current (VDC).

The H configuration of the apparatus shown in 2200 and 2300 permits very high speed moving head speeds of three (3) meters per second. In one or more embodiments, linear belt actuators from Misumi are used for translation. In one or more embodiments, Clearpath Teknic servo motors are used which are capable of achieving encoder resolution of over 6400 pulses per rotation of the motor shaft. The motors are mechanically coupled to the belt actuators via a gear box. This combination of linear control provides smooth fast motion with high precision along the X and Y axes.

In operation of the motors, an algorithm is executed by the processor, which in conjunction with actuators, cause the third mirror 2308 to translate over the target 2312 as described above. The algorithm is used to vary the translation speed of the laser beam 2310, the power level that the laser 2302 is operated at, and a pulse pattern of the beam 2310 in order to remove reflective layer 2360 from the plurality of areas as represented by 2352, 2354, 2356, and 2358. In one or more embodiments, after the beam 2310 has been moved over the target 2312 by the system a vanishing viewing window is left in a mirror which has resulted in the removal of a reflective layer(s) from the glass layer. One example of which is shown at 2104 in FIG. 21 and at 406 in FIG. 4A and FIG. 4B. In various embodiments, different input grey scale images are used as inputs to the system to produce different vanishing viewing windows within mirrors. The grey scale images shown herein and an example of reflective layer removal 2104 (FIG. 21) are provided merely for illustration and do not limit embodiments of the invention. An unlimited number of different vanishing viewing windows can be made using embodiments of the invention.

The laser etching system operates in two modes, engraving mode and cutting mode. In cutting mode, the laser beam stays on and the laser power is varied as the head translates over the mirror surface. The power level is varied as a function of position along the track in order to maintain consistency of the cut quality. For example, with respect to X axis translation, at each end of the track the head changes direction, therefore the power level is adjusted (lowered) as the head changes direction so that a uniform energy is imparted to the mirror being etched along the track length. This variation of power level produces a uniform removal of backing layers and reflective layers as the laser beam burns away these layers.

The other mode, engraving mode, turns the laser beam on and off while maintaining a constant power level to the laser. Engraving mode operates at a lower power level than the power level used for cutting mode. In various non-limiting embodiments the laser is operated at ten percent (10%) of full power during engraving mode while the head speed can run at 1 meter per second, 1.5 meter per second up to the maximum actuator speed of three (3) meters per second. Other embodiments can operate at high translational speeds. The examples provided herein are provided merely for illustration and do not limit embodiments of the invention.

Figure 23C:
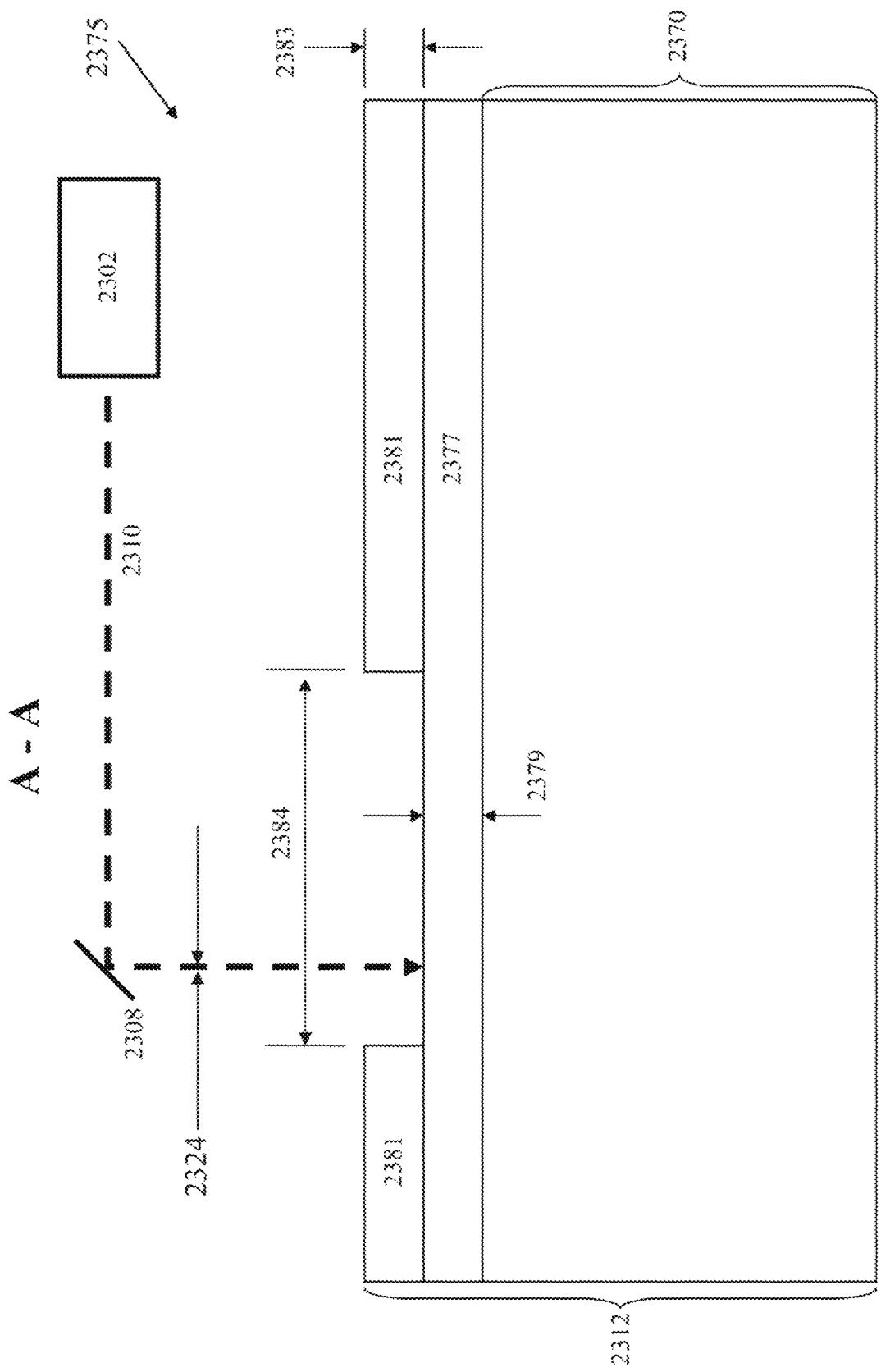
FIG. 23C illustrates removing a protective layer, according to embodiments of the invention.

FIG. 23C illustrates, generally at 2375, removing a protective layer, according to embodiments of the invention. With reference to FIG. 23C, the mirror 2312 from FIG. 23B is used to illustrate creating a vanishing viewing window which has smooth transitions around a perimeter of the vanishing viewing window with the rest of the reflective area of the mirror as described above in conjunction with the previous figures. A laser beam 2324 is operated in engraving mode, as described above, wherein the laser is operated at low power making multiple passes over a width 2384 of a vanishing viewing window. In operation, the laser beam 2324 removes the protective layer 2381 (or a portion thereof) from the width 2384 of the vanishing viewing window during each pass of the laser beam. Care is taken during the layer removal process to only remove the backing layer 2381 (also referred to herein as the backing layer(s)) from the mirror 2312. A reflective layer 2377 of the mirror 2312 is not removed during engraving mode. The reflective layer 2377 is left intact so that the vanishing viewing window has a smooth transition with the rest of the reflective are of the mirror 2312. In some embodiments, a thickness 2379 of the reflective layer is left intact to provide the smooth transition. In some embodiments, the thickness 2379 is less than an original thickness of the reflective layer; however enough reflective layer thickness 2379 remains to provide the desired smooth transition with the rest of the reflective layer of the mirror.

FIG. 23D illustrates, generally at 2390, overlapping successive laser beam paths, according to embodiments of the invention. With reference to FIG. 23D, a laser beam 2391 has a width 2392 at a target position where etching will occur. In operation, an overlap percentage is utilized between successive passes of the laser beam across the target to ensure uniformity during layer removal. Vibration of the system can cause beam wander resulting in positional error at the target. It is undesirable to miss an area of the target due to these errors at placing the beam on the target; therefore overlapping beams ensures removal of the layer of interest. Different overlap percentages can be utilized.

In one or more embodiments, a 50% overlap is utilized. A first pass of the laser beam 2391 over a target is indicated by 2393. A second pass of the laser beam 2391 over the target is indicated by 2394. Note the overlap in the Y direction. Similarly, a third pass of the laser beam over the target is indicated by 2395. A fourth pass of the laser beam across the target is indicated by 2396. Note that in cutting mode the region indicated by 2394 and 2395 (4 passes) would be clear of layers resulting in an etched glass surface. In engraving mode the 4 passes would have reduced layer thickness.

Typically, in order to achieve precise control and design details during vanishing window creation in a mirror engraving mode requires hundreds of thousands of passes to achieve the engraved look.

Figure 24A:
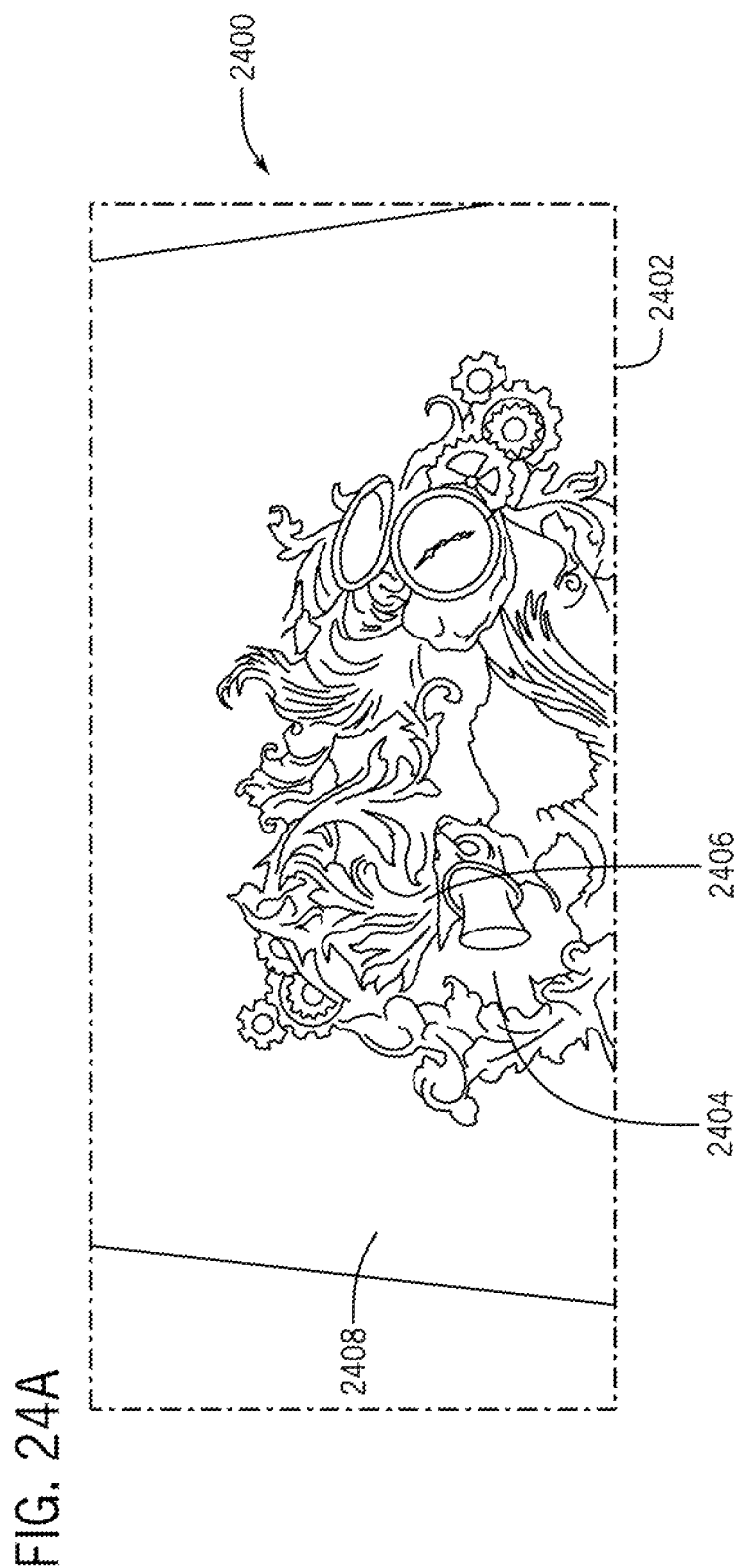
FIG. 24A illustrates engraving an image into a mirror, according to embodiments of the invention.

FIG. 24A illustrates, generally at 2400, engraving an image into a mirror, according to embodiments of the invention. With reference to FIG. 24A, a mirror 2402 is laser etched with engraving mode, described above, to create an image in the mirror. Location 2404 in the resulting image (a light spot) is where the laser was fired thereby removing the backing layer(s) and the silver layer, resulting in etching the mirror. Location 2406 (a dark spot) represents a location in the image where the laser did not fire thereby leaving the layer intact. The laser is dithered and the dot width is varied to achieve the appearance of shading in the etched image. The undisturbed backing layer, visible on a backside of the mirror, is indicated at 2408.

Figure 24B:
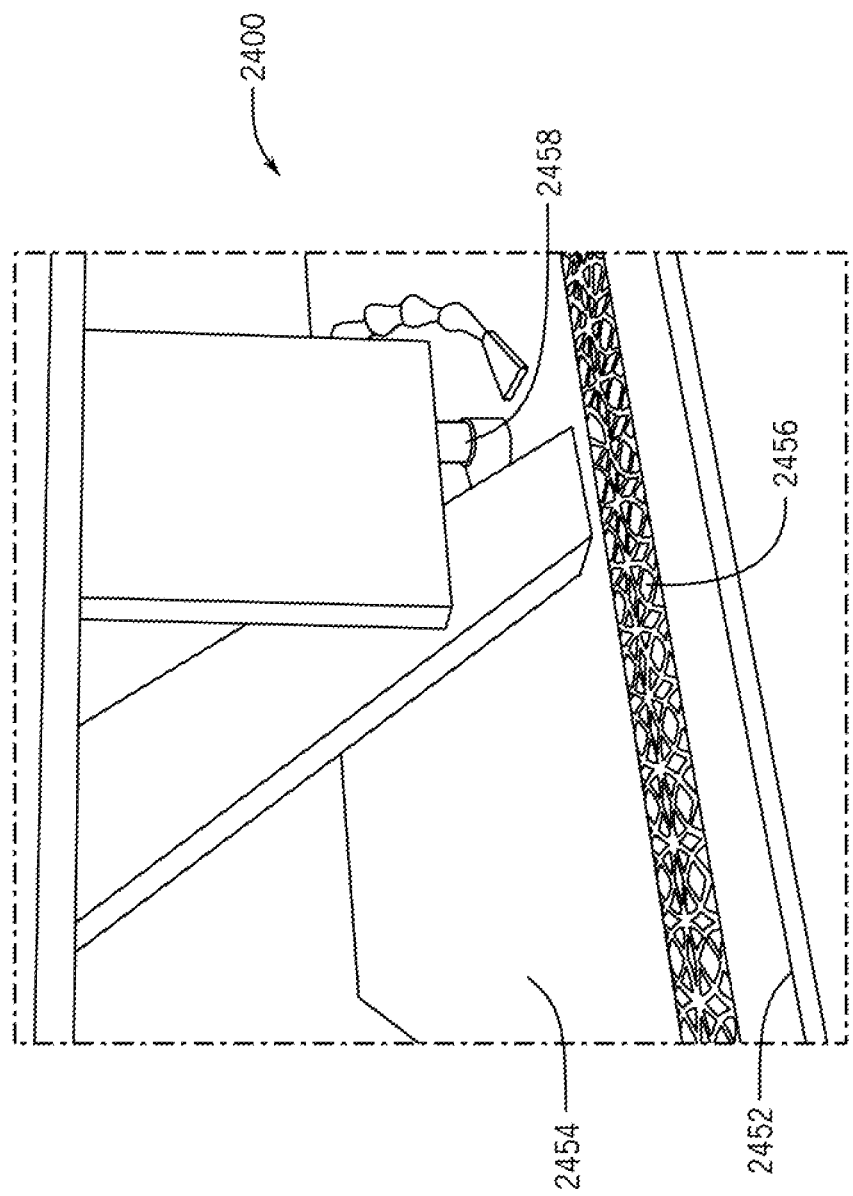
FIG. 24B illustrates engraving another image into a mirror, according to other embodiments of the invention.

FIG. 24B illustrates, generally at 2450, engraving another image into a mirror, according to other embodiments of the invention. With reference to FIG. 24B, high speed engraving or cutting of the image into the mirror is illustrated. A mirror 2452 has a backside 2454 exposed to a laser beam which emanates from a moving head 2458. A location in the design at 2456 indicates a region where the laser beam has fired and has removed the protective layer(s) and the reflective layer leaving a frosted image in the glass layer of the mirror 2452. The images presented in FIG. 24A and FIG. 24B above, can be used to provide a source of back light from the mirror thereby providing a lighted mirror when the light source is in an on state.

Figure 25A:
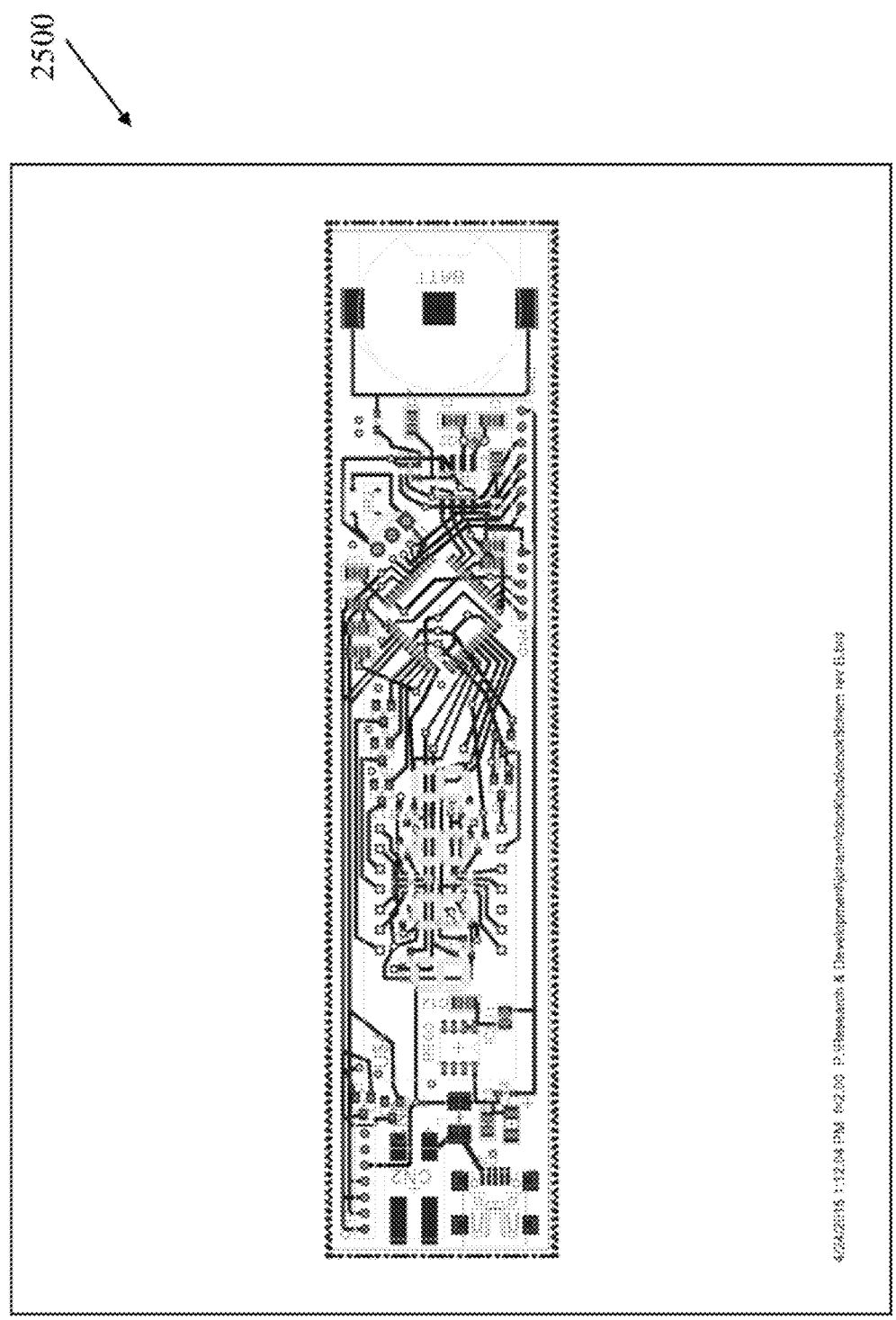
FIG. 25A illustrates a printed circuit board for displaying a clock output, according to embodiments of the invention.

As described above, in some embodiments, time-of-day is presented within a vanishing viewing window of a mirror according to embodiment of the invention. FIG. 25A illustrates, generally at 2500, a printed circuit board for displaying a clock output (time-of-day), according to embodiments of the invention. With reference to FIG. 25A, a printed circuit board drawing is indicated at 2500. The printed circuit board drawing at 2500 provides a circuit that will generate time-of-day as represented by alphanumeric symbols on a display for illumination through a vanishing viewing window as described below.

Figure 25B:
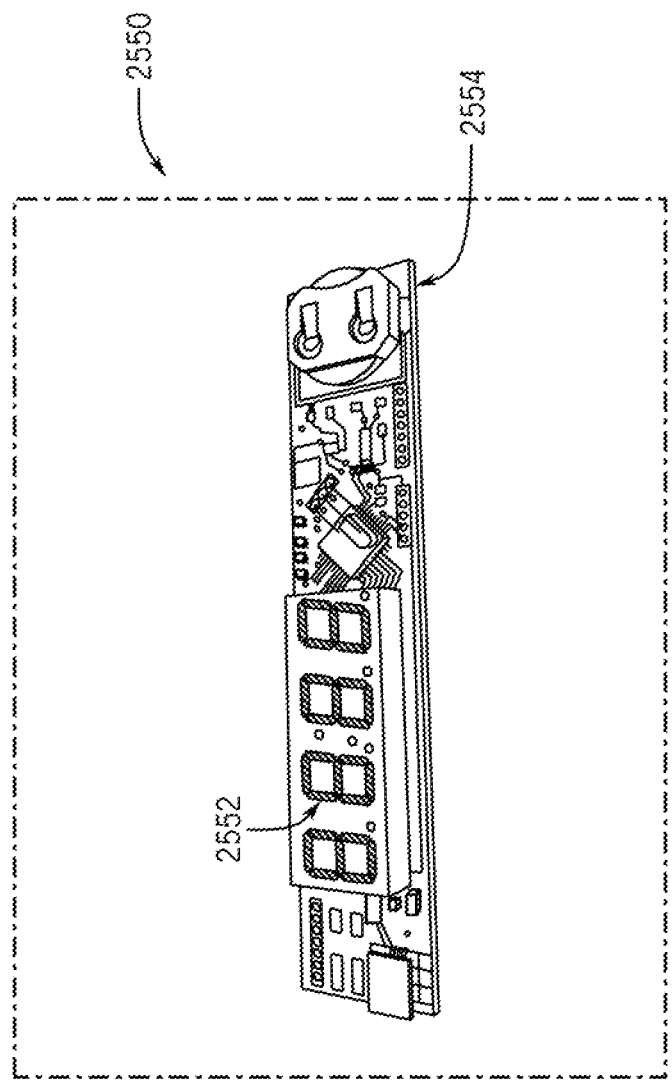
FIG. 25B illustrates a picture of a circuit board for displaying a clock output, according to embodiments of the invention.

FIG. 25B illustrates, generally at 2550, a picture of a circuit board for displaying a clock output (time-of-day), according to embodiments of the invention. With reference to FIG. 25B, a printed circuit board (PCB) is populated with its suite of components to provide a "clock" which is mounted to a mirror which has been processed to provide a vanishing viewing window therein. The PCB 2554 has a time-of-day display 2552 mounted thereon.

FIG. 26 illustrates, generally at 2600, a clock combined with a mirror, according to embodiments of the invention. With reference to FIG. 26, a mirror is indicated at 2602. Within the mirror 2602 a vanishing viewing window has been created as indicated at 2604 by a dashed line around an oval area and as described above in conjunction with the preceding figures. Note that the dashed line is not visible and is only used to indicated the approximate boundary of the vanishing viewing window. Within the vanishing viewing window of 2604 time-of-day is displayed at 2606 in on. In various embodiments, the mirror 2602 is made in various shapes and sizes without limitation. The vanishing viewing window 2604 is also made to various sizes. The vanishing viewing window 2604 can also be located in any area of the mirror.

An edge view "A" from 2600 is displayed at 2650. Note that the time-of-day display 2502 and accompanying circuit board 2504 are mounted on a backside of the mirror 2602 thereby allowing light emitted by the time-of-day display 2502 to pass through the vanishing viewing window when the time-of-day display is in an on state and the mirror 2602 is viewed from a front side as shown at 2600 in FIG. 26.

Figure 27A:
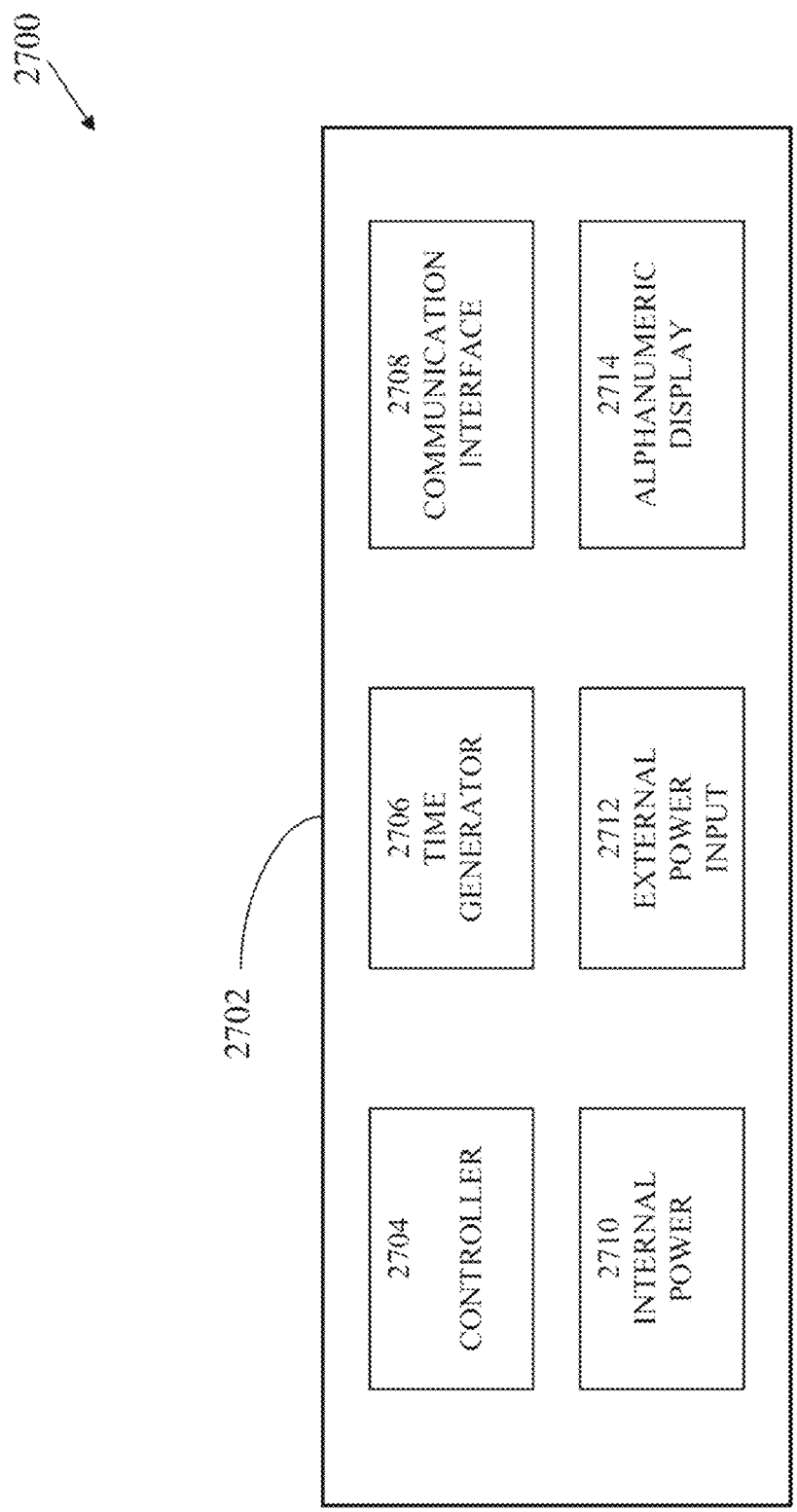
FIG. 27A illustrates a block diagram of an alphanumeric display system, according to embodiments of the invention.

FIG. 27A illustrates, generally at 2700, a block diagram of an alphanumeric display system, according to embodiments of the invention. With reference to FIG. 27A, an alphanumeric display system is indicated at 2702. The system 2702 includes a controller 2704 which is configured to receive signals from communication interface 2708. In various embodiments the communication interface 2708 operates using the Bluetooth wireless protocol or other wireless protocols such as Zigbee, Wifi, Infrared, etc. In some embodiments, the communication interface 2708 provides a wired connection to a local area network within a hospitality environment, such a Hotel, Motel, conference center, civic center, etc. In some embodiments, the communication interface is used to receive a reference time in order to "set" a single clock or a plurality of clocks. In some embodiments, the controller 2704 receives a reference time by means of the communication interface 2708 in order to adjust a time generator 2706 using a reference time. The time generator 2706 can drift over time resulting in error, thereby producing time-of-day errors. In some embodiments, the system 2702 contains a source of internal power 2710. The source of internal power 2710 can be provided by means of a battery. In some embodiments, the battery is mounted on the PCB board 2502 as shown above in FIG. 25. In some embodiments, the system 2702 includes an external power input 2712. External power input 2712 provides either a source of direct current to operate the system 2702 or the external power input 2712 can provide a source of alternating current which is converted to direct current.

The system 2702 includes an alphanumeric display 2714 to provide information to a user who views the mirror when the clock is in an "ON" state. When the clock is in the "OFF" state, the time-of-day information disappears from the vanishing viewing window of the mirror. When the clock is in the "OFF" state the vanishing viewing window participates with the rest of the reflective area of the window to provide the mirror function of reflecting light.

In various embodiments, the circuit depicted in 2702 (with or without additional components illustrated in the other figures) is implemented in an integrated circuit device, which may include an integrated circuit package containing the integrated circuit. As used in this description of embodiments, the term "integrated circuit" is used synonymously with the term "integrated circuit device." Note also that the term "integrated circuit" is understood to represent at least a part of an integrated circuit but not necessarily what would constitute an entire chip. In some embodiments, the circuit 2702 is implemented in a single integrated circuit die. In other embodiments, the circuit 2702 is implemented in more than one integrated circuit die of an integrated circuit device which may include a multi-chip package containing the integrated circuit. The embodiments of the present invention are not limited to any particular semiconductor manufacturing technology. Embodiments of the present invention can be implemented using C-MOS, BIPOLAR, Silicon Germanium, or other process technology. The process technologies listed here are provided merely for example and do not limit embodiments of the invention.

Figure 27B:
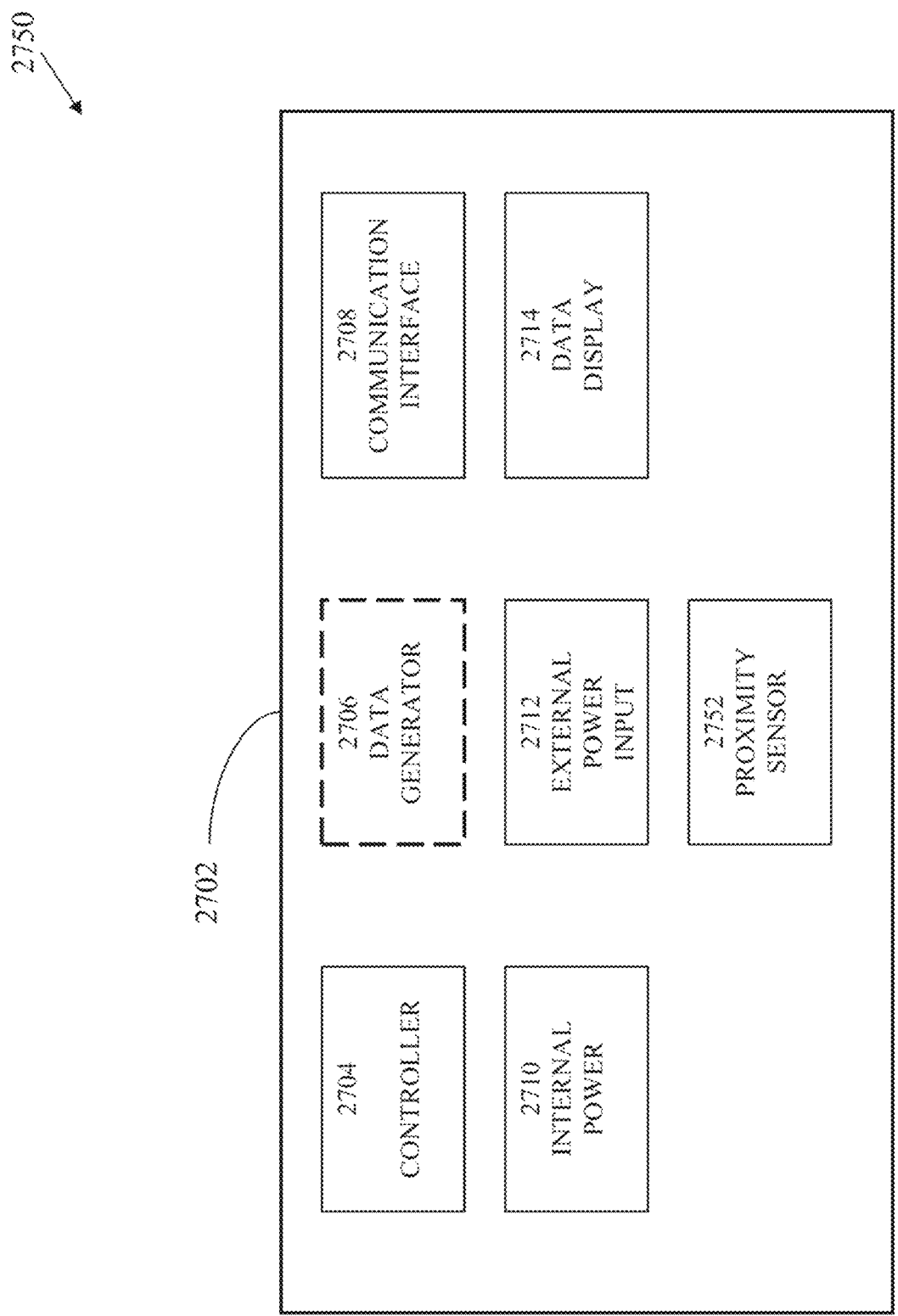
FIG. 27B illustrates a block diagram of a data display system, according to embodiments of the invention.

FIG. 27B illustrates a block diagram of a data display system, according to embodiments of the invention. With reference to FIG. 27B, a data display system is indicated at 2702 which is incorporated into a mirror as described above in conjunction with the previous figures. The system 2702 includes a controller 2704 which is configured to receive signals from communication interface 2708. In various embodiments the communication interface 2708 operates using the Bluetooth wireless protocol or other wireless protocols such as Zigbee, Wifi, Infrared, etc. In some embodiments, the communication interface 2708 provides a wired connection to a local area network within a hospitality environment, such a Hotel, Motel, conference center, civic center, etc. In other embodiments, the communication interface receives wireless signals from a smart phone within range of the data display system 2702.

In some embodiments, the system 2702 contains a source of internal power 2710. The source of internal power 2710 can be provided by means of a battery. In some embodiments, the battery is mounted on the PCB board 2502 as shown above in FIG. 25. In some embodiments, the system 2702 includes an external power input 2712. External power input 2712 provides either a source of direct current to operate the system 2702 or the external power input 2712 can provide a source of alternating current which is converted to direct current.

The system 2702 includes a data display 2714 which provides data to a data display located behind a vanishing viewing window of a mirror. The data display 2714 provides information to a user who views the mirror when the data display is in an "ON" state as described in conjunction with the figures above. When the data display is in an "OFF" state, the information disappears from the vanishing viewing window of the mirror and the vanishing viewing window 2714 blends into the rest of the reflective surface of the mirror. When the data display is in the "OFF" state the vanishing viewing window participates with the rest of the reflective area of the window to provide the mirror function of reflecting light to a user.

The data display 2714 can be one of a variety of data displays configured to display alphanumeric data, graphical data or video data as described above in conjunction with the previous figures. In various embodiments, data displayed on the data display 2714 is received via the communications interface 2708. In various embodiments, data displayed on the data display 2714 is locally generated by optional data generator 2706. As described above the data displayed on the data display 2714 can communicate information such as time of day, day of the week, date, weather, news, sports, emergency warning, financial information such as stock prices, etc. In other embodiments, the data displayed on the data display 2714 is a television signal input via the communication interface 2708.

In some embodiments, a proximity sensor 2752 provides a trigger to transition the data display 2714 to an on state when a user is within range of the proximity sensor 2752. Some examples of proximity sensors which are used for 2752 are infrared proximity sensors such as the model # GP2Y0A21YK from Sharp. Another proximity sensor which can be used at 2752 is the LV-EZ0 Maxbotix Ultrasonic Rangefinder. In various embodiments, the proximity sensor 2752 provides a trigger for the data display 2714 when a user moves in front of a portable mirror such as a makeup mirror or a wall mounted mirror such as a bathroom vanity mirror or a general wall mounted room mirror.

In some embodiments, the communication interface is used to receive a reference signal for a local data generator such as data generator 2706. In some embodiments, the reference signal is a reference time signal in order to "set" a single clock or a plurality of clocks. In some embodiments, the controller 2704 receives a reference signal by means of the communication interface 2708 in order to adjust a data generator 2706 using the reference signal. The data generator 2706 can drift over time resulting in error, thereby producing errors which are corrected with the reference signal errors. In other embodiments, the communications interface receives an emergency warning signal from a hospitality environment which is used to alert guests of the need to evacuate a building or other action that is needful on the part of the guest. The signal is provided by the controller 2704 to the data display 2714 which communicates information to a user who might be proximate to the system 2702 contained within a mirror in the hospitality environment.

In various embodiments, the circuit depicted in 2702 (with or without additional components illustrated in the other figures) is implemented in an integrated circuit device, which may include an integrated circuit package containing the integrated circuit. As used in this description of embodiments, the term "integrated circuit" is used synonymously with the term "integrated circuit device." Note also that the term "integrated circuit" is understood to represent at least a part of an integrated circuit but not necessarily what would constitute an entire chip. In some embodiments, the circuit 2702 is implemented in a single integrated circuit die. In other embodiments, the circuit 2702 is implemented in more than one integrated circuit die of an integrated circuit device which may include a multi-chip package containing the integrated circuit. The embodiments of the present invention are not limited to any particular semiconductor manufacturing technology. Embodiments of the present invention can be implemented using C-MOS, BIPOLAR, Silicon Germanium, or other process technology. The process technologies listed here are provided merely for example and do not limit embodiments of the invention.

Figure 28:
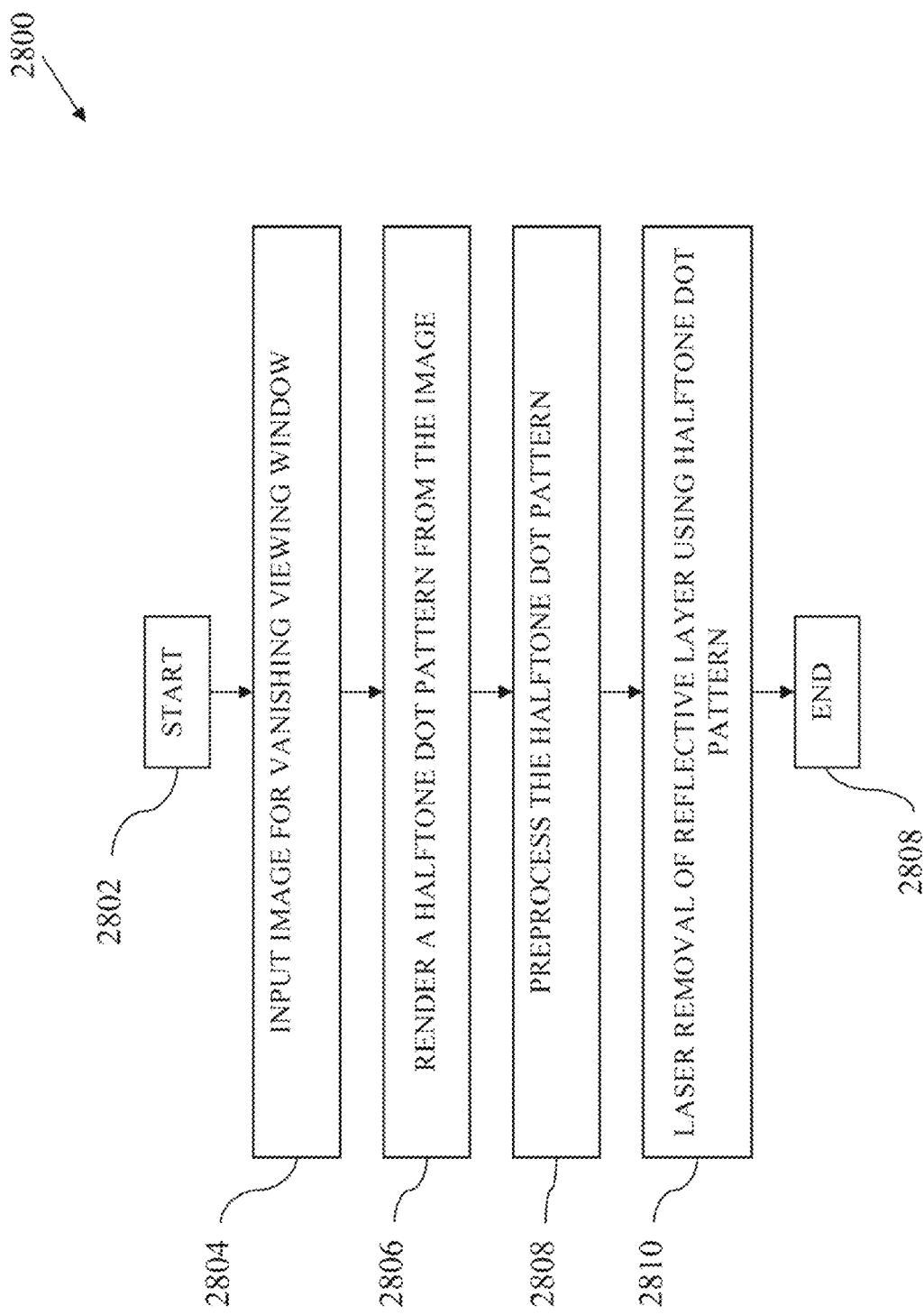
FIG. 28 illustrates a process to create a vanishing viewing window in a mirror with a halftone dot pattern, according to embodiments of the invention.

FIG. 28 illustrates, generally at 2800, a process to create a vanishing viewing window in a mirror with a halftone dot pattern, according to embodiments of the invention. With reference to FIG. 28 a process begins at a block 2802. At a block 2804 an image is input into a development environment as described in conjunction with the figures above. The image input at the block 2804 can be a grey scale image as illustrated above or it can be a grey scale image based on a different color such as blue, etc. where some color other than black is used with white (no color) to produce a halftone dot pattern. At a block 2806 a halftone dot pattern is rendered from the image input at the block 2804. The halftone dot pattern is rendered at a line resolution referred to by the number of lines of dots that are rendered per unit length. A common term for this metric is lines per inch (lpi). In some embodiments, laser beam has a much smaller diameter than the resolution of the halftone image therefore the laser beam must be moved many times across the target area in order to remove the reflective layer(s) from the glass layer forming the dots thereby. An advantage to using a laser beam to create a half-tone dot pattern is that since a beam width of a laser beam is so small the laser beam can be used to create a half-tone pattern with a very high number of lines per inch, thereby rendering an image with very smooth shading. At a block 2808 the halftone dot pattern is preprocessed in software to soften the boundaries between the glass layer with reflective layer(s) and the portions where the reflective layer(s) has been removed. At a block 2810 the result of block 2808 is used in to remove reflective layer thereby creating a vanishing viewing window in a mirror. The process stops at a block 2808.

In alternative embodiments to FIG. 28, a vanishing viewing window is created by using a film or coating over an area of the reflective layer after an amount of reflectivity has been reduced from a maximum value.

Figure 29:
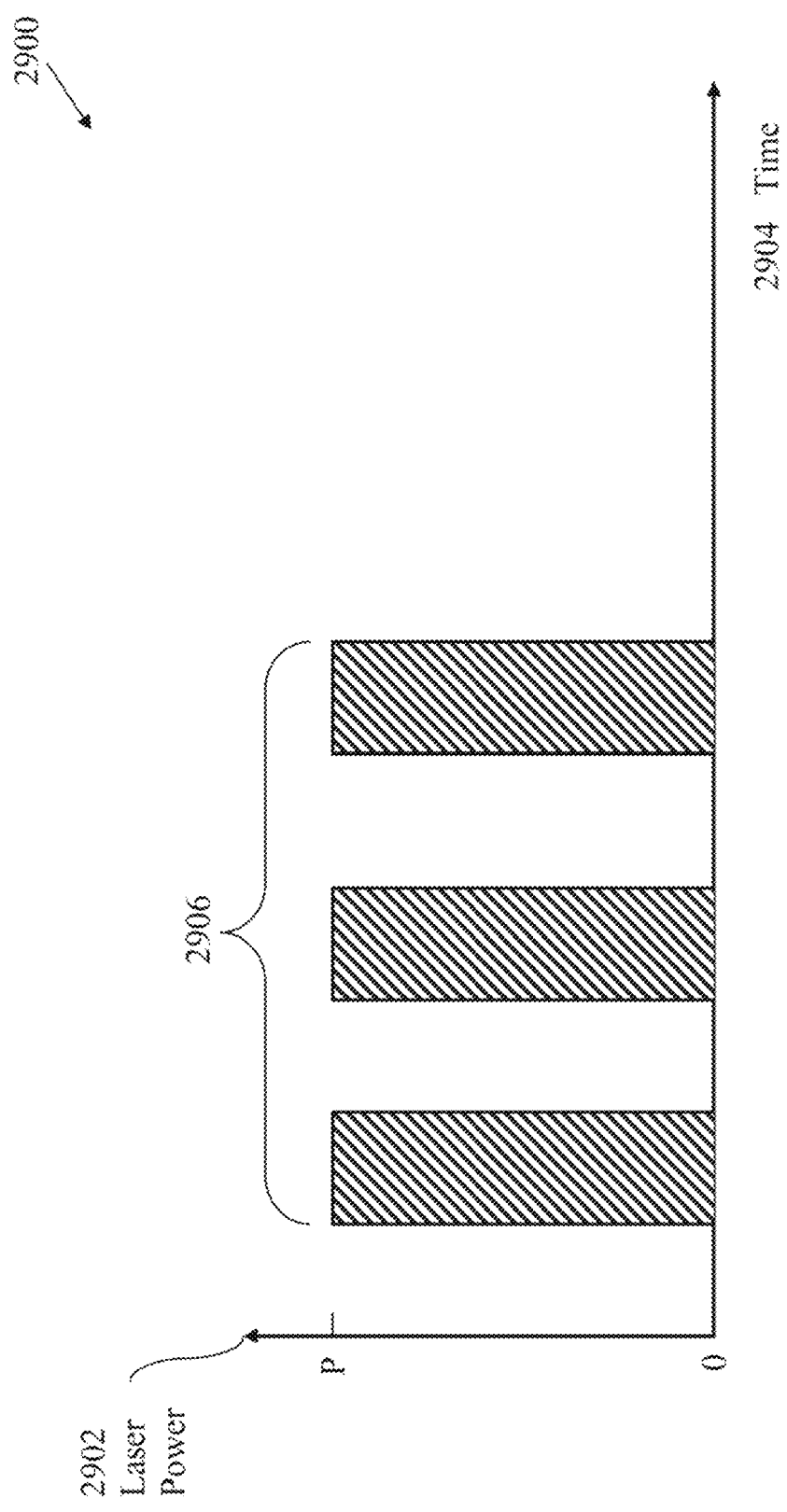
FIG. 29 illustrates pulsing a laser, according to embodiments of the invention.

FIG. 29 illustrates, generally at 2900, pulsing a laser, according to embodiments of the invention. With reference to FIG. 29, laser power is indicated on a vertical axis at 2902 and time is illustrated on a horizontal axis at 2904. Laser output as a function of time is indicated at 2906 with three pulses shown in the figure. Waveform 2906 is merely an illustration of a non-limiting example of pulsing a laser in the time domain in order to remove reflective layer from a mirror. Many other different waveforms are contemplated within the scope of embodiments presented herein.

Figure 30:
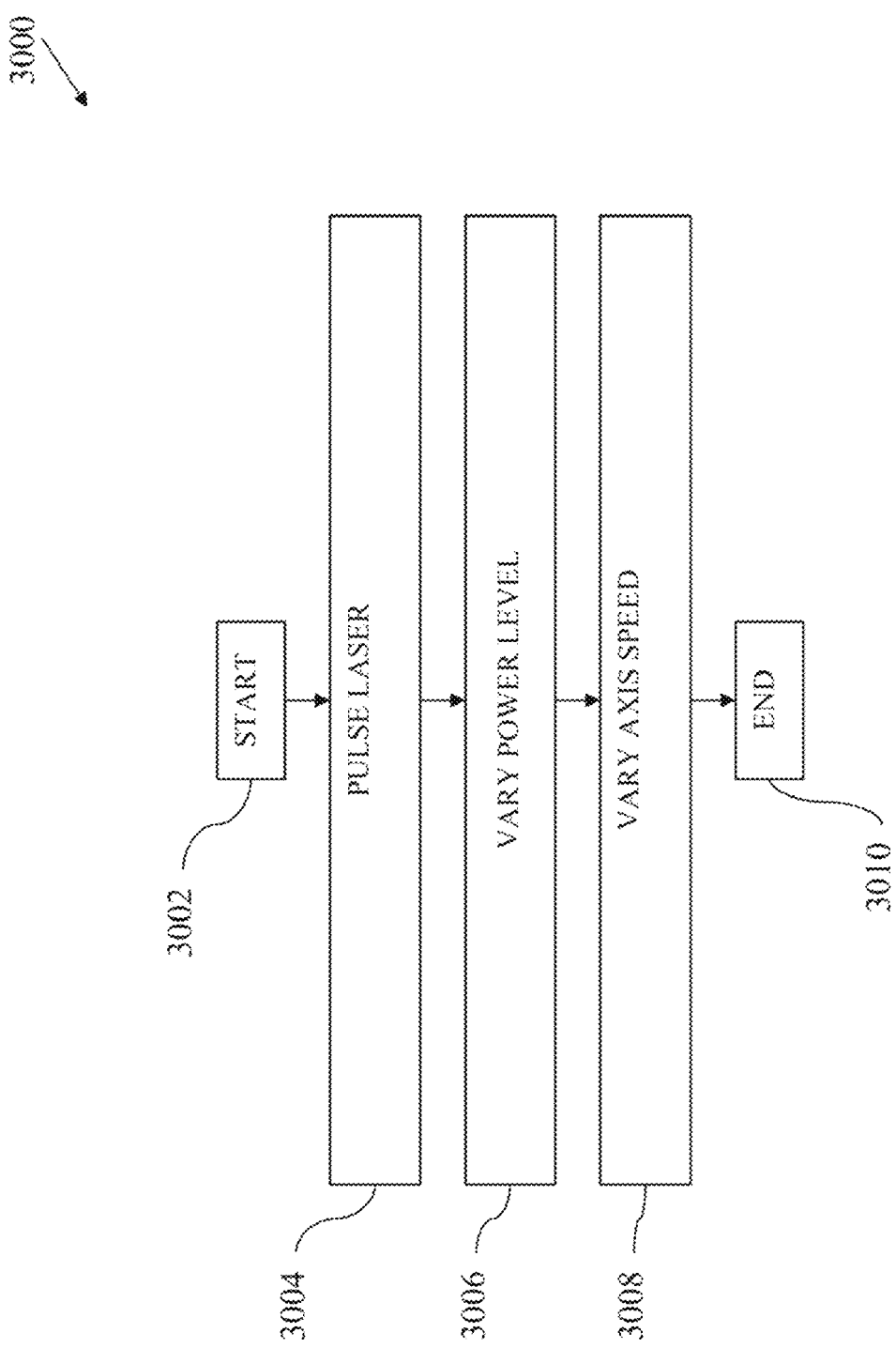
FIG. 30 illustrates a process to remove reflective layer from a mirror, according to embodiments of the invention.

FIG. 30 illustrates, generally at 3000, a process to remove reflective layer from a mirror, according to embodiments of the invention. With reference to FIG. 30, a process starts at a block 3002. At a block 3004 a laser is pulsed thereby varying output power as a function of time. At a block 3006 a maximum power level of a laser is varied during removal of a reflective layer from a mirror. In some embodiments a laser is operated at 50% of maximum power. In other embodiments, a laser is operated at a different value. At a block 3008 an axis speed is varied. In operation an algorithm is used in a laser system to adjust the values described above in blocks 3004, 3006, and 3008 during removal of the backing layer of a mirror during the creation of a vanishing viewing window.

Figure 31:
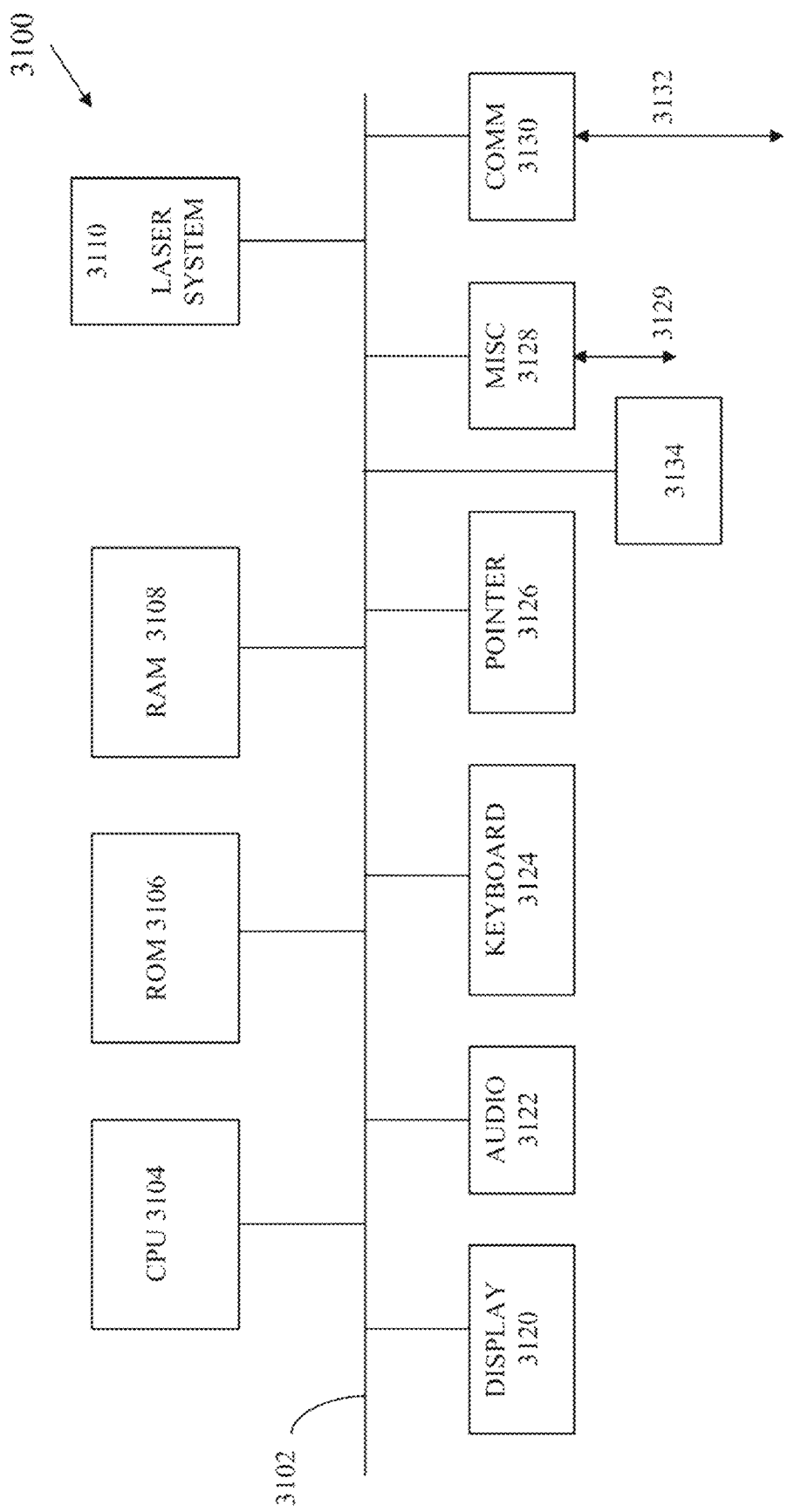
FIG. 31 illustrates a block diagram of a laser system and development environment, according to embodiments of the invention.

FIG. 31 illustrates, generally at 3100, a block diagram of a laser system and development environment, according to embodiments of the invention. With reference to FIG. 31, as used in this description of embodiments, a development environment can be based on a device such as a computer, in which embodiments of the invention may be used. The block diagram is a high level conceptual representation and may be implemented in a variety of ways and by various architectures. Bus system 3102 interconnects a Central Processing Unit (CPU) 3104 (alternatively referred to herein as a processor), Read Only Memory (ROM) 3106, Random Access Memory (RAM) 3108, storage 3110, display 3120, audio, 3122, keyboard 3124, pointer 3126, miscellaneous input/output (I/O) devices 3128, and communications 3130. RAM 3108 can also represent dynamic random access memory (DRAM). It is understood that memory (not shown) can be included with the CPU block 3104. The bus system 3102 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 994 (FireWire), Universal Serial Bus (USB), etc. The CPU 3304 may be a single, multiple, or even a distributed computing resource. Storage 3110 may be Compact Disc (CD), Digital Versatile Disk (DVD), hard disks (HD), solid state disk (SSD), optical disks, tape, flash, memory sticks, video recorders, a redundant array of independent disks (RAID), etc. A laser system 3110 can be configured with its own processing unit such as a digital signal processor (DSP) as described above in conjunction with the preceding figures, such as for example FIG. 22. Note that depending upon the actual implementation of a computer system, the computer system may include some, all, more, or a rearrangement of components in the block diagram. Thus, many variations on the system of FIG. 31 are possible.

Figure 32:
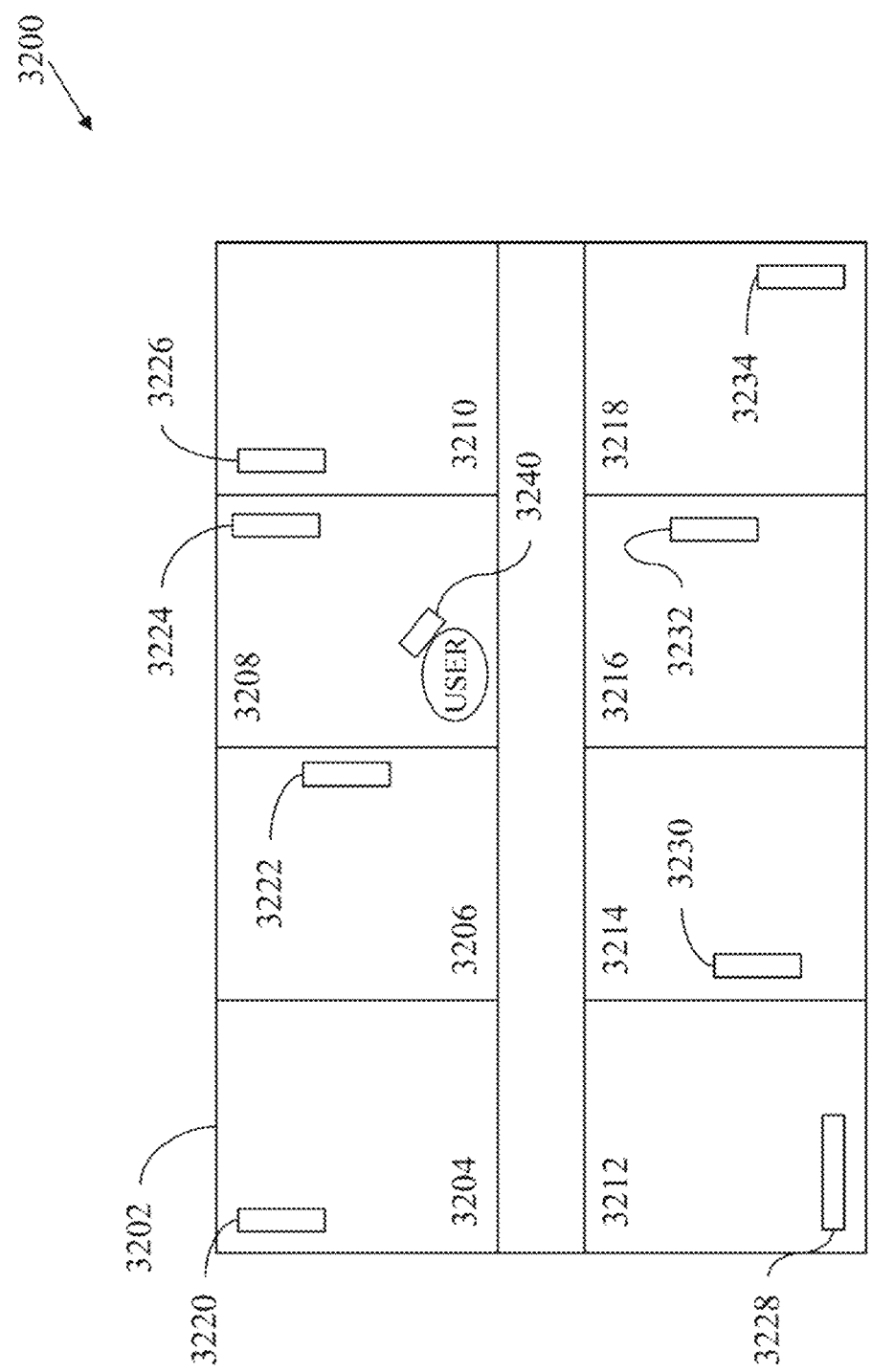
FIG. 32 illustrates a hospitality environment, according to embodiments of the invention.

FIG. 32 illustrates, generally at 3200, a hospitality environment, according to embodiments of the invention. With reference to FIG. 32, 3202 represents a hospitality area for example in various embodiments, a hotel, a motel, a conference center, a marina, a convention center, etc. Within the hospitality area 3202 there is a plurality of rooms or sub areas such as 3204, 3206, 3208, 3210, 3212, 3214, 3216, through 3218. Within one or more of the rooms or sub areas a mirror is located therein such as a mirror 3220, 3222, 3224, 3226, 3228, 3230, 3232, and 3234. In various embodiments, the plurality of mirrors 3220 through 3234 are configured each with a vanishing viewing window and a clock as described above in conjunction with the preceding figures such that "time-of-day" is displayed on the respective mirror. In various embodiments, the clocks are in communication with a control system (described more fully below in conjunction with FIG. 33) that is used to reset time on the plurality of clocks thereby removing errors in the time-of-day that is reported on the different clocks by synchronizing each clock to a time standard. Thus, a user 3240 can go from room to room within the hospitality area and see the same time-of-day on any of the mirrors within the hospitality area 3202.

Figure 33:
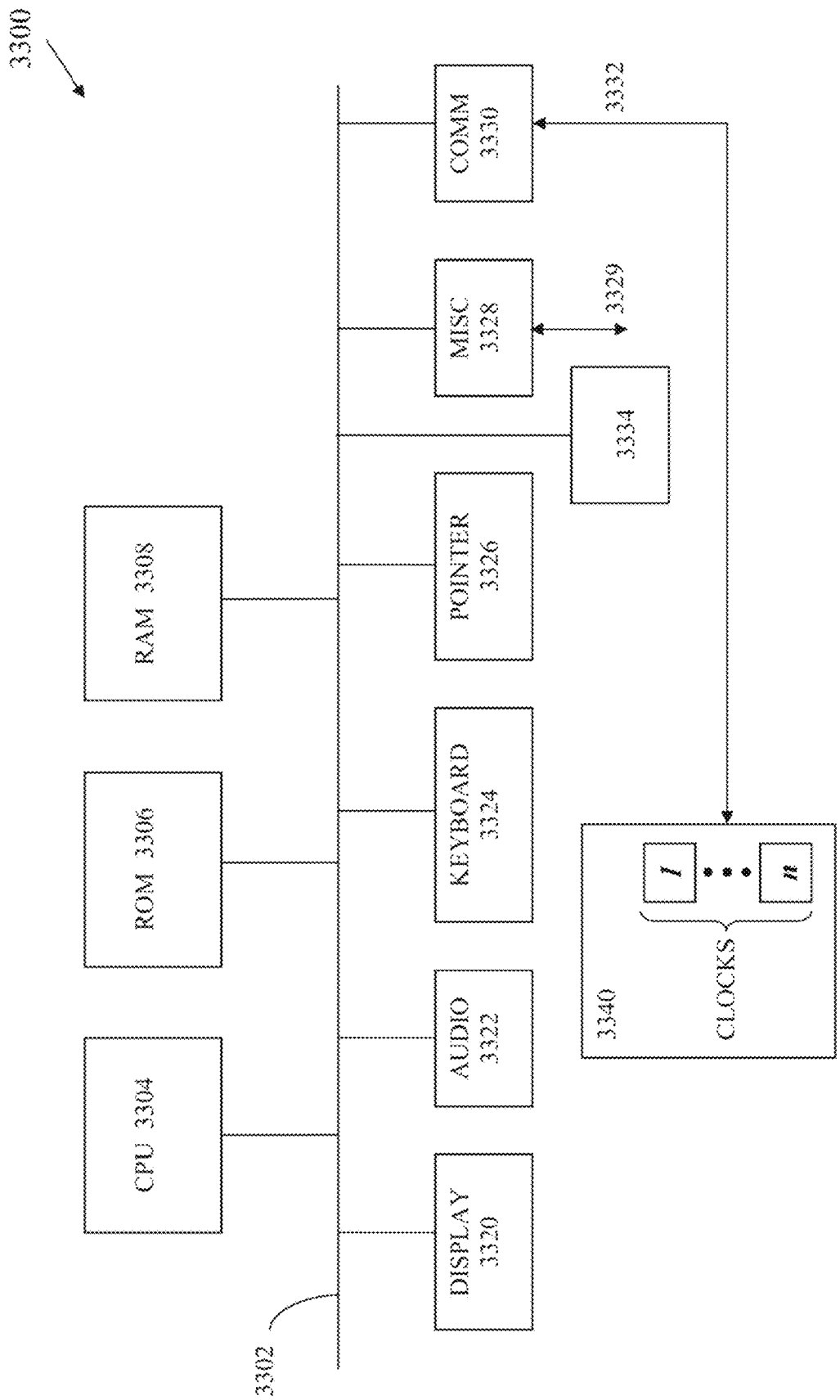
FIG. 33 illustrates a control system for use in a hospitality environment, according to embodiments of the invention.

FIG. 33 illustrates a control system for use in a hospitality environment, according to embodiments of the invention. With reference to FIG. 33, as used in this description of embodiments, control system can be a device such as a computer, smart phone, tablet computer, handheld infrared remote control, etc. in which embodiments of the invention may be used. The block diagram is a high level conceptual representation and may be implemented in a variety of ways and by various architectures. Bus system 3302 interconnects a Central Processing Unit (CPU) 3304 (alternatively referred to herein as a processor), Read Only Memory (ROM) 3306, Random Access Memory (RAM) 3308, storage 3310, display 3320, audio, 3322, keyboard 3324, pointer 3326, miscellaneous input/output (I/O) devices 3328, and communications 3330. RAM 3308 can also represent dynamic random access memory (DRAM). It is understood that memory (not shown) can be included with the CPU block 3304. The bus system 3302 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 994 (FireWire), Universal Serial Bus (USB), etc. The CPU 3304 may be a single, multiple, or even a distributed computing resource. Storage 3310 may be Compact Disc (CD), Digital Versatile Disk (DVD), hard disks (HD), solid state disk (SSD), optical disks, tape, flash, memory sticks, video recorders, a redundant array of independent disks (RAID), etc. Note that depending upon the actual implementation of a control system, the control system may include some, all, more, or a rearrangement of components in the block diagram. The user can use a handheld device equipped with wireless infrared communication functionality to reset time on a single clock or a plurality of clocks. Thus, many variations on the control system of FIG. 33 are possible.

Connection with a network is obtained with 3332 via 3330 either wirelessly or through a wired connection, as is recognized by those of skill in the art, which enables the control system 3300 to communicate with a general number of n clocks at 3340 which can be in remote locations throughout for example a hospitality area 3202 described above in conjunction with FIG. 32. 3332 and 3330 flexibly represent communication elements in various implementations, and can represent various forms of telemetry, GPRS, Ethernet, Wide Area Network (WAN), Local Area Network (LAN), Internet connection, WiFi, WiMax, ZigBee, Infrared, etc. and combinations thereof. In various embodiments, a pointing device such as a stylus is used in conjunction with a touch screen, for example, via 3329 and 3328.

In addition to the display of time-of-day within a vanishing viewing window according to embodiments described herein other alphanumeric data is displayed such as but not limited to stock prices, news headlines, weather reports or warnings, instructions to vacate in times of emergency, etc. While the descriptions given above have described communication of time-of-day other embodiments of the invention are not so limited and the descriptions concerning time-of-day are provided merely for example and illustration. In addition, in some embodiments a mirror is equipped with a media display device viewing area. The media display device viewing area can vanish into the mirror when the media display device is in an OFF state and appear when the media display device is in an ON state. In other embodiments, the media display device viewing area is visible when the media display device is in an ON state as well as an OFF state. The techniques using halftone dot patterns described herein are applicable to visually softening a boundary of the media display device viewing area. When employed along a boundary of a media display device viewing area a halftone dot pattern in the mirror causes the image displayed in the media display device viewing area to vanish into the reflective portion of the mirror. Similarly, in other embodiments, the techniques using halftone dot patterns described herein are applied along a boundary of a backlight area of a mirror, thereby visually softening the boundary by causing the backlight area to blend into the reflective area of the mirror.

Some embodiments are used to provide information to guests within a hospitality environment. Information can be of a guest specific nature such as a reminder to call the front desk. Such information is sent to a specific guest's room and is displayed in vanishing viewing windows on one or mirrors within the guest's room. In such embodiments, a control center for the hospitality environment turns on the data display remotely to provide the information within the vanishing viewing windows on the mirror or mirrors in the guest's room.

In various embodiments, the descriptions provided herein enable mirrors to provide multiple functions to users. These multiple functions enable more efficient parallel processing by people when at home and when in hospitality environments.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), dynamic random access memories (DRAM), electrically programmable read-only memories (EPROM)s, electrically erasable programmable read-only memories (EEPROMs), FLASH memories, magnetic or optical cards, RAID, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods herein may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Non-transitory machine-readable media is understood to include any mechanism for storing information in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus to provide reflection and information, comprising:
    a mirror, the mirror has a front side and a backside, the mirror further comprising:
        a glass layer, the glass layer has an area and a first reflectivity;
        a reflective layer, the reflective layer is adhered to the backside; and
        a protective layer, the protective layer is adhered to the reflective layer, wherein the reflective layer further comprising:
        a vanishing viewing window, at least a part of the protective layer is removed from the vanishing viewing window to provide a second reflectivity for the vanishing viewing window, wherein the first reflectivity is greater than the second reflectivity; and
    a data display, the data display is positioned behind the vanishing viewing window, such that when a user views the front side, the user sees a reflection in the mirror when the data display is in an off state and when the data display is in an on state the user sees a reflection in the mirror and data in the vanishing viewing window.

2. The apparatus of claim 1, further comprising:
    removing at least a part of the reflective layer from the vanishing viewing window.

3. The apparatus of claim 1, wherein the data is in a form of alphanumeric characters.

4. The apparatus of claim 3, wherein the data communicates information selected from the group consisting of time, weather, news, sports, financial, and stocks.

5. The apparatus of claim 4, wherein the data scrolls across the vanishing viewing window.

6. The apparatus of claim 1, wherein the data is in a form of graphics.

7. The apparatus of claim 6, wherein the data communicates information selected from the group consisting of time, weather, news, sports, financial, and stocks.

8. The apparatus of claim 6, wherein the data communicates information selected from the group consisting of time, weather, news, sports, financial, and stocks.

9. The apparatus of claim 1, wherein the data is in a form of video.

10. The apparatus of claim 1, further comprising:
    a proximity sensor, the proximity sensor is coupled to the data display and the proximity sensor is configured to trigger an on state of the data display when the user is within a trigger range of the proximity sensor.

11. The apparatus of claim 1, further comprising:
    a data generator, wherein the data generator to generate data for display on the data display when the data display is in the on state.

12. The apparatus of claim 11, wherein the data is selected from the group consisting of time, day, and date.

13. The apparatus of claim 1, further comprising:
    a communication interface, the communication interface is electrically coupled to the data display and is configured to receive data from a remote source through a network connection, wherein in the on state the data is displayed on the data display.

14. The apparatus of claim 13, further comprising:
    a data generator, wherein the data generator to generate data for display on the data display when the data display is in an on state, and wherein the data includes a calibration signal for calibration of the data generator.

15. The apparatus of claim 14, wherein the apparatus is one of a plurality of apparatuses deployed in a hospitality environment.

16. The apparatus of claim 1, wherein the mirror is used in a device selected from the group consisting of a wall mounted mirror and a portable mirror.

17. The apparatus of claim 16, wherein the portable mirror is a makeup mirror.

18. An apparatus to provide reflection and information, comprising:
    a mirror, the mirror has a front side and a backside, the mirror further comprising:

a glass layer, the glass layer has an area and a first reflectivity;

a reflective layer, the reflective layer is adhered to the backside;

a protective layer, the protective layer is adhered to the reflective layer, a vanishing viewing window, the vanishing viewing window is a region within the area, wherein a reflectivity of the vanishing viewing window is reduced through a process comprising:

illuminating the backside with a laser beam;

moving the mirror during the illuminating; wherein at least a part of the protective layer is removed from the vanishing viewing window to provide a second reflectivity for the vanishing viewing window, wherein the first reflectivity is greater than the second reflectivity; and a data display, the data display is positioned behind the vanishing viewing window, such that when a user views the front side, the user sees a reflection in the mirror when the data display is in an off state and when the data display is in an on state the user sees a reflection in the mirror and data in the vanishing viewing window.

19. The apparatus of claim 18, wherein substantially all of the protective layer is removed during the moving.

20. The apparatus of claim 18, wherein the data display is a light source which provides a source of back light illumination in the vanishing viewing window when the light source is in an on state.

21. The apparatus of claim 18, wherein the moving utilizes a double rail structure in an X direction and a double rail structure in a Y direction to move the laser beam across the backside of the mirror.

22. The apparatus of claim 21, wherein the laser beam is output from a carbon dioxide ($CO_2$) laser.

23. The apparatus of claim 22, wherein engraving mode is used during the moving and the illuminating.

24. A method to create a vanishing viewing window in a mirror, comprising:

inputting an image for the vanishing viewing window into a processor;

rendering a halftone dot pattern for the image with the processor to create a sequence of control instructions to a laser; and operating a laser with the sequence of control instructions to illuminate a backside of the mirror with a laser beam to remove at least a part of the backing layer from the mirror, wherein the halftone dot pattern is created in the mirror.

25. The method of claim 24, further comprising:
preprocessing the halftone dot pattern to soften a boundary around the vanishing viewing window.

26. The method of claim 24, further comprising:
removing at least a part of the reflective layer from the vanishing viewing window.

27. The method of claim 24, wherein the operating further comprising:
pulsing the laser as a function of time; and
varying a translational speed of the laser beam along an axis.

28. The method of claim 24, wherein the operating further comprising:
adjusting a power level of the laser.

29. The method of claim 28, wherein the adjusting occurs during while the laser beam is translating along an axis.

30. A method to create a vanishing viewing window in a mirror, the mirror having a first reflectivity, comprising:

illuminating a backside of the mirror with a laser beam;

moving a second mirror during the illuminating; wherein at least a part of a protective layer of the mirror is removed from the vanishing viewing window to provide a second reflectivity for the vanishing viewing window, wherein the first reflectivity is greater than the second reflectivity; and a data display, the data display is positioned behind the vanishing viewing window, such that when a user views a front side of the mirror, the user sees a reflection in the mirror when the data display is in an off state and when the data display is in an on state the user sees a reflection in the mirror and data in the vanishing viewing window.

31. The method of claim 30, wherein substantially all of the protective layer is removed during the moving.

32. The method of claim 30, wherein the moving utilizes a double rail structure in an X direction and a double rail structure in a Y direction to move the laser beam across the backside of the mirror.

33. The method of claim 32, wherein the laser beam is output from a carbon dioxide ($CO_2$) laser.

34. The method of claim 33, wherein engraving mode is used during the moving and the illuminating.

35. A system for providing information within a hospitality environment, comprising:

a hospitality network; and a plurality of mirrors, each mirror of the plurality has a first reflectivity, each mirror further comprising:

a vanishing viewing window, at least a part of a protective layer has been removed from the vanishing viewing window to provide a second reflectivity for the vanishing viewing window, wherein the first reflectivity is greater than the second reflectivity;

an information display, the information display is positioned behind the vanishing viewing window; and a communications interface, the communications interface is electrically coupled to the information display, the communications interface to receive a signal, the signal is used to provide data to the information display such that when a user views a front side of a mirror, from the plurality of mirrors, the user sees a reflection in the mirror when an information display, which is coupled to the mirror, is in an off state and when the information display is in an on state the user sees a reflection in the mirror and information in a vanishing viewing window of the mirror.

36. The apparatus of claim 35, further comprising:
a proximity sensor, the proximity sensor is coupled to the data display and the proximity sensor is configured to trigger an on state of the data display when the user is within a trigger range of the proximity sensor.

37. The system of claim 35, wherein at least a part of the reflective layer has been removed from the vanishing viewing window.

38. The system of claim 37, wherein the vanishing viewing window is not noticeable when the information display is in an off state.

39. The system of claim 35, wherein the data is in a form selected from the group consisting of alphanumeric, graphics, and video.

40. The system of claim 39, wherein the data communicates information selected from the group consisting of time, weather, news, sports, emergency warning, hospitality data, and financial.

41. The system of claim 40, wherein the emergency warning is generated by the hospitality environment.

42. The system of claim 35, wherein each mirror of the plurality of mirrors further comprising:
   a data generator, wherein the data generator to generate data for display on the information display when the information display is in an on state.

43. The system of claim 42, wherein the data is selected from the group consisting of time, day, date, temperature, hospitality data, and weather.

\* \* \* \* \*